US009167235B2

(12) United States Patent  
Jacobs et al.

(10) Patent No.: US 9,167,235 B2
(45) Date of Patent: *Oct. 20, 2015

(54) FASTER STATE TRANSITIONING FOR CONTINUOUS ADJUSTABLE 3DEEPS FILTER SPECTACLES USING MULTI-LAYERED VARIABLE TINT MATERIALS

(71) Applicants: Kenneth Martin Jacobs, New York, NY (US); Ronald Steven Karpf, Corvallis, OR (US)

(72) Inventors: Kenneth Martin Jacobs, New York, NY (US); Ronald Steven Karpf, Corvallis, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,048

(22) Filed: Aug. 4, 2014

(65) Prior Publication Data

US 2014/0340495 A1    Nov. 20, 2014

Related U.S. Application Data

(60) Continuation of application No. 14/555,505, filed on Jan. 15, 2014, now Pat. No. 8,864,304, which is a continuation of application No. 13/746,393, filed on Jan. 22, 2013, now Pat. No. 8,657,438, which is a continuation of application No. 12/938,495, filed on Nov. 3, 2010, now abandoned, which is a division of application No. 12/555,545, filed on Sep. 8, 2009, now Pat. No. 7,850,304, which is a continuation-in-part of application No. 12/274,752, filed on Nov. 20, 2008, now Pat. No. 7,604,348, which is a continuation-in-part of application No. 11/928,152, (Continued)

(51) Int. Cl.
G02C 7/14 (2006.01)
H04N 13/04 (2006.01)
G02B 26/02 (2006.01)
G02B 27/01 (2006.01)
G02B 27/22 (2006.01)
G02C 7/10 (2006.01)
H04N 13/00 (2006.01)
G02C 7/00 (2006.01)
H04N 13/02 (2006.01)

(52) U.S. Cl.
CPC .......... *H04N 13/0429* (2013.01); *G02B 26/026* (2013.01); *G02B 27/017* (2013.01); *G02B 27/0172* (2013.01); *G02B 27/2221* (2013.01); *G02B 27/2228* (2013.01); *G02B 27/2264* (2013.01); *G02C 7/00* (2013.01); *G02C 7/101* (2013.01); *H04N 13/0033* (2013.01); *H04N 13/0431* (2013.01); *H04N 13/0438* (2013.01); *H04N 13/0454* (2013.01); *H04N 13/0497* (2013.01); *G02B 2027/014* (2013.01); *H04N 13/026* (2013.01); *H04N 13/0434* (2013.01); *H04N 2213/002* (2013.01); *H04N 2213/008* (2013.01)

(58) Field of Classification Search
CPC .. G02C 27/2221; G02C 27/2228; G02C 7/00; G02C 7/12; G02B 27/2221; G02B 27/2228; G02B 27/225
USPC ........... 351/49, 159.39, 158, 41, 163, 51, 52; 349/13, 96; 359/465, 490, 63, 83
See application file for complete search history.

(56) References Cited

U.S. PATENT DOCUMENTS 8,864,304 B2 * 10/2014 Jacobs et al. ................... 351/49

*Primary Examiner* — Hung Dang
(74) *Attorney, Agent, or Firm* — Lucas & Mercanti, LLP; Donald C. Lucas

(57) ABSTRACT

An electrically controlled spectacle includes a spectacle frame and optoelectronic lenses housed in the frame. The lenses include a left lens and a right lens, each of the optoelectrical lenses having a plurality of states, wherein the state of the left lens is independent of the state of the right lens. The electrically controlled spectacle also includes a control unit housed in the frame, the control unit being adapted to control the state of each of the lenses independently.

16 Claims, 30 Drawing Sheets

Related U.S. Application Data filed on Oct. 30, 2007, now Pat. No. 7,508,485, and a continuation-in-part of application No. 11/373,702, filed on Mar. 10, 2006, now Pat. No. 7,405,801, said application No. 11/928,152 is a continuation-in-part of application No. 11/372,723, filed on Mar. 10, 2006, now Pat. No. 7,522,257, which is a continuation-in-part of application No. 10/054,607, filed on Jan. 22, 2002, now Pat. No. 7,030,902.

(60) Provisional application No. 60/664,369, filed on Mar. 23, 2005, provisional application No. 60/263,498, filed on Jan. 23, 2001, provisional application No. 60/661,847, filed on Mar. 15, 2005.

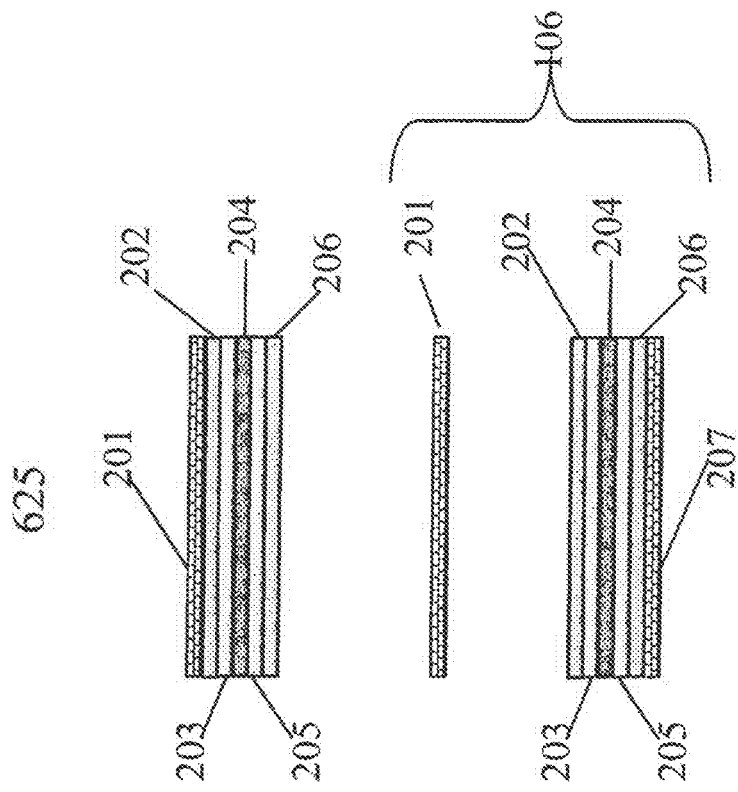
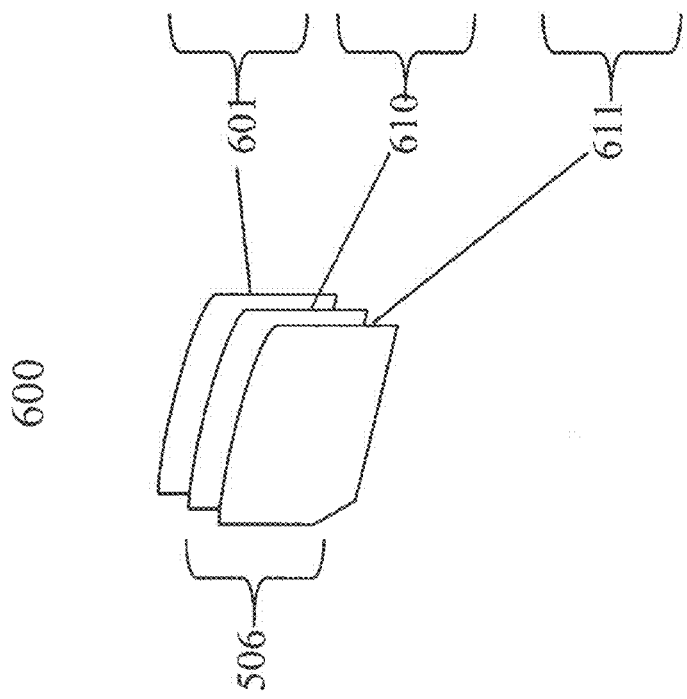
FIG 6a
FIG 6b

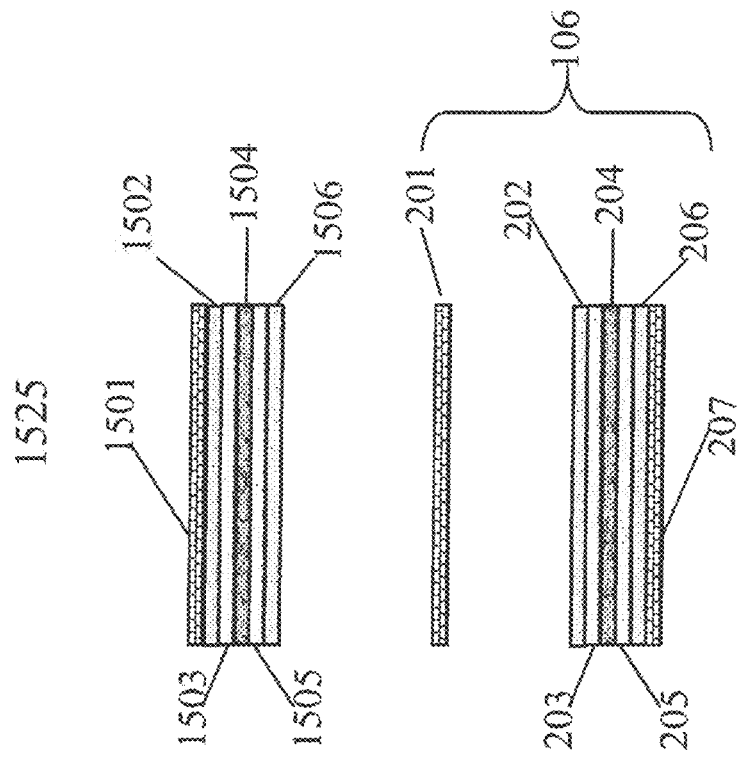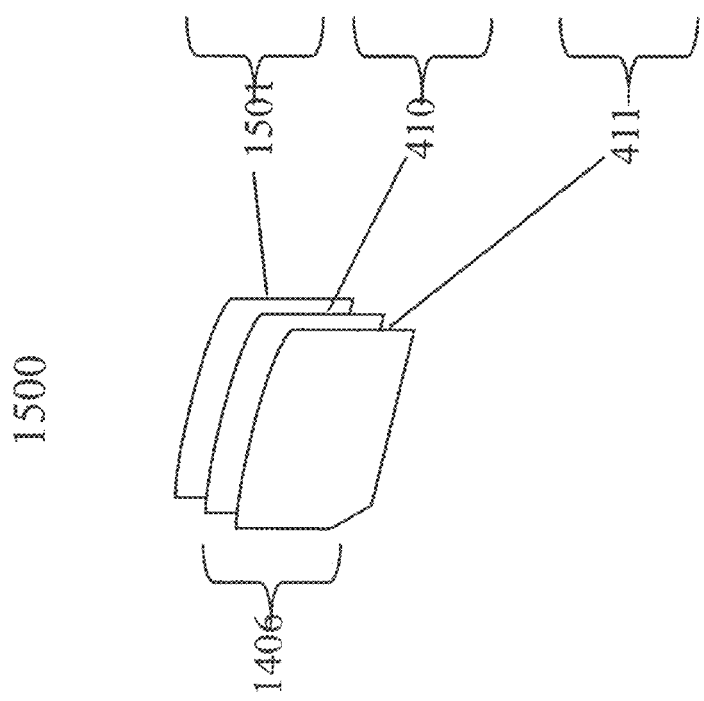

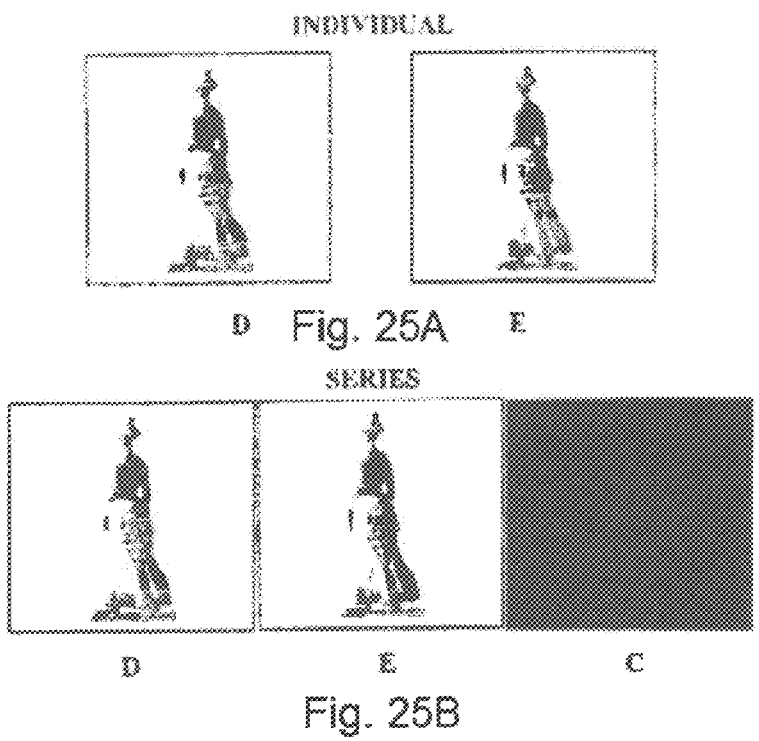
Fig. 25A
Fig. 25B
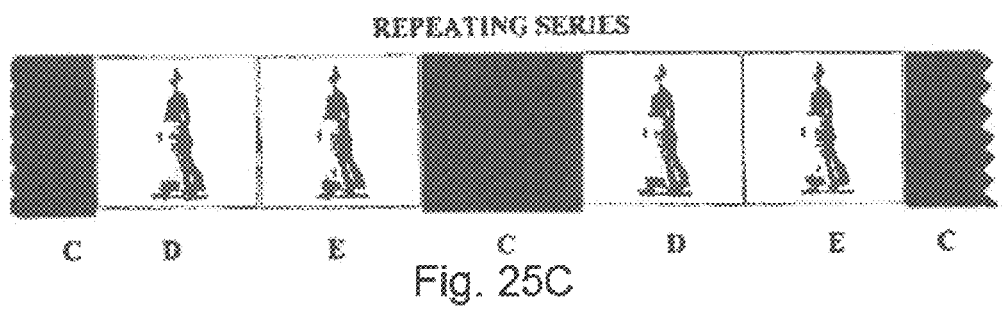
Fig. 25C

FASTER STATE TRANSITIONING FOR CONTINUOUS ADJUSTABLE 3DEEPS FILTER SPECTACLES USING MULTI-LAYERED VARIABLE TINT MATERIALS

CROSS REFERENCE OF RELATED APPLICATIONS

This Application is a Continuation of U.S. patent application Ser. No. 14/155,505 filed Jan. 15, 2014, now U.S. Pat. No. 8,864,304, which is a Continuation of U.S. patent application Ser. No. 13/746,393, now U.S. Pat. No. 8,757,438, filed on Jan. 22, 2013, which is a Continuation of U.S. patent application Ser. No. 12/938,495, filed Nov. 3, 2010, now abandoned, which was a Divisional Application of U.S. patent application Ser. No. 12/555,545, now U.S. Pat. No. 7,850,304, filed on Sep. 8, 2009, which is a Continuation-in-part Application of U.S. patent application Ser. No. 12/274,752, now U.S. Pat. No. 7,604,348, filed on Nov. 20, 2008, which is in turn a Continuation-In-Part Application of U.S. patent application Ser. No. 11/928,152, now U.S. Pat. No. 7,508,485, filed on Oct. 30, 2007. U.S. patent application Ser. No. 12/274,752 is also a Continuation-In-Part Application of U.S. Patent Application Ser. No. 11/373,702 now U.S. Pat. No. 7,405,801, filed on Mar. 10, 2006. U.S. patent application Ser. No. 11/928,152 is also a Continuation-In-Part Application of U.S. patent application Ser. No. 11/372,723, now U.S. Pat. No. 7,522,257 filed on Mar. 10, 2006, which claims priority of U.S. Provisional application No. 60/664,369 filed on Mar. 23, 2005 and is a Continuation-in-part of the U.S. application Ser. No. 10/054,607, now U.S. Pat. No. 7,030,902, filed on Jan. 22, 2002, which in turn claims priority of U.S. Provisional application No. 60/263,498, filed on Jan. 23, 2001. The based applications, U.S. patent application Ser. Nos. 11/928,152 and 11/372,723, also claim priority of U.S. patent application Ser. No. 11/373,702, filed Mar. 10, 2006, which claims priority of U.S. Provisional Application No. 60/661,847, filed on Mar. 15, 2005. The entire contents of each of the above Applications are being herein incorporated by reference for all purposes.

TECHNICAL FIELD

This invention relates to the field of motion pictures and to a system called 3Deeps that will allow almost any motion picture filmed in 2D (single image) to be viewed with the visual effect of 3-dimensions when viewed through 3Deeps Filter Spectacles. More specifically, the invention relates to the presentation of motion pictures and to the use of multiple layers of electronically controlled variable tint materials to fabricate the right and left lenses of the 3Deeps Filter Spectacle to achieve faster transition times than may be achieved by the use of only a single layer.

BACKGROUND OF THE INVENTION

This invention directs to Continuous Adjustable 3Deeps Filter spectacles for viewing 2D movies as 3D movies. Previously, related patent applications for Continuous Adjustable 3Deeps Filter spectacles have been disclosed that use electronically controlled variable tint materials for fabrication of the right and left lenses of the viewing spectacles. Generally, electronically controlled variable tint materials change the light transmission properties of the material in response to voltage applied across the material, and include but are not limited to electrochromic devices, suspended particle devices, and polymer dispersed liquid crystal devices. Such material provides precise electronic control over the amount of light transmission.

3Deeps spectacles adjust the optical properties so that the left and right lenses of the 3Deeps spectacles take on one of 3 states in synchronization to lateral motion occurring within the movie; a clear-clear state (clear left lens and clear right lens) when there is no lateral motion in successive frames of the motion picture; a clear-darkened state when there is left-to-right lateral motion in successive frame of the motion picture; and, a darkened-clear state when there is right-to-left lateral motion in successive frames of the motion picture.

We note that 'clear' is a relative term and even 'clear' glass will block a small percentage of light transmission. A clear lens is then one that transmits almost all light through the material.

Continuous Adjustable 3Deeps Filter spectacles are improved 3Deeps spectacles in that the darkened state continuously changes to take an optical density to provide the maximum Pulfrich stereoscopic 3D illusion optimized for (a) the speed and direction of lateral motion, and (b) the transition time of the electrochromic material from which the lenses are fabricated.

The problem addressed by the preferred embodiment of this invention is that of slow transition time when transitioning between different optical densities of the lenses of the Continuous Adjustable 3Deeps Filter spectacles. Optimal control of Continuous Adjustable 3Deeps Filter spectacles is achieved by adjusting the right- and left-lenses to the optimal optical density synchronized to maximize the 3D effect of the Pulfrich illusion between frames of the motion picture with respect to the transition time properties of the electrochromic material. As an example, a movie that is shown on a 100 Hz digital TV may require as many as 100 different optical density controlled lens transitions per second to optimally synchronize to the speed and direction of lateral motion in the motion picture. Most often the transitions in synchronization to the movie are small minor adjustments to the optical density of the lens that can be accomplished in the allotted time. A problem arises when 3Deeps Filter spectacles are fabricated from electronically controlled variable tint materials that are incapable of the 'fast' transition times that are sometimes required as for instance between scene changes. While electronically controlled variable tint materials may be able to achieve fast transitions from one optical density state to another optical density state that are 'near' or 'close' to each other, it may be incapable of transition between optical density states that are far apart. However, faster transition times using any electronically controlled variable tint material can be achieved by the simple expedient of using 2 or more layers—or multi-layers—of such material. Using multiple layers of material does result in a darker clear state, but the difference is minimal and barely perceptible, so the tradeoff between a slightly darker clear state and faster transition time is considered and warranted.

Another problem relates to the 'cycle life' (number of clear-dark cycles before failure) of some optoelectronic materials that may be limited. The 'cycle life' may be increased by using multiple layers of optoelectronic materials since the electric potential applied to the material to achieve a target optical density will be for a shorter period of time.

Another problem addressed by an alternate embodiment of this invention is that different methods of 3D require distinct viewing spectacles. However, with electronically controlled viewing spectacles, a single viewing spectacle can be switch selectable for different optical effects. For instance, to view a 3D movie that uses the anaglyph method to achieve 3D stereoscopy requires use of a different pair of spectacles (red-blue lenses) than that used for 3Deeps viewing. Other preferred embodiments of the invention relate to multi-use of the spectacles. The use of multi-layers of electronically controlled variable tint materials where different layers relate to different viewing methods, allow a single spectacle to be selectable to achieve different optical effects. For instance, while one or more layers of electronically controlled variable tint materials may be used for Continuous Adjustable 3Deeps Filter spectacles, another layer of materials may be used for anaglyph 3D spectacles. This would extend the use of a single pair spectacles so it can be selectively used for either Continuous Adjustable 3Deeps Filter spectacles viewing of 2D filmed movies or for anaglyph viewing of 3D filmed movies. It would also allow switching within any motion picture between 2D and 3D for a specific method, and/or switching within any motion picture between different methods of 3D. Till now a 3D motion picture may have been filmed in its entirety as anaglyph. With this invention the motion picture could have been filmed in part 2D with the multi-layer specs then set by signalization to a clear-clear state, and another part of the motion picture could have been filmed in 3D anaglyph with the multi-layer spectacles then set by signalization to a red-blue state. In another embodiment the picture may be filmed in part in 2D and 3D anaglyph, and shown to viewers in 2D, 3D using 3Deeps spectacle, and 3D anaglyph with the spectacles set accordingly.

\* \* \*

Movies are generally made from a series of single, non-repetitive pictures which are viewed at a speed that provides the viewer with the appearance of continuous movement. These series of single pictures are positioned in adjacent picture frames, in sequential order, wherein adjacent pictures are substantially similar to each other and vary only slightly from each other. Usually, movies are created using movie cameras, which capture the actual movement of the object; with animated movies, a series of individual pictures or cells are created, usually by hand or computer, and assembled in sequential order where adjacent pictures of a scene are substantially similar to each other and vary only slightly. Standard film projection is 24 frames per second, American video standard NTSC is 30 f.p.s.

The appearance of continuous movement, using only two substantially similar pictures, has been accomplished in live performance by simultaneous projection of both images onto a screen, wherein one picture may be slightly off-set from the other picture as they appear on the screen, and by rotating a two-bladed propeller, wherein the propeller blades are set off from one another by 180 degrees, in front of and between the two projectors such that the two images are made to both alternate and overlap in their appearances, with both images in turn alternating with an interval of complete darkness onscreen when both projections are blocked by the spinning propeller. A viewer, using no special spectacles or visual aids, perceives a scene of limited action (with a degree of illusionary depth) that can be sustained indefinitely in any chosen direction: an evolving yet limited action appears to be happening continually without visible return-and-start-over repetition. Thus the viewer sees a visual illusion of an event impossible in actual life. Similarly, the manner in which things appear in depth are likely to be at odds, often extremely so, with the spatial character of the original photographed scene. Further, the character of movement and of depth has been made malleable in the hands of the projectionist during performance (so much so that such film-performance has been likened to a form of puppetry); the physical shifting of one of the two projections changes the visual relationship between them and thereby the character of the screen event produced. Similarly, small changes during performance in speed, placement and direction of propeller spin will cause radical changes in the visual event produced onscreen.

Other visual arts which relate to the present invention are the Pulfrich filter. For one program, titled "Bitemporal Vision: The Sea", viewers were invited to place a Pulfrich light-reducing filter before one eye to both enhance and transform the already apparent depth character of the presentation.

Limited to presentation in live performance, such unique visual phenomena as described has been transient theater. Attempts to capture the phenomena by way of video-camera recording of the screenimage have been disappointingly compromised, so that—in over 25 years of such presentation (of so-called "Nervous System Film Performances") no attempt has been made to commercialize such recordings.

SUMMARY OF THE INVENTION

A method has now been discovered for originating visual illusions of figures and spaces in continuous movement in any chosen direction using a finite number of pictures (as few as two pictures) that can be permanently stored and copied and displayed on motion picture film or electronic media. The method of the present invention entails repetitive presentation to the viewer of at least two substantially similar image pictures alternating with a third visual interval or bridging picture that is substantially dissimilar to the other substantially similar pictures in order to create the appearance of continuous, seamless and sustained directional movement.

Specifically, two or more image pictures are repetitively presented together with a bridging interval (a bridging picture) which is preferably a solid black or other solid-colored picture, but may also be a strongly contrasting image-picture readily distinguished from the two or more pictures that are substantially similar. In electronic media, the bridge-picture may simply be a timed unlit-screen pause between serial re-appearances of the two or more similar image pictures. The rolling movements of pictorial forms thus created (figures that uncannily stay in place while maintaining directional movement, and do not move into a further phase of movement until replaced by a new set of rotating units) is referred to as Eternalisms, and the process of composing such visual events is referred to as Eternalizing.

The three film or video picture-units are arranged to strike the eyes sequentially. For example, where A and B are the image pictures and C is the bridging picture, the picture units are arranged (A, B, C). This arrangement is then repeated any number of times, as a continuing "loop". The view of this continuing loop allows for the perception of a perceptual combining and sustained movement of image pictures (A, B). Naturally, if this loop is placed on a film strip, then it is arranged and repeated in a linear manner (A, B, C, A, B, C, A, B, C, A, B, C, etc.). The repetition of the sequence provides an illusion of continuous movement of the image pictures (A, B); with bridging picture (C), preferably in the form of a neutral or black frame, not consciously noticed by the viewer at all, except perhaps as a subtle flicker.

A more fluid or natural illusion of continuous movement from a finite number of image pictures is provided by using two of each of the three pictures and repeating the cycle of the pairs sequentially, or by blending adjacent pictures together on an additional picture-frame and placing the blended picture between the pictures in sequential order. The two image pictures (A, B) are now blended with each other to produce (A/B); the two image pictures are also blended with the bridging picture to produce (C/A and B/C), and then all pictures repeat in a series starting with the bridging picture (C, C/A, A, A/B, B, B/C) each blended picture being represented by the two letters with a slash therebetween). This series is repeated a plurality of times to sustain the illusion as long as desired. Repeating the sequence with additional blended frames provides more fluid illusion of continuous movement of the (optically combined) two image pictures (A, B).

Additionally, various arrangements of the pictures and the blends can be employed in the present invention and need not be the same each time. By varying the order of pictures in the sequence, the beat or rhythm of the pictures is changed. For example, A, B, C can be followed by A, A/B, B, B/C, C which in turn is followed by A, A, A/B, B, B, B, B/C, C, C, C, C, i.e. A, B, C, A, A/B, B, B/C, C, A, A, A/B, B, B, B, B/C, B/C, C, C, C, C, A, B, C, A, etc.

With A and B frames being similar images (such as a pair of normal two-eye perspective views of a three-dimensional scene from life), and frame C a contrasting frame (preferably a solid-color picture instead of an image-picture) relative to A,B, frame C acts as essentially a "bridge-interval" placed between recurrences of A,B. Any color can be used for the contrasting frame C: for example, blue, white, green; however, black is usually preferred. The contrasting frame can also be chosen from one of the colors in one of the two image pictures. For example, if one of the image pictures has a large patch of dark blue, then the color of the contrasting frame, bridging picture, may be dark blue.

Blending of the pictures is accomplished in any manner which allows for both pictures to be merged in the same picture frame. Thus, the term "blending" as used in the specification and claims can also be called superimposing, since one picture is merged with the other picture. Blending is done in a conventional manner using conventional equipment, suitably, photographic means, a computer, an optical printer, or a rear screen projection device. For animated art, the blending can be done by hand as in hand drawing or hand painting. Preferably, a computer is used. Suitable software programs include Adobe Photoshop, Media 100 and Adobe After Affects. Good results have been obtained with Media 100 from Multimedia Group Data Translations, Inc. of Marlborough, Mass., USA.

When using Media 100, suitable techniques include additive dissolving, cross-dissolving, and dissolving-fast fix and dither dissolving.

In blending the pictures, it is preferred to use 50% of one and 50% of the other. However, the blending can be done on a sliding scale, for example with three blended pictures, a sliding scale of quarters, i.e. 75% A/25% B, 50% A/50% B, 25% A/75% B. Good results have been obtained with a 50%/50% mix, i.e. a blend of 50% A/50% B.

The two image pictures, A and B, which are visually similar to each other, are preferably taken from side-by-side frame exposures from a motion picture film of an object or image or that is moving such that when one is overlaid with the other, only a slight difference is noted between the two images.

Alternatively, the two image pictures are identical except that one is off-center from the other. The direction of the off-center, e.g. up, down, right, or left, will determine which direction the series provides the appearance of movement, e.g. if image picture B is off-center from image picture A to the right of A, the series of C, C/A, A, A/B, B, B/C will have the appearance of moving from left to right. Likewise, if you reverse the order of appearance then the appearance of movement will be to the left.

More than two image pictures can be used in the invention. Likewise, more than one bridging picture can be used in the present invention. For example, four image pictures can be used along with one bridging picture. In this case, the series for the four image pictures, designated A, B, D and E, would be: C, A, B, D, E; or a 50/50 blend C, C/A, A, A/B, B, B/D, D, D/E, E, E/C; or side-by-side pairs, C, C, A, A, B, B, D, D, E, E.

The image picture need not fill the picture frame. Furthermore, more than one image picture can be employed per frame. Thus, the picture frame can contain a cluster of images and the image or images need not necessarily filling up the entire frame. Also, only portions of image pictures can be used to form the image used in the present invention.

Also, image pictures and portions of the image picture can be combined such that the combination is used as the second image picture. The portion of the image picture is offset from the first image picture when they are combined such that there is an appearance of movement. For example, a window from image picture A can be moved slightly while the background remains the same, the picture with the moved window is designated imago picture B and the two combined to create the appearance of the window moving and/or enlarging or shrinking in size. In this case, both picture A and picture B are identical except for the placement of the window in the image picture. The same can also be done by using an identical background in both image pictures and superimposing on both pictures an image which is positioned slightly different in each picture. The image could be a window, as before, of a man walking, for example.

The number of series which are put together can be finite if it is made on a length of film or infinite if it is set on a continuous cycle or loop wherein it repeats itself.

In accordance with an embodiment, an electrically controlled spectacle for viewing a video is provided. The electrically controlled spectacle includes a spectacle frame and optoelectronic lenses housed in the frame. The lenses comprise a left lens and a right lens, each of the optoelectrical lenses having a plurality of states, wherein the state of the left lens is independent of the state of the right lens. The electrically controlled spectacle also includes a control unit housed in the frame, the control unit being adapted to control the state of each of the lenses independently.

In one embodiment, each of the lenses has a dark state and a light state.

In another embodiment, when viewing a video the control unit places both the left lens and the right lens to a dark state.

In another embodiment, a method for viewing a video is provided. A user wears the electrically controlled spectacle described above, and the wearer is shown a video having dissimilar bridge frames and similar image frames.

In accordance with another embodiment, a first modified image frame is determined by removing a first portion of a selected image frame. A second modified image frame different from the first modified image frame is determined by removing a second portion of the selected image frame. A third modified image frame different from the first and second modified image frames is determined by removing a third portion of the selected image frame. A first bridge image frame different from the selected image frame and different from the first, second, and third modified image frames is determined. A second bridge image frame different from the selected image frame, different from the first, second, and third modified image frames, and different from the first bridge image frame is determined. The first bridge image frame is blended with the first modified image frame, generating a first blended image frame. The first bridge image frame is blended with the second modified image frame, generating a second blended image frame. The first bridge image frame is blended with the third modified image frame, generating a third blended image frame. The first blended image frame, the second blended image frame, and the third blended image frame are overlaid to generate an overlayed image frame. The overlayed image frame and the second bridge image frame are displayed.

In one embodiment, the first bridge image frame comprises a non-solid color.

In another embodiment, each of the optoelectronic lenses comprises a plurality of layers of optoelectronic material.

In accordance with another embodiment, a first modified image frame is determined by removing a first portion of a selected image frame. A second modified image frame different from the first modified image frame is determined by removing a second portion of the selected image frame. A third modified image frame is determined by removing a third portion of the first modified image frame. A fourth modified image frame different from the third modified image frame is determined by removing a fourth portion of the first modified image frame. A fifth modified image frame different from the third and fourth modified image frames is determined by removing a fifth portion of the first modified image frame. A sixth modified image frame is determined by removing a sixth portion of the second modified image frame. A seventh modified image frame different from the sixth modified image frame is determined by removing a seventh portion of the second modified image frame. An eighth modified image frame different from the sixth and seventh modified image frames is determined by removing an eighth portion of the second modified image frame. A first bridge image frame different from the first and second modified image frames is determined. A second bridge image frame different from the first and second modified image frames, and different from the first bridge image frame is determined. A third bridge image frame different from the first and second modified image frames, and different from the first and second bridge image frames is determined. A fourth bridge image frame different from the first and second modified image frames, and different from the first, second and third bridge image frames is determined. A first blended image frame is generated by blending the third modified image frame with the first bridge image frame. A second blended image frame is generated by blending the fourth modified image frame with the second bridge image frame. A third blended image frame is generated by blending the fifth modified image frame with the third bridge image frame. The first blended image frame, the second blended image frame, the third blended image frame, and the fourth bridge image frame are displayed. A fourth blended image frame is generated by blending the sixth modified image frame with the first bridge image frame. A fifth blended image frame is generated by blending the seventh modified image frame with the second bridge image frame. A sixth blended image frame is generated by blending the eighth modified image frame with the third bridge image frame. The fourth blended image frame, the fifth blended image frame, the sixth blended image frame, and the fourth bridge image frame are displayed.

In one embodiment, the fourth bridge image frame is solid white, and the spectacle frame comprises a sensor adapted to receive synchronization signals embedded in the video and provide the synchronization signals to the control unit.

In accordance with another embodiment, a first modified image frame is determined by removing a first portion of a selected image frame. A second modified image frame different from the first modified image frame is determined by removing a second portion of the selected image frame. A third modified image frame different from the first and second modified image frames is determined by removing a third portion of the selected image frame. A bridge image frame different from the selected image frame and different from the first, second, and third modified image frames is determined. The first modified image frame, the second modified image frame, and the third modified image frame are overlaid, to generate an overlayed image frame. The overlayed image frame and the bridge image frame are displayed.

In accordance with another embodiment, a bridge image frame that is different from a first image frame and different from a second image frame is determined, the first and second image frames being consecutive image frames in a video. A first modified image frame is determined by removing a first portion of the first image frame. A second modified image frame different from the first modified image frame is determined by removing a second portion of the first image frame. A third modified image frame different from the first and second modified image frames is determined by removing a third portion of the first image frame. The first, second, and third modified image frames are overlaid to generate a first overlayed image frame. The first overlayed image frame and the bridge image frame are displayed. A fourth modified image frame is determined by removing a fourth portion of the second image frame. A fifth modified image frame different from the fourth modified image frame is determined by removing a fifth portion of the second image frame. A sixth modified image frame different from the fourth and fifth modified image frames is determined by removing a sixth portion of the second image frame. The fourth, fifth, and sixth modified image frames are overlaid to generate a second overlayed image frame. The second overlayed image frame and the bridge image frame are displayed.

In accordance with another embodiment, a first modified image frame is determined by removing a first portion of a selected image frame. A second modified image frame different from the first modified image frame is determined by removing a second portion of the selected image frame. A third modified image frame different from the first and second modified image frames is determined by removing a third portion of the selected image frame. A first bridge image frame different from the first, second, and third modified image frames is determined. A second bridge image frame different from the first, second, and third modified image frames, and different from the first bridge image frame is determined. A third bridge image frame different from the first, second, and third modified image frames, and different from the first and second bridge image frames is determined. A fourth bridge image frame different from the first, second, and third modified image frames, and different from the first, second and third bridge image frames is determined. The first modified image frame is blended with the first bridge image frame to generate a first blended image frame. The second modified image frame is blended with the second bridge image frame to generate a second blended image frame. The third modified image frame is blended with the third bridge image frame to generate a third blended image frame. The first blended image frame, the second blended image frame, and the third blended image frame are overlaid to generate an overlayed image frame. The overlayed image frame and the fourth bridge image frame are displayed.

In one embodiment, the fourth bridge image frame is solid white, and the spectacle frame comprises a sensor adapted to receive synchronization signals embedded in the video and provide the synchronization signals to the control unit.

In accordance with another embodiment, a first modified image frame is determined by removing a first portion of a selected image frame. A second modified image frame different from the first modified image frame is determined by removing a second portion of the selected image frame. A third modified image frame is determined by removing a third portion of the first modified image frame. A fourth modified image frame different from the third modified image frame is determined by removing a fourth portion of the first modified image frame. A fifth modified image frame different from the third and fourth modified image frames is determined by removing a fifth portion of the first modified image frame. A sixth modified image frame is determined by removing a sixth portion of the second modified image frame. A seventh modified image frame different from the sixth modified image frame is determined by removing a seventh portion of the second modified image frame. An eighth modified image frame different from the sixth and seventh modified image frames is determined by removing an eighth portion of the second modified image frame. A first bridge image frame different from the first, second, third, fourth, fifth, sixth, seventh, and eight modified image frames is determined. A second bridge image frame different from the first bridge image frame and different from the first, second, third, fourth, fifth, sixth, seventh, and eight modified image frames is determined. The first bridge image frame is blended with the third modified image frame to generate a first blended image frame. The first bridge image frame is blended with the fourth modified image frame to generate a second blended image frame. The first bridge image frame is blended with the fifth modified image frame to generate a third blended image frame. The first blended image frame, the second blended image frame, and the third blended image frame are overlaid to generate a first overlayed image frame. The first overlayed image frame and the second bridge image frame are displayed. The first bridge image frame is blended with the sixth modified image frame to generate a fourth blended image frame. The first bridge image frame is blended with the seventh modified image frame to generate a fifth blended image frame. The first bridge image frame is blended with the eighth modified image frame to generate a sixth blended image frame. The fourth blended image frame, the fifth blended image frame, and the sixth blended image frame are overlaid to generate a second overlayed image frame. The second overlayed image frame and the second bridge image frame are displayed.

In one embodiment, the first bridge image frame comprises a non-solid color.

In accordance with another embodiment, one or more of the following actions may be performed in performing one or more of the methods described above: generating a blended image frame by blending a plurality of image frames, generating a combined image frame by combining a plurality of image frames, generating a combined image sequence by combining a plurality of image sequences, generating one or more doubled image frames by doubling one or more image frames, generating an overlayed image frame by overlaying a plurality of image frames, generating a modified image frame by removing a portion of an image frame, repeating one of an image frame or a series of image frames, generating a sequence of image frames, generating a collage based on one or more portions of one or more image frames, stitching together one or more portions of one or more image frames, superimposing a first image frame on a second image frame, determining a transitional frame, inserting and/or lifting a portion of a first image frame into a second image frame, reshaping a portion of an image frame, and relocating a portion of an image frame.

Many advantages, features, and applications of the invention will be apparent from the following detailed description of the invention that is provided in connection with the accompanying drawings.

BRIEF DESCRIPTION OF THE DRAWINGS

FIG. 6a shows a left lens of Continuous Adjustable 3Deeps Filter Spectacles fabricated from multiple layers of electrochromic material.

FIG. 6b shows details of a multiple layered electrochromic device for fabricating the electronically controlled variable tint material of the right and left lenses of the Continuous Adjustable 3Deeps Filter Spectacles.

FIG. 15a shows a left lens of Multi-Use Electrically Controlled Continuous Adjustable 3Deeps Filter Spectacles fabricated from multiple layers of electrochromic materials.

FIG. 15b shows details of a Multi-Use electrochromic device for fabricating the electronically controlled variable tint material of the right and left lenses of the Multi-Use Electrically Controlled 3Deeps Continuous Adjustable 3Deeps Filter Spectacles using multi-layered lenses.

FIGS. 25 a-25 c illustrates the same women in two different perspectives (not apparent to normal viewing as pictured here), joined to create an Eternalism.

DETAILED DESCRIPTION OF THE INVENTION

Figure 1:
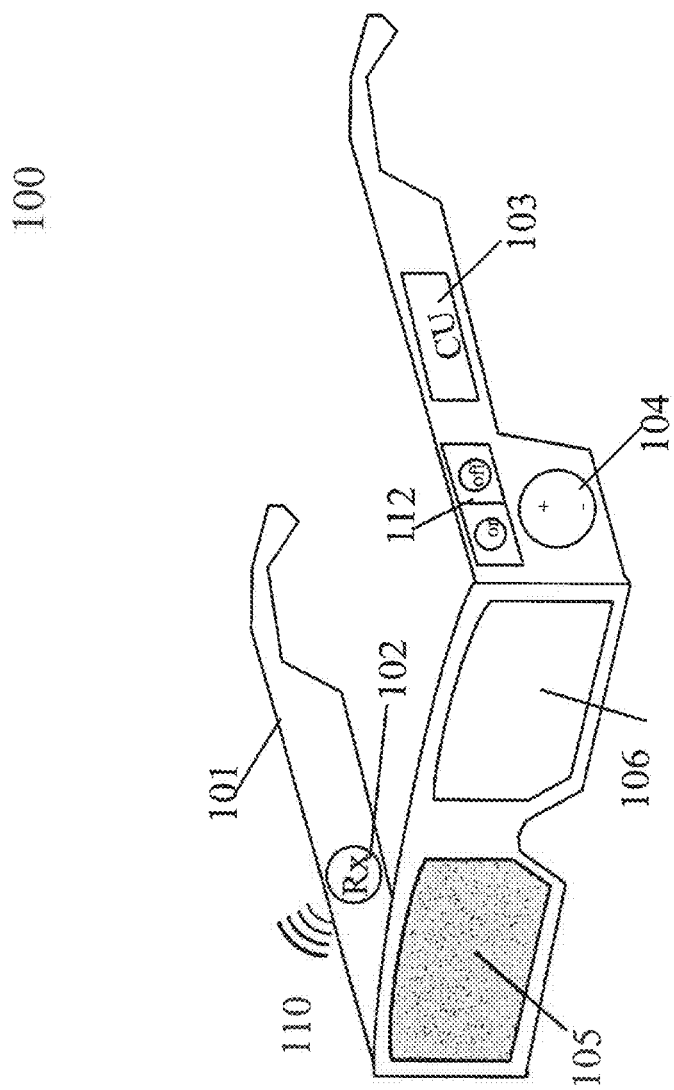
FIG. 1 is a perspective view of the preferred embodiment of the Continuous Adjustable 3Deeps Filter Spectacles.

References will now be made in detail to the preferred embodiments of the invention, examples of which are illustrated in the accompanying drawings. Wherever possible, the same reference numbers will be used throughout the drawings to refer to the same or like parts.

To help understand the invention the following summary of inventive work from the previous related patent disclosures is provided. The purpose of this section then is to explain the ground that has been covered in previous related patents and then identify the problems that this current patent application addresses and solves.

The Pulfrich Illusion

There is a well-studied stereoscopic illusion called the Pulfrich illusion in which the illusion of 3D is invoked by differentially shading the left and right eye. Anyone watching TV through special viewing glasses can see the illusion. One way to construct the special Pulfrich viewing glasses is to take sunglasses and remove the left lens, so that the left eye views the TV screen unobstructed and the right eye views the TV screen through the darkened sunglass lens. With such Pulfrich viewing spectacles ail screen motion from left-to-right will be in 3D. The illusion is based on basic eye mechanics—the shaded lens causes the eye to send the image to the brain later than unshaded eye. If the time difference is 1/10 second than on a 100 Hz digital TV the difference is 10 screen images, which is enough to produce a vivid illusion of 3D in the presence of moderate lateral motion. The image processing part of the brain puts the two disparate images together as depth. This is a pure optical illusion that has nothing to do with how a motion picture is filmed.

The Pulfrich illusion has been used for more than 50 years to produce 3D movies, using cardboard viewing spectacles with a clear left lens and dark transparent right lens. Pulfrich 3D motion pictures have been produced including such offerings as the 1971 feature length movie "I, Monster" Starring Christopher Lee as well as selected scenes from the 1997 second season finale of the network TV sitcom "Third Rock From The Sun". However there is a problem in that the special Pulfrich viewing glasses impose severe constraints on both the movie and viewing venue.

More specifically, the problem then is that for any special viewing spectacles with lenses of a fixed optical density, the lighting, and speed and direction of screen motion have to be in exactly proper alignment to get an optimal 3D effect that is comparable to other 3D methods such as anaglyph (blue-red viewing spectacles). That conjunction of light and motion rarely happens so Pulfrich is not considered a viable approach to 3D movies or TV. Movies made for viewing using the Pulfrich illusion are best viewed in darkened venues, and if the same movie is viewed in a brightly lit venue the illusion is diminished or may even totally disappear.

These problems could be addressed if dynamic Pulfrich viewing spectacles could be constructed that self-configured themselves to the light and motion instant in a motion picture. However, such dynamic viewing spectacles still must be totally passive to the viewer.

3Deeps Systems Proposed in the Earliest Related Patent Applications

Early solutions provided dynamic Pulfrich viewing spectacles (called 3Deeps viewing spectacles) that could be synchronized to the movies. These solutions utilized neutral optoelectronic lenses (transmissivity of visible light) that are controllable by an electric potential. The lenses could take any of three states; clear left lens and clear right lens (clear-clear) when there is no screen motion; clear left lens and dark right lens (clear-dark) when screen motion is from left to right; and, dark left lens and clear right lens (dark-clear) when the screen motion is from right to left. Wired or wireless signals (Infrared, radio, or sound) synchronized the 3Deeps viewing spectacles to the movies. These early solutions also addressed how to calculate the lateral motion between frames of a motion picture and the synchronization controllers that calculated and transmitted the motion vector information to the 3Deeps viewing spectacles. The proposed solution had significant benefits and advantages including:

Every movie ever made—without additional alteration or processing—could be viewed in 3D when wearing 3Deeps spectacles A movie could be viewed simultaneously by viewers with or without 3Deeps spectacles, and No changes are required to any broadcast standards, cinema formatting, viewing venue, or viewing monitors It should be understood, that the natural view of the world that viewer's expect of cinema is 3-dimensional, and to any movie viewer with binocular vision, it is the screen flatness of 2D that is strange and unnatural. From the earliest days of motion pictures cinematographers have used light and lateral movement as cues to help the viewer translate 2D screen flatness into their binocular vision expectations. But light and lateral motion are precisely the factors that elicit the Pulfrich illusion, so when movies are produced, cinematographers and lighting specialists stress precisely the features that the 3Deeps systems can translate into the natural sense of depth that the viewer is expecting. That is to say, since the advent of moving pictures, filmmakers have been unknowingly preparing their movies for advantageous 3D viewing using 3Deeps spectacles.

However, the early 3Deeps spectacles did not address how to calculate an optical density for the lenses of the 3Deeps spectacles that would maximize the Pulfrich stereoscopic illusion.

A Second Solution—Continuous Adjustable 3Deeps Filter Spectacles

The most recent related 3Deeps patent applications disclose how to construct better 3Deeps viewing spectacles that maximize the Pulfrich stereoscopic illusion and are referred to as Continuous Adjustable 3Deeps Filter Spectacles. To construct these improved 3Deeps viewing spectacles we utilize the body of existing knowledge about (1) the human eye retinal reaction time, and (2) the operating characteristics of the optoelectronic material of the 3Deeps lens.

Retinal Reaction Time

While each eye is stimulated by light continuously, there is a time delay called the retinal reaction time until the information is triggered and transmitted to the brain. Retinal reaction time is primarily dependent on the amount of light (brightness) that falls on the eye. For instance, in the presence of the bright light of a 'Clear Sky at noon' the retinal reaction time is about 100 milliseconds (1/10-th of a second) and the eye will trigger about every 100 milliseconds and send the image from the eye to the brain. In the presence of light from a 'Clear Sky' the retinal reaction time is slower—about 200 milliseconds. And in the presence of light that approximates a 'Night sky with a full moon' the retinal reaction time is slower still—almost 400 milliseconds. The darker is the illumination, the retinal reaction time become increasingly slower.

While the retinal reaction mechanisms are independent for each eye, in normal viewing both eyes are unobstructed and the luminance value is the same and the eyes trigger at about the same time. However, if one eye is shaded so the eyes have unequal retinal illuminance, then the two eyes will trigger at different speeds and different times. Using lens filters with different optical density shading causes this to happen and results in a difference in retinal reaction time for each eye. The difference in retinal reaction time between the two eyes is one factor in the commonly accepted explanation for the Pulfrich illusion.

The second factor is simultaneity. The brain will take two eye images and put them together in a 'simultaneous' fashion to generate the image that we perceive. Thus in normal viewing, if both eyes see the same 2D image without any filtered obstruction, the brain gets two identical images and there is no information by which the brain may infer depth. However, if one eye is differently shaded, than the eyes send two different images to the brain, and the mind places them together and interprets the two different images as depth. These two factors, retinal reaction time, and simultaneity are the two factors that explain Pulfrich illusion.

If the scene being viewed is static with no moving object, then the 'instant' image of the unshaded eye and the 'lagging image' of the shaded eye will still see the same image and the retinal reaction delay and simultaneity factors will not provide any depth information. Thus, the Pulfrich illusion does not work in the absence of motion. But if the scene being viewed has horizontal motion (also called lateral motion) then the shaded eye will see an image that is 'lagging' the instant image. In this case the 'lagging image' caused by retinal reaction delay of the shaded eye, when juxtaposed with the 'instant image' perceived by the unshaded eye will, through the mechanism of simultaneity, be reconciled by the brain as a perception of depth. This is the Pulfrich illusion.

Well-researched retinal reaction curves describing this phenomenon are available and are used by the Continuous Adjustable 3Deeps Filter Spectacles to select the optical density of the lens to maximize the Pulfrich illusion. This is done in the following exemplary manner. First we measure the ambient light optical density and use that with the retinal reaction curve to get the retinal delay for the eye viewing through the 'clear' lens. We then use the direction of lateral motion to determine which of the right and left lenses is clear (with the other lens the dark lens.) If the lateral motion is from the left-to-right direction on the screen then the 'clear' lens of the Continuous Adjustable 3Deeps Filter Spectacles will be the left lens, and if the lateral motion is in the opposite direction then the 'clear' lens will be the right lens.

To set the optical density of the dark lens we now utilize the magnitude of the motion. As an example, if lateral motion of the major object in the frame is measured as moving at 0.25 inches per frame then it will take 10 frames to move 2.5 inches—the average inter-ocular distance. In this case the Continuous Adjustable 3Deeps Filter Spectacles use the retinal reaction curve to determine an optical density setting for the darkened lens so the motion-direction eye will see a lagging image that is 10 frames behind that of the unshielded eye. If the TV screen has a refresh rate of 100 Hz then 10 frames is precisely 100 milliseconds, so if the ambient light is that of a 'Clear Sky at noon' with a retinal reaction time of 100 milliseconds, then we would set the dark lens to have an optical density of a 'Clear Sky' which corresponds to a retinal reaction time of 200 milliseconds. Depending upon the ambient illumination, the optical density of the dark lens can always be calculated and precisely determined from the retinal reaction curve and the objective function that maximizes the Pulfrich illusion.

Once the optimal optical density values are known for the lenses of the Continuous Adjustable 3Deeps Filter Spectacles, the Operating Characteristic curve of the optoelectronic material of the lenses can be utilized to apply the correct potential to the lenses so the lenses of the viewing spectacles have the optical density so the movie is viewed with a maximal Pulfrich stereoscopic illusion.

In the most recent previous patent application Retinal reaction time is used to calculate the optimal optical density value (a first optimization) and the operating characteristic curve is used for control over the lenses of the Continuous Adjustable 3Deeps Filter Spectacles (a second optimization). However, other problems are not address and are the subject of this pending patent application.

Problems Addressed by this Patent Application

There is a problem that many optoelectronic materials often do not change state instantaneously. While frame-to-frame display of a motion picture may be 100 Hz (100 frames a second or 10 milliseconds per frame) a typical optoelectronic material made from electrochromic material may have a 'slow' response time and take several seconds to change from a clear state to a much darker state. A second problem may relate to a limited 'cycle life' (number of clear-dark cycles) of some optoelectronic materials that may be limited. Both of these problems can be addressed by using multiple layers of optoelectronic material in fabricating the lenses of the Continuous Adjustable 3Deeps Filter Spectacles, and this patent discloses how to implement such a solution. Both problems relate to the viewing spectacle side of the solution that implements the already independently calculated optical density that maximizes the 3D Pulfrich stereoscopic illusion.

Now, before providing the detailed description of the invention, some additional pertinent background is provided.

A. Variable Tint and Optoelectronic Devices

Optoelectronic devices (or materials) that control the transmission of light through the device may be referred to as a variable tint device or variable tint material. Neutral variable tint devices reduce the transmission of light approximately equally along the entire spectrum of visible light and thus do not noticeably distort, color. Other variable tint, devices may allow transmission of light in a restricted spectrum of visible light and block light outside the restricted range, such as blue variable tint devices that allows the passage of light in the blue spectrum ($\lambda$~490-450 nm). Devices that control properties of light other than the transmission of light through the medium will be referred to simply as optoelectronic devices.

B. Methods of Producing 3-D Illusion in Moving Pictures

Motion pictures are images in 2-dimensions. However, several methods have been developed for providing the illusion of depth in motion pictures. These include the Anaglyph, Intru3D (also called ColorCode 3D), IMAX (Polaroid), shutter glasses and Pulfrich 3-dimensional illusions.

Anaglyph 3-Dimensional Illusion

"Anaglyph" refers to the red/blue (red/cyan or red/green) glasses that are used in comic books and in cereal packets etc. The glasses consist of nothing more than one piece of transparent blue plastic and one piece of transparent red plastic. These glasses are easy to manufacture and have been around since the 1920s.

An anaglyph stereo picture starts as a normal stereo pair of images, two images of the same scene, shot from slightly different positions. One image is then made all green/blue and the other is made all red, the two are then seen together.

When the image is viewed through the glasses the red parts are seen by one eye and the other sees the green/blue parts. The visual cortex of the brain fuses this into perception of a three-dimensional scene or composition. This effect is fairly simple to do with photography, and extremely easy to do on a PC, and it can even be hand-drawn. The main limitation of this technique is that because the color is used in this way, the true color content of the image is usually lost and the resulting images are usually in black and white. As the colors compete for dominance they may appear unstable and monochromatic. A few images can retain a resemblance to their original color content, but the photographer has to be very selective with color and picture content.

Intru3D—Intel

Intel's Intru3D uses the ColorCode 3D method that is an update to the more familiar Anaglyph method of 3D stereoscopy. It is similar to the Anaglyph method of stereoscopy but rather than make one image green/blue and the other image red, Intru3D records the two images as amber and blue. This provides generally truer color than typical Red/Blue anaglyphs, particularly where Red image components are concerned.

IMAX (Polaroid) 3-Dimensional Illusion

IMAX creates the illusion of 3-dimensional depth by recording the motion pictures on two separate rolls of film with two camera lenses to represent the left and right eyes. These lenses are separated by an interocular distance of about 2.5 in., the average distance between a human's eyes. By recording on two separate rolls of film for the left and right eyes, and then projecting them simultaneously, IMAX can create a 3-Dimensional illusion for viewers.

IMAX uses either of two different methods to create the 3D illusion in the theatre. The first method relies on polarization. During projection, the left eye image is polarized in one direction and the right eye image polarized perpendicular to the left eye image as they are projected on the IMAX screen. By wearing special viewing glasses with lenses polarized in their respective directions to match the projection, the left eye image can be viewed only by the left eye since the polarization of the left lens will cancel out that of the right eye projection, and the right eye image can be viewed only by the right eye since the polarization of the right lens will cancel out that of the left eye projection.

IMAX also uses another method—shutter glasses—for 3D viewing. This method of 3D projection involves the use of LCD shutter glasses that use similarly polarized lenses for both eyes. The left and right eye images are projected on the viewing screen in alternate frames. These LCD shutter glasses are synchronized to the projector. The projector displays the left and right images that are momentarily viewed by the appropriate eye by allowing that LCD lens to become transparent while the other remains opaque. That is when the left eye frame is projected on the screen, the left lens of the shutter glasses becomes transparent and the right lens of the shutter glasses becomes opaque. When the next frame is projected on the screen—a frame for the right eye—the left lens becomes opaque and the right lens becomes transparent.

In both the IMAX 3D systems only the correct eye is allowed to view the correct image while the other eye is 'blinded'. The 'transparent' state is actually quite dark, and occludes about 35% of the projected light to the viewing eye while the non-viewing eye is supposed to view no image at all.

Shutter Glasses

Different formulations of shutter glasses have been implemented over the last few decades, but without much large-scale commercial success. A shutter glasses solution generally require two images for each image of video, with shutter covering or uncovering each eye of the viewer. This allows one eye to see, than the other, with the shutters timed and synchronized with the video so that each eye only sees the image intended for it.

Some shutter glass systems are wired to a control device while some shutter glass systems use wireless infrared signaling to control the state of the lenses.

CrystalEyes is the name of a stereoscopic viewing product produced by the StereoGraphics Corporation of San Rafael, Calif. They are lightweight, wireless liquid crystal shuttering eyewear that are used to allow the user to view alternating field sequential stereo images. The source of the images alternately displays a left-eye view followed by a right-eye view. CrystalEyes' shutters can block either of the user's eyes so that only images appropriate for each eye are allowed to pass. A wireless infrared communications link synchronizes the shuttering of the eyewear to the images displayed on the monitor or other viewing screen. CrystalEyes shutter glasses, weight only 3.3 ounces, use two 3V lithium/manganese dioxide batteries, and have a battery life of 250 hours. This demonstrates the robustness and potential of any viewer glass solution.

Because shutter glasses only expose each eye to every other frame, the refresh rate of the video is effectively cut in half. On a TV with refresh rates of 30 frames per second (for an NTSC TV) or 25 frames per second (for a PAL TV), this is hard on the eyes because of the continual flicker. This problem is eliminated with higher refresh rates, such as on PC monitors.

C. Electronically Controlled Variable Tint Materials

Numerous materials have been identified that have the property that the transmission of light through the material can be controlled by the application of an electronic voltage or potential across the material. These include the classes of materials typically named electrochromic, suspended particle and polymer dispersed liquid crystal devices. Within each class of electronically controlled variable tint material there are numerous formularies. Other classes of materials may be found in the future. Any material for which the transmission of light or other optical property of light can be controlled by an electronic potential may be utilized in the invention.

Electrochromic Devices (EDs)

Electrochromic devices change light transmission properties in response to voltage and thus allow control of the amount of light passing through the material. A burst of electricity is required for changing the tint of the material, but once the change has been occurred, no electricity is needed for maintaining the particular shade that has been reached. Electrochromic materials provide visibility even in the darkened state, and thus preserves visible contact with the outside environment. It has been used in small-scale applications such as rearview mirrors. Electrochromic technology also finds use in indoor applications, for example, for protection of objects under the glass of museum display cases and picture frame glass from the damaging effects of the UV and visible wavelengths of artificial light. Recent advances in electrochromic materials pertaining to transition-metal hydride electrochromics have led to the development of reflective hydrides, which become reflective rather than absorbing, and thus switch states between transparent and mirror-like.

Suspended Particle Devices (SPDs)

In suspended particle devices (SPDs), a thin film laminate of rod-like particles suspended in a fluid is placed between two glass or plastic layers, or attached to one layer. When no voltage is applied, the suspended particles are arranged in random orientations and tend to absorb light, so that the glass panel looks dark (or opaque), blue or, in more recent developments, gray or black color. When voltage is applied, the suspended particles align and let light pass. SPDs can be dimmed, and allow instant control of the amount of light and heat passing through. A small but constant electrical current is required for keeping the SPD in its transparent stage.

Polymer Dispersed Liquid Crystal Devices (PDLCs)

In polymer dispersed liquid crystal devices (PDLCs), liquid crystals are dissolved or dispersed into a liquid polymer followed by solidification or curing of the polymer. During the change of the polymer from a liquid to solid, the liquid crystals become incompatible with the solid polymer and form droplets throughout the solid polymer. The curing conditions affect the size of the droplets that in turn affect the final operating properties of the variable tint material. Typically, the liquid mix of polymer and liquid crystals is placed between two layers of glass or plastic that include a thin layer of a transparent, conductive material followed by curing of the polymer, thereby forming the basic sandwich structure of the smart window. This structure is in effect a capacitor. Electrodes from a power supply are attached to the transparent electrodes. With no applied voltage, the liquid crystals are randomly arranged in the droplets, resulting in scattering of light as it passes through the smart window assembly. This results in the translucent, "milky white" appearance. When a voltage is applied to the electrodes, the electric field formed between the two transparent electrodes on the glass cause the liquid crystals to align, thereby allowing light to pass through the droplets with very little scattering, resulting in a transparent state. The degree of transparency can be controlled by the applied voltage. This is possible because at lower voltages, only a few of the liquid crystals are able to be aligned completely in the electric field, so only a small portion of the light passes through while most of the light is scattered. As the voltage is increased, fewer liquid crystals remain out of alignment thus resulting in less light being scattered. It is also possible to control the amount of light and heat passing through when tints and special inner layers are used. Most of the devices offered today operate in on or off states only, even though the technology to provide for variable levels of transparency is easily applied. This technology has been used in interior and exterior settings for privacy control (for example conference rooms, intensive-care areas, bathroom/shower doors) and as a temporary projection screen. A new generation of switchable film and glass called 3G Switchable Film is available from Scienstry, using a non-linear technology to increase transparency, lower the required driving voltage and extend the lifetime.

A First Preferred Embodiment of the Invention

FIG. 1 is a perspective view 100 of the preferred embodiment of the Continuous Adjustable 3Deeps Filter Spectacles. It is comprised of a frame 101 that is used as the housing for the lenses and control circuitry. Such frames are a well-known means by which lenses can be fixed before a person's eyes for viewing. On the frame 101 is battery device 104 to power all circuitry of the Continuous Adjustable 3Deeps Filter Spectacles. Also, on the frame 101 is a receiver 102 labeled 'Rx' that is powered by the battery 104. The receiver 102 has apparatus to receive radio-frequency (RF) 110 waves with synchronization and control information used to control the Continuous Adjustable 3Deeps Filter Spectacles. Such receivers are well known in the art of electronics. Also on the frame 101 is a control unit 103 powered by the battery 104 that transforms the continuing optical density signals into the electronic potentials used to control the optical density of each individual lens. Also on the frame 101 is an on/off switch 112 that controls whether the electronic circuits of the 3Deeps spectacles 101 receive power (on position) from the battery or not (power off). Other embodiments may replace RF communications with other communications means, including but not limited to infrared, or audio sound.

Two lenses are fixed in the frames—a right lens (from the movie viewer's vantage point) 105 and a left lens 106. In the preferred embodiment, each lens is made of an electrochromic material for which the optical density can be reliably and precisely controlled by the application of an electronic potential across the material. The lens has circuitry so that the control unit 103 can independently control the transmissivity of each lens. Other embodiment may use optoelectronic materials other than electrochromics. A second preferred embodiment of Continuous Adjustable 3Deeps Filter Spectacles using multi-layered lenses is disclosed starting in FIG. 5. A third preferred embodiment of Continuous Adjustable 3Deeps spectacles using single-layered lenses for a multi-use application is disclosed starting in FIG. 11. A fourth preferred embodiment of Continuous Adjustable 3Deeps Filter Spectacles using multi-layered lenses for a multi-use application is disclosed starting in FIG. 14.

For exemplary purposes, FIG. 1 shows the Continuous Adjustable 3Deeps Filter Spectacles in just one of the three states that the lenses can take. FIG. 1 shows the right lens 105 darkened and the left lens 106 as clear with the clear lens allowing more light transmission than the darkened lens. This is the configuration to view a motion picture with a 3-dimensional effect in which the lateral motion in the motion picture is moving from left-to-right on the viewing screen. Other embodiments of the invention may have Continuous Adjustable 3Deeps Filter Spectacles that fit over regular prescription glasses in a manner similar to that in which snap-on or clip-on sunglasses are configured. In still another embodiment the lenses of the Continuous Adjustable 3Deeps Filter Spectacles may also be 'prescription lenses' customized for the viewer vision impairments.

Also, while the preferred embodiment of the invention uses Continuous Adjustable 3Deeps Filter Spectacles that are wireless, other embodiments may use wired connections. What is required is that the Continuous Adjustable 3Deeps Filter Spectacles can receive and respond to synchronization signals from the controller, and whether that is by wired or wireless means is immaterial to the invention.

Earlier versions of 3Deeps Filter Spectacles (also called Pulfrich Filter Spectacles) have been previously described in co-pending patent applications and patents U.S. patent application Ser. Nos. 12/274,752, 11/928,152, 11/372,723, 11/372,702, and U.S. Pat. Nos. 7,030,902 and 7,218,339.

There are 3 lens settings used by the Continuous Adjustable 3Deeps Filter Spectacles. One setting is that both the right 105 and left lens 106 are clear. Neither lens is darkened. This is the lens state that is used in the preferred embodiment when there is no significant lateral motion in the motion picture. The second setting is the left lens 106 clear and the right lens 105 darkened. This is the lens state that is used in the preferred embodiment when foreground lateral motion in the motion picture is moving from the left to the right direction, as seen from the viewer's perspective. The third setting is the left lens 106 darkened and the right lens 105 clear. This is the lens state that is used in the preferred embodiment when the foreground lateral motion in the motion picture is moving from the right to the left direction, as seen from the viewer's perspective.

The lens state consisting of both left and the right lens darkened is not used by any of the 3Deeps spectacles. However, this lens state can be achieved by the Continuous Adjustable 3Deeps Filter Spectacles, and may have uses in other embodiments of the invention. In the third preferred embodiment of the invention, this lens state is used to provide an alternate use for 3Deeps viewing spectacle—sunglasses. In that embodiment, 'multi-use' 3Deeps spectacles are switch selectable as either (Use 1) 3Deeps viewing spectacles using the 3 lens settings described in the preceding paragraph for 3Deeps viewing, or (Use 2) sunglasses using the left and right lens darkening to a pre-set optical density.

In Continuous Adjustable 3Deeps Filter Spectacles, the right and left lenses of the viewing glasses may independently take a multiplicity of different levels of darkness to achieve different effects, resulting in many different lens states. In particular, the darkening of the non-clear lens can be optimized according to the speed of lateral motion and/or luminance, so as to optimize the degree of 3-dimensional effect (a first optimization). Also, the Control Unit 103 can control the electrochromic lenses so that they reach their target state in an optimal manner (a second optimization).

Various consumer-based control units may be utilized with the Continuous Adjustable 3Deeps Filter Spectacles that can both display the audio/video of the associated motion picture, as well as perform the Continuous Adjustable 3Deeps Filter Spectacles synchronization to identify 3Deeps synchronization events and issue control signals to the Continuous Adjustable 3Deeps Filter Spectacles. This includes, but is not limited to; DVD-based control units; Digital Movie Projector control units; Television-based control units; hand-held and operated control units; spectacle-based control units; software-based processing that parses compressed digital video file and uses its motion estimation information (e.g. MPEG); and, cell-phone based control units.

Figure 2:
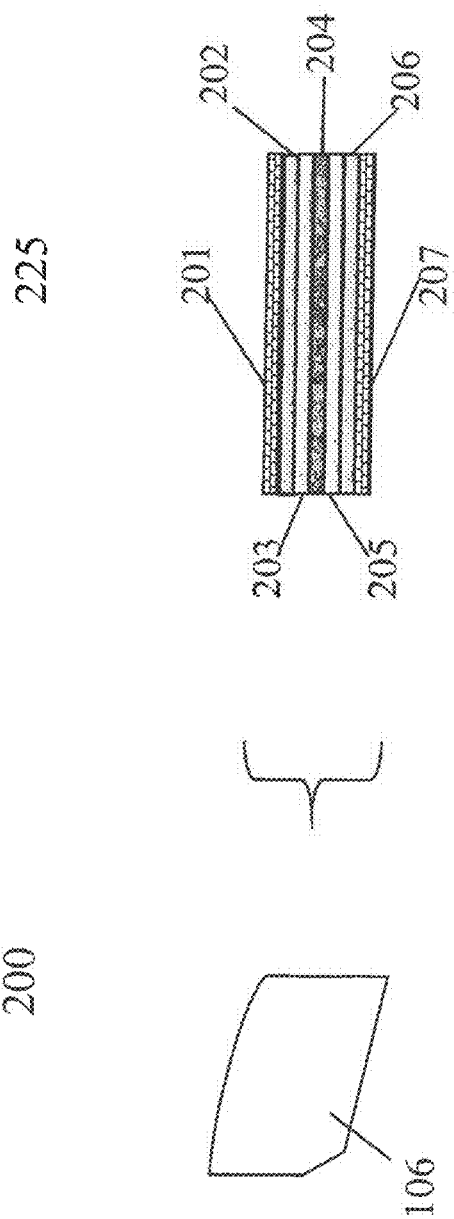
FIG. 2a shows a left lens of Continuous Adjustable 3Deeps Filter Spectacles fabricated from a single layer of electrochromic material.
FIG. 2b shows details of an electrochromic device for fabricating the electronically controlled variable tint material of the right and left lenses of the Continuous Adjustable 3Deeps Filter Spectacles.

FIG. 2a 200 shows a left lens 106 of Continuous Adjustable 3Deeps Filter Spectacles fabricated from a single layer of electrochromic material. Its fabrication using electrochromic material is shown in adjoining FIG. 2b.

FIG. 2b 225 shows the cross-sectional detail of the electrochromic device of FIG. 2a used for fabricating the electronically controlled variable tint material of the right and left lenses of the Continuous Adjustable 3Deeps Filter Spectacles. The Figure shows a typical dual-polymer electrochromic device consisting of seven layers of material. In the preferred embodiment of the invention, the right lens 105 and left lens 106 of the Continuous Adjustable 3Deeps Filter Spectacles 100 are fabricated from such material. The first layer 201 of the electrochromic material 225 is a glass, plastic (or other clear insulating material.) The second layer 202 is a conducting layer, followed by a third layer 203 of polymer. The fourth layer 204 is an electrolytic layer that depending upon the electrochromic material may be a liquid or gel. This layer provides the ion transport whose direction is determined by the application of potential across the conducting layers. The fifth layer 205 is the complementary polymer layer, followed by a sixth layer 206 of conducting material. The last layer 207 of the electrochromic is another insulting layer of glass, plastic or other clear insulating material.

While FIG. 2b 225 show a typical dual-polymer electrochromic device, as previously indicated, there are numerous such electrochromic devices, and any electrochromic may be favorably utilized in the invention. Some electrochromic devices may not have seven layers as shown in FIG. 2b. For instance, some variable tint materials may be in the form of a flexible film or laminate that can be applied to a single layer of clear glass or plastic.

Also, any electronically controlled variable tint material may be used in the invention rather than the displayed electrochromic device. Any material whose optical property of transmissivity of light may be controlled by the application of an electric potential may be favorably use to fabricate the lenses of the Continuous Adjustable 3Deeps Filter Spectacles 100.

Figure 3:
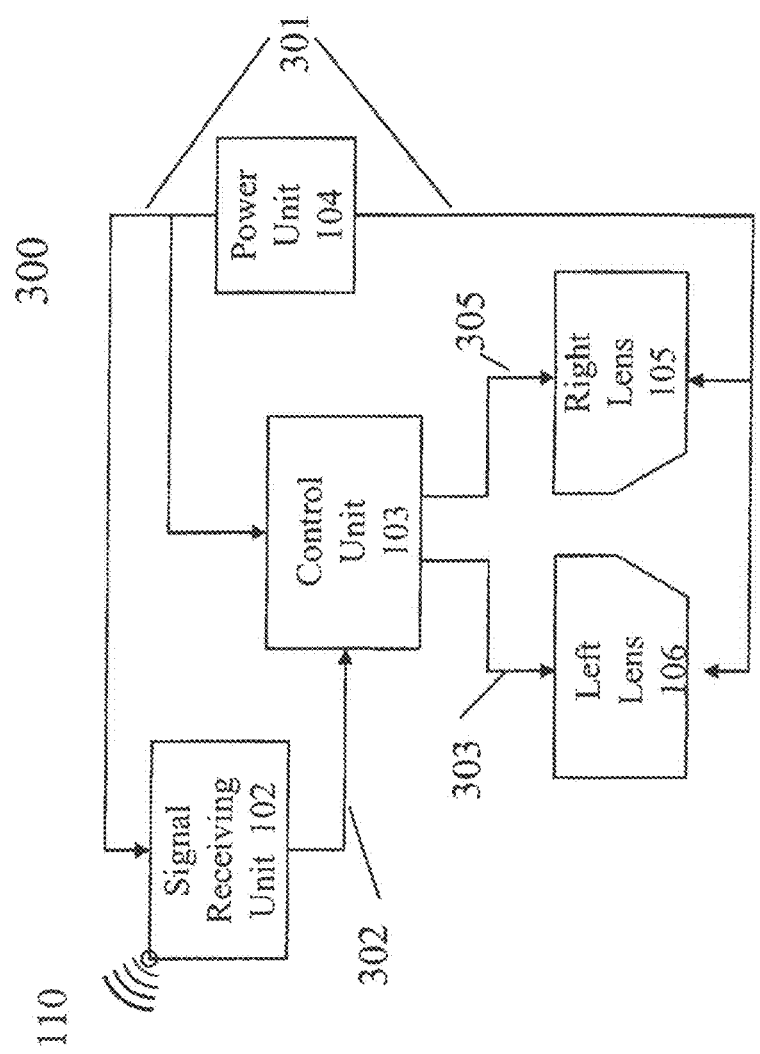
FIG. 3 is a block diagram of the operation of the Continuous Adjustable 3Deeps Filter Spectacles.

FIG. 3 is a block diagram 300 of the operation of the Continuous Adjustable 3Deeps Filter Spectacles of FIG. 1. All circuits on the Continuous Adjustable 3Deeps Filter Spectacles 101 are powered 301 by the Power Unit 104 (if the power on/off switch 112 is in the 'on' position), including the Control Unit 103, Signal Receiving Unit 102, the Left Lens 106, and the Right Lens 105. The control information 110 is received by the Signal Receiving Unit 102 and sent 302 to the Control Unit 103. The control unit 103 implements an algorithm that is specific for the lens materials used in the fabrication of the Right Lens 105 and the Left lens 106 of the Continuous Adjustable 3Deeps Filter Spectacles, and controls the Left Lens 106 over a control circuit 303, and the Right Lens over a control circuit 305.

Figure 4:
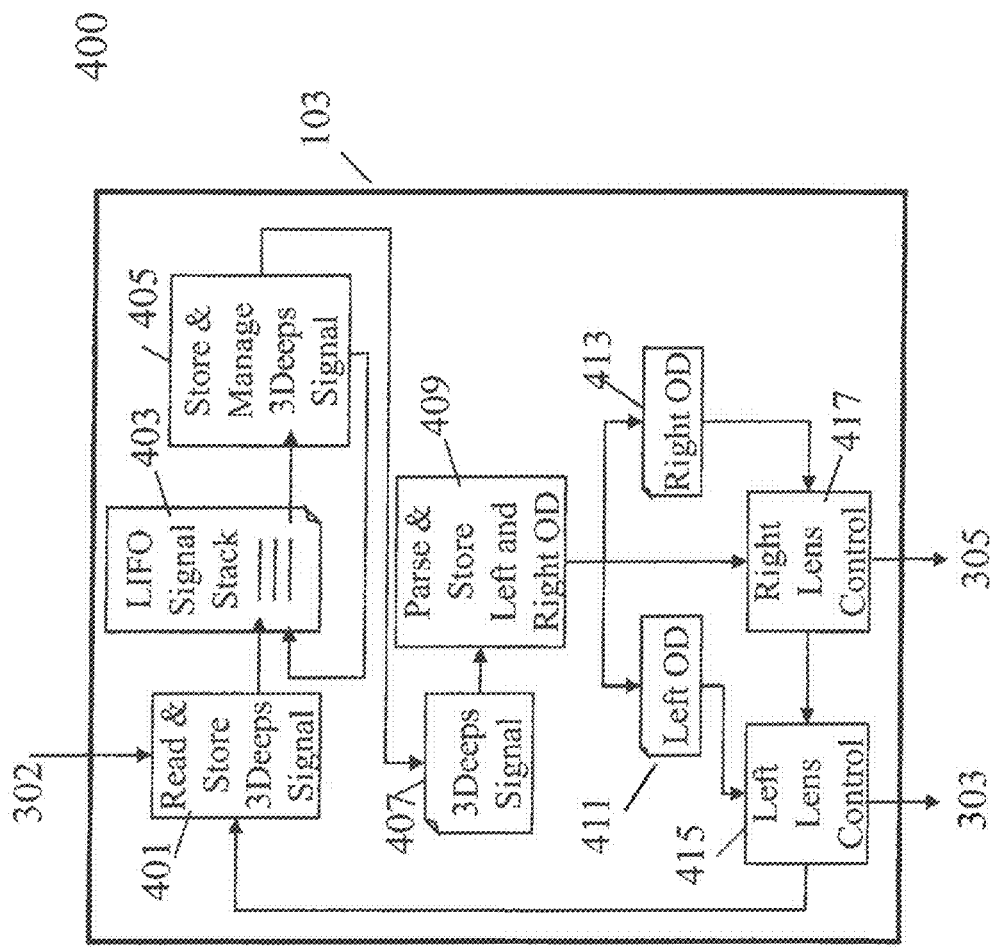
FIG. 4 is a flow chart showing the operation of the Control Unit of the Continuous Adjustable 3Deeps Filter Spectacles.

FIG. 4 is a flow chart 400 showing the operation of the Control Unit 103 of the Continuous Adjustable 3Deeps Filter Spectacles of the first preferred embodiment. The input to the Control Unit 103 is the synchronization signal 302. The output is the control signal sent to the left lens 106 over the control left lens control circuit 303, and the control signal sent to the right lens 105 over the right lens control circuit 305. The synchronization signals 302 are received and stored by the 'Read and Store 3Deeps Signal' block 401 of the Control Unit 103 and stored in a LIFO (Last In First Out) memory stack 403. Control then passes to 'Store and Manage Signal' processing 405 that 'pops' the top of the stack (read the value and eliminates it from storage) and processes the synchronization signal by storing it in a '3Deeps Signal' memory storage 407. Processing control then passes to 'Parse and Store Left and Right OD' in which the 3Deeps signal memory storage 407 is parsed and stored in the 'Left OD' value 411, and the 'Right OD' value 413. Processing then continues with the 'Right Lens Control' 417 in which the right lens value 413 is converted to an electronic signal 305 that controls the optical density of the right lens. Processing then continues with the 'Left Lens Control' 415 in which the left lens value 411 is converted to an electronic signal 303 that controls the optical density of the left lens. Processing in the Control Unit 103 then is passed back to the 'Read and Store 3Deeps Signal'

It should be understood that different control circuits might be utilized by other embodiments. For instance other embodiments may have no need for LIFO signal store and management since control of the 3Deeps spectacles is in real-time and there is no need to switch the lenses to past setting. Also, better emphasize the logical operation of the control unit some functions have not been shown. For instance, the control unit may 'cycle' at a much faster rate then the received synchronization signals resulting in an 'empty' stack. The handling of such an empty stack state is not shown in the flow diagram but would be handled as well-known in the art by detecting that the stack is empty and passing control in the Control Unit 103 back to the 'Read and Store 3Deeps Signal' state 401 rather than passing control as shown in the flow diagram 400.

Continuous Adjustable 3Deeps Filter Spectacles have great advantages. The control information 110 is spectacle-agnostic; i.e. all spectacles receive the same transmitted control information. The control unit 103 on the spectacles performs a final view-spectacle-specific optimization, translating the control information into control signals specific to the lens material used to fabricate the Continuous Adjustable 3Deeps Filter Spectacles. Two viewers sitting side-by-side and watching the same video on a digital TV but wearing Continuous Adjustable 3Deeps Filter Spectacles that have lens material with totally different characteristics, will each see the movie with an illusion of 3D optimized for their spectacles.

A Second Preferred Embodiment of the Invention

Figure 5:
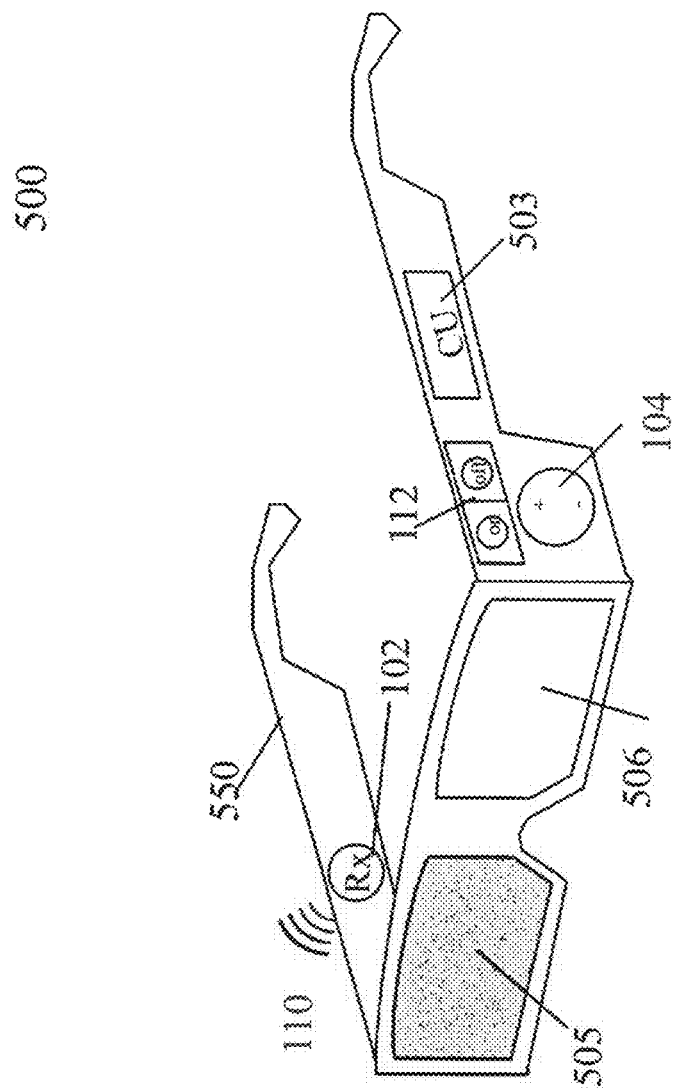
FIG. 5 is a perspective view of the second preferred embodiment of the Continuous Adjustable 3Deeps Filter Spectacles fabricated from multiple layers of electrochromic material.

FIG. 5 is a perspective view 500 of the second preferred embodiment of the Continuous Adjustable 3Deeps Filter Spectacles 550 with multi-layered lenses. The difference between FIG. 5 (multi-layered lens) and FIG. 1 (single layer lens) is in their respective right lens (505 of FIG. 5), left lens (506 of FIG. 5), and control unit (503 of FIG. 5). Like numbered items in FIG. 5 and FIG. 1 have the same function and definition. The lenses for the second preferred embodiment (505 and 506) are described in greater detail in FIGS. 6a and 6b, and the control unit for the second preferred embodiment is described in greater detail in FIG. 8.

FIG. 6a 600 shows a left lens 506 of Continuous Adjustable 3Deeps Filter Spectacles fabricated from multiple layers of electrochromic material. Its fabrication using electrochromic material is shown in adjoining FIG. 6b. Since only a single layer of insulating glass material will be required between the different layers of the multi-layered electrochromic lens, the drawing of the top layer is slightly different than that of FIG. 2a to emphasize that only one layer of such insulating material is necessary. FIG. 6a therefore shows the lens 106 as two layers where the first active layer 611 is separated by the second active layer 601 by an insulating layer 610. The first active layer 611 and the insulating layer 610 comprise the single layer lens 106 of FIG. 2a.

Figure 9:
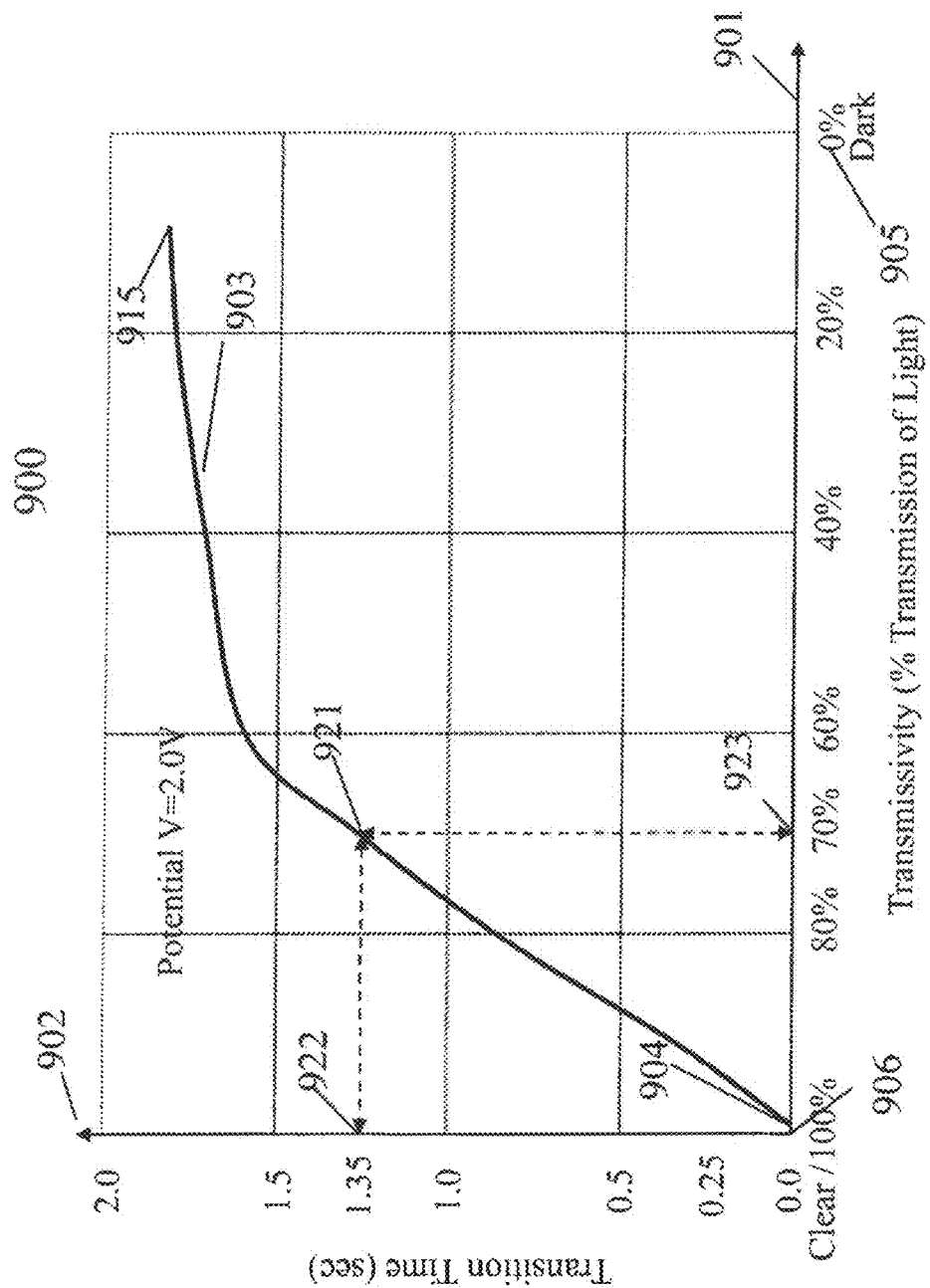
FIG. 9 is a transition time curve for a single layer of electrochromic material with transition time as a function of transmissivity.

FIG. 6b 625 shows the cross-sectional details of the multiple layered electrochromic device of FIG. 6a that is used for fabricating the electronically controlled variable tint material of the right and left lenses of the Continuous Adjustable 3Deeps Filter Spectacles. The 7 layers of the electrochromic left lens 106 of FIG. 2b are shown in FIG. 6b as the 6 active layers 611, and the (seventh) insulating layer 201. Each layer is identical to their like numbered description accompanying FIG. 2b. A second active layer 601 is included in the multi-layered electrochromic lens. In the second preferred embodiment of the invention, the second layer 601 of the lens is fabricated from identical electrochromic material as used to fabricate the first layer 611 of the left lens 506 so that each layer has the same Operating Characteristic curve 900 as shown in FIG. 9. The six layers of electrochromic material for the second layer are identical to their like numbered description accompanying FIG. 2b. Other embodiments may use electrochromic material with different material so that the two layers have different Operating Characteristic curves. Also, other embodiments may have more than 2 layers.

Figure 7:
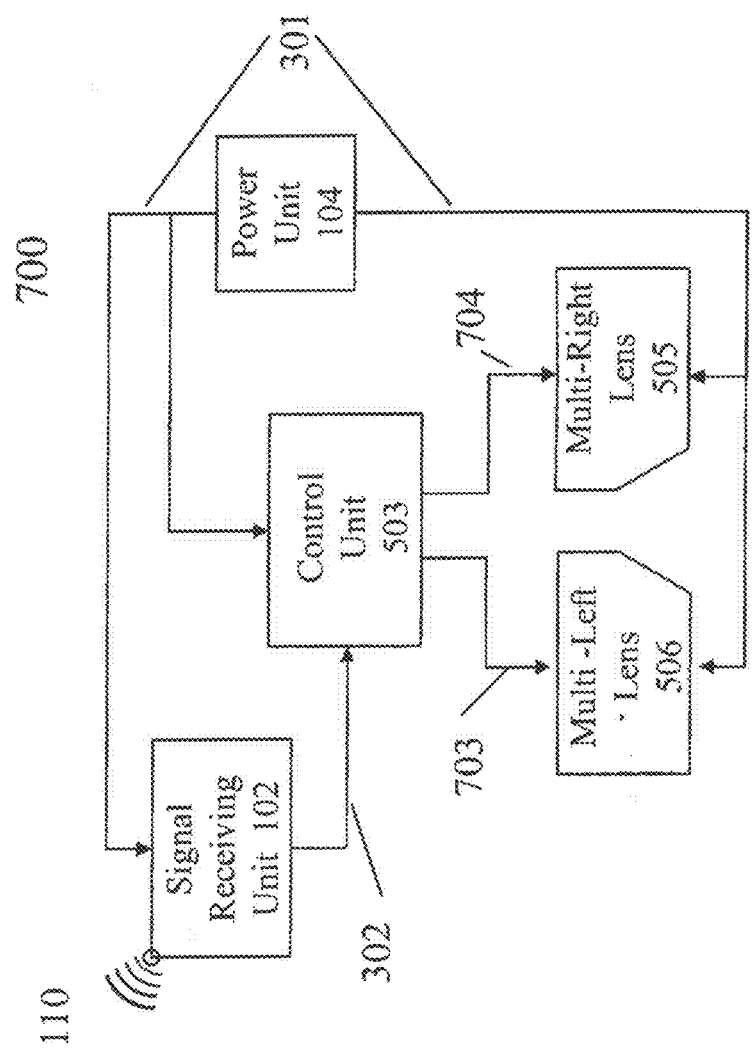
FIG. 7 is a block diagram of the operation of the Continuous Adjustable 3Deeps Filter Spectacles using a multiple layered electrochromic device for fabricating the electronically controlled variable tint material of the right and left lenses.

FIG. 7 is a block diagram 700 of the operation of the Continuous Adjustable 3Deeps Filter Spectacles of FIG. 5 using a multiple layered electrochromic device for fabricating the electronically controlled variable tint material of the right 505 and left lenses 506. All circuits on the Continuous Adjustable 3Deeps Filter Spectacles 550 are powered 301 by the battery 104, including the Control Unit 503, Signal Receiving Unit 102, the Left Lens 506, and the Right Lens 505. The control information 110 is received by the Signal Receiving Unit 102 and sent 302 to the Control Unit 503. The control unit 503 implements an algorithm that is specific for the multi-layered lens materials used in the fabrication of the Right Lens 505 and the Left lens 506 of the multi-layered Continuous Adjustable 3Deeps Filter Spectacles, and controls the Left Lens 506 with a control circuit 703, and the Right Lens 505 with a control circuit 704.

The difference between FIG. 7 (multi-layered lens) and FIG. 3 (single layer lens) is in their respective right and left lenses, control units, and control circuits. For the right lens 505 and left lens 506, the lenses are fabricated from multiple layers of electrochromic material. In the second preferred embodiment of the invention these are the same as the lens fabrication shown in FIG. 6. The control unit for the multi-layered lens 503 must control multiple layers while the control unit for the single-layered lens 103 only need control a single layer electrochromic lens. In this second preferred embodiment of the invention, both layers of the multi-layered electrochromic lens are made of the same material with the same Operating Characteristic curve and both lenses have applied to them identical voltage across each layer. However, since there are multi-layers of material, it will be shown using the Operating Characteristic curve of FIGS. 9 and 10, that to achieve a target optical density for each lens, the control unit 503 will only need apply voltage to the multi-layers for less time than for the single layer. For the control circuits, the multi-lens control circuits need to apply voltage across multiple layered assemblies, not just a single lens assembly.

Figure 8:
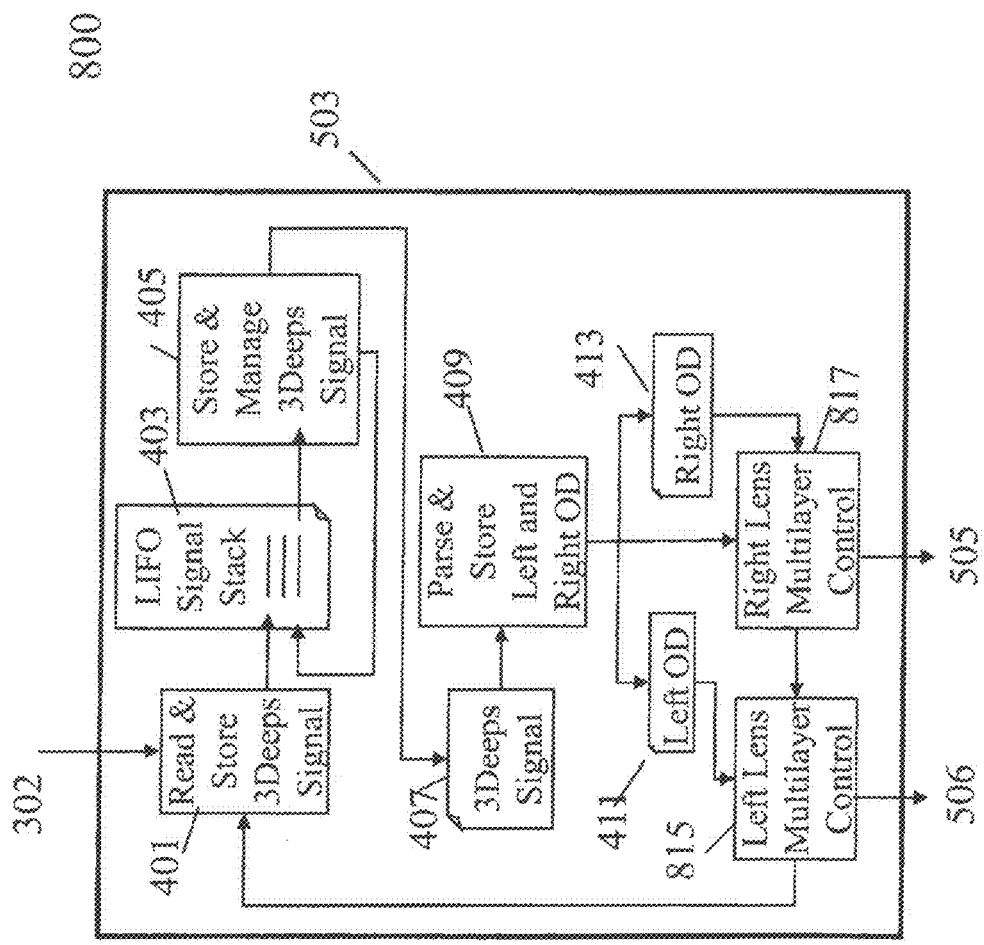
FIG. 8 is a flow chart showing the operation of the Control Unit of the Continuous Adjustable 3Deeps Filter Spectacles using a multiple layered electrochromic device for fabricating the electronically controlled variable tint material of the right and left lenses.

FIG. 8 is a flow chart 800 showing the operation of the Control Unit 503 of the Continuous Adjustable 3Deeps Filter Spectacles 550 using a multiple layered electrochromic device for fabricating the electronically controlled variable tint material of the right lens 505 and left lens 506. This flow chart 800 is very similar to the flow chart of the control unit for the Continuous Adjustable 3Deeps Filter Spectacles using a single layered electrochromic device of FIG. 4. The memory storage 'LIFO Signal Stack' 403, '3Deeps Signal' 407, 'Left OD' 411, and 'Right OD' 413 are the same as previously described for FIG. 4. The processing modules 'Read & Store 3Deeps Signal' 401, 'Store and Manage 3Deeps Signal' 405, and 'Parse and Store Left and Right OD' 409 are the same as previously described for FIG. 4. The difference between FIG. 4 and FIG. 8 is in the 'Left Lens Multilayer' circuitry 815 and the left lens 506 that the circuit controls, and in the 'Right Lens Multilayer Control' circuitry 817 and the right lens 505 that the circuit controls. In this multi-layer embodiment of the invention, the 'Left Lens Multilayer' circuitry 815 must control two layers of the electrochromic left lens 506, and the 'Right Lens Multilayer' circuitry 817 must control two layers of the electrochromic right lens 505. It will be shown later in FIGS. 9 and 10 that the target optical densities for the left lens 411 and the right lens 409 can be achieved more rapidly.

This approach has the same advantages as for single-layer Continuous Adjustable 3Deeps Filter Spectacles. The control information 110 is spectacle-agnostic; i.e. all spectacles receive the same transmitted control information. The control unit 503 on the spectacles performs a final view-spectacle-specific optimization, translating the control information into control signals specific to the multi-layered lens material used to fabricate the Continuous Adjustable 3Deeps Filter Spectacles. Two viewers sitting side-by-side and watching the same video on a digital TV but wearing Continuous Adjustable 3Deeps Filter Spectacles that have lens material with totally different characteristics, will each see the movie with an illusion of 3D optimized for their spectacles. It also has the additional advantage that since a multi-layer lens is used, the transition time between optical density states will be faster than the corresponding transition time for a single-layer lens.

The second preferred embodiment of the Optical Density Continuing Adjustable 3Deeps Filter Spectacles use electrochromic lenses. Additional detail about Electrochromism is now provided.

Electrochromism is the phenomenon displayed by some chemicals of reversibly changing color when an electric potential is applied. Electrochromism has a history dating back to the nineteenth century and there are thousands of chemical systems that have already been identified electrochromic. A narrow definition limits electrochromic devices to chemical processes for which there is a 'redox' reaction that undergo an electron uptake 'reduction' or electron release when potential is applied and the reverse or 'oxidation' with a reverse potential. Most 'redox' processes are electrochromic and are candidate electrochromes and potential 3Deeps lenses. While the preferred embodiments of this invention use such narrowly defined electrochromic devices, any device for which the transmission of light may be controlled by an electronic potential may be utilized in the invention. For instance, Liquid Crystal Device (LCD) lenses may be used in the invention since they may be controlled by an electronic potential, even though they use a totally different mechanism to control the optical properties of the material. LCDs rely on an interference effect (block the transmission of light), while the narrow definition of electrochromic device is limited to materials that rely on a 'redox' reaction to change the color of the material. Either 'redox' or LCD material, or any material for which the transmission of light may be controlled by an electronic potential can be advantageously utilized in the invention.

There are many different families of chemicals that exhibit such properties—both organic and inorganic. These include but are not limited to polyaniline, viologens, polyoxotungstates's and tungsten oxide. Oxides of many transition metals are electrochromic including cerium, chromium, cobalt, copper, iridium, iron, manganese, molybdenum, nickel, niobium, palladium, rhodium, ruthenium, tantalum, titanium, tungsten, and vanadium. Within each family, different 'mixtures' of chemicals produce different properties that affect the color, transmissivity, and transition time. Some electrochromics may only affect ultraviolet light—not visible light—appearing clear to an observer since they do not affect visible light. Electrochromics have been the object of intense study for over 40 years, and have found their chief commercial success for use in 'smart windows' where they can reliably control the amount of light and heat allowed to pass through windows, and has also been used in the automobile industry to automatically tint rear-view mirrors in various lighting conditions.

Other embodiments of the inventions may advantageously use multiple-color electrochromic devices or materials that exhibit electropolychromism. Some electrochromic devices may take a whole series of different colors, each colored state generated at a characteristic applied potential. One example is methyl vioiogen, which has electron potential states that are correspondingly colorless, blue, and red-brown. Electrochromic viologens have been synthesized with as many as six different colors.

The operating characteristics of each formulation of any of the thousands of different electrochromic material will be different. Some of the operating characteristics that should be considered when selecting materials for 3Deeps lenses include; Response time (the time required to change from its clear to darkened state or vice versa); Power consumption; Memory effect (when power is off between write cycles there is no 'redox' process and the electrochromic material retains its optical properties); Coloration efficiency (the amount of electrochromic darkening formed by the charge); Cycle life (The number of write-erase cycles that can be performed before any noticeable degradation has occurred); and, write-erase efficiency (the fraction of the originally formed darkening that can be subsequently electro-cleared. For 3Deeps viewing spectacles this should be 100%).

The operating characteristics of each formulation of any of the 1000s of different electrochromic material will be different. FIG. 9 shows a typical Operating Characteristic curve relating transmissivity (% transmission of light) to transmission time when a potential of 2 volts is applied across the electrochromic device. Some electrochromic materials may take several seconds to change state from one optical density to another—others may be near instantaneous. For many electrochromic materials the color change is persistent and electric potential need only be applied to effect a change. For such 'persistent' optoelectronic materials, only an electronic on-off pulse is needed, while non-persistent materials require the application of a continuing electronic potential. Other materials may attain state under the presence of electric potential, but then slowly 'leak' and change back. These materials may require a maintenance potential to maintain state but one that is different from that to attain the optical density state.

The second preferred embodiment of the Continuing Adjustable 3Deeps Filter Spectacles is fabricated from a persistent electrochromic material (material that has a so-called memory effect) that takes up to 1.85 seconds to change state from its lightest to darkest optical density, and up to 1.85 seconds to change state from its lightest to darkest optical density. In moving between states the preferred embodiment will always seek to optimize transition time.

While electrochromic material is used in the second preferred embodiment of the optical density Continuous Adjustable 3Deeps Filter Spectacles, any optoelectronic materials that change optical density in response to an applied potential may be used. This includes but is not limited to PDLCs (Polymer Dispersed Liquid Crystal devices) or SPDs (Suspended Particle Devices.) In the future, new optoelectronic materials will be discovered and may be advantageously used in the practice of this invention.

FIG. 9 is a transition time curve 900 for a single layer of electrochromic material with transition time as a function of transmissivity when a potential of 2.0V is applied to the electrochromic material. It is for a 'slow' electrochromic material with transition time 902 as a function of transmissivity 901 (or percent transmission of light). This transition time curve 900 has a 'lightest' state 906 with a transmissivity of 100% density (clear) and its darkest state 905 is 0% in which ail light is blocked from passing through the electrochromic material. The electrochromic material cannot however attain either of the extreme values (0% or 100%) of transmissivity. The Operating Characteristic curve 903 shows a material that can attain about 99% transmissivity 904 (almost clear) and 10% transmissivity 915 (almost dark). The material can then take any optical density in between the blocking only 1% of the light (99%) transmissivity) and blocking 90% of light (10% transmissivity) by the application of 2V for the proper length of time. If the material is in its clearest state 904, and, and a 2V potential is applied to the material, it will take about 1.8 seconds to change state and achieve its darkest state 915 or 10% transmissivity. This is shown on the transition time curve 903 of the Operating Characteristic of the material in FIG. 9.

As another example, if the material is in its clearest state 904, and the control signal 110 received on the frames receiving unit 102 indicates that the subject lens should change to an optical density associated with transmissivity of 70% 923, then the transition time curve 903 would be implemented by the control unit 103 to apply 2V potential to the lens for 1.35 seconds. A value of 70% 923 transmissivity intercepts the Operating Characteristic curve 903 at a point on the curve 921 that corresponds to a transition time 922 of 1.35 seconds. Once a potential of 2V has been applied for 1.35 seconds, no potential need further be applied since the electrochromic lens will 'latch' in the new state.

This is an example of how an algorithm implemented in the Control Unit 103 of the Continuous Adjustable 3Deeps Filter Spectacles with a single layer of lens material (FIG. 1-4) would use the transition time curve 903 to control the right lens 105 and the left lens 106. To transition a lens from and optical density associated with a clear state 904 to the optical density associated with a transmissivity of 70% the Control Unit 103 would apply 2V potential to the lens for 1.35 seconds.

This is a simplified example for illustrative and teaching purposes. Other electrochromic materials may have other operating characteristics that have characteristic exponential, negative exponential, or logistic (s-shaped) relationships. In this example, 2V potential is used to move between states. It is used under the assumptions that (a) for this electrochromic formulation the higher the electronic potential the more rapid will be the change from a lighter to a darker optical density, and (b) change of state from a lighter to a darker optical density is to be optimized. Other materials may require different potentials to be applied to move from between states. In any of these cases, the principle of operation is identical and the Control Unit 103 on the frames of the lenses uses the operating characteristics of the material used in the right 105 and left 106 lenses to determine the potential and the length of time the potential is to be applied to transition between lens control states.

Figure 10:
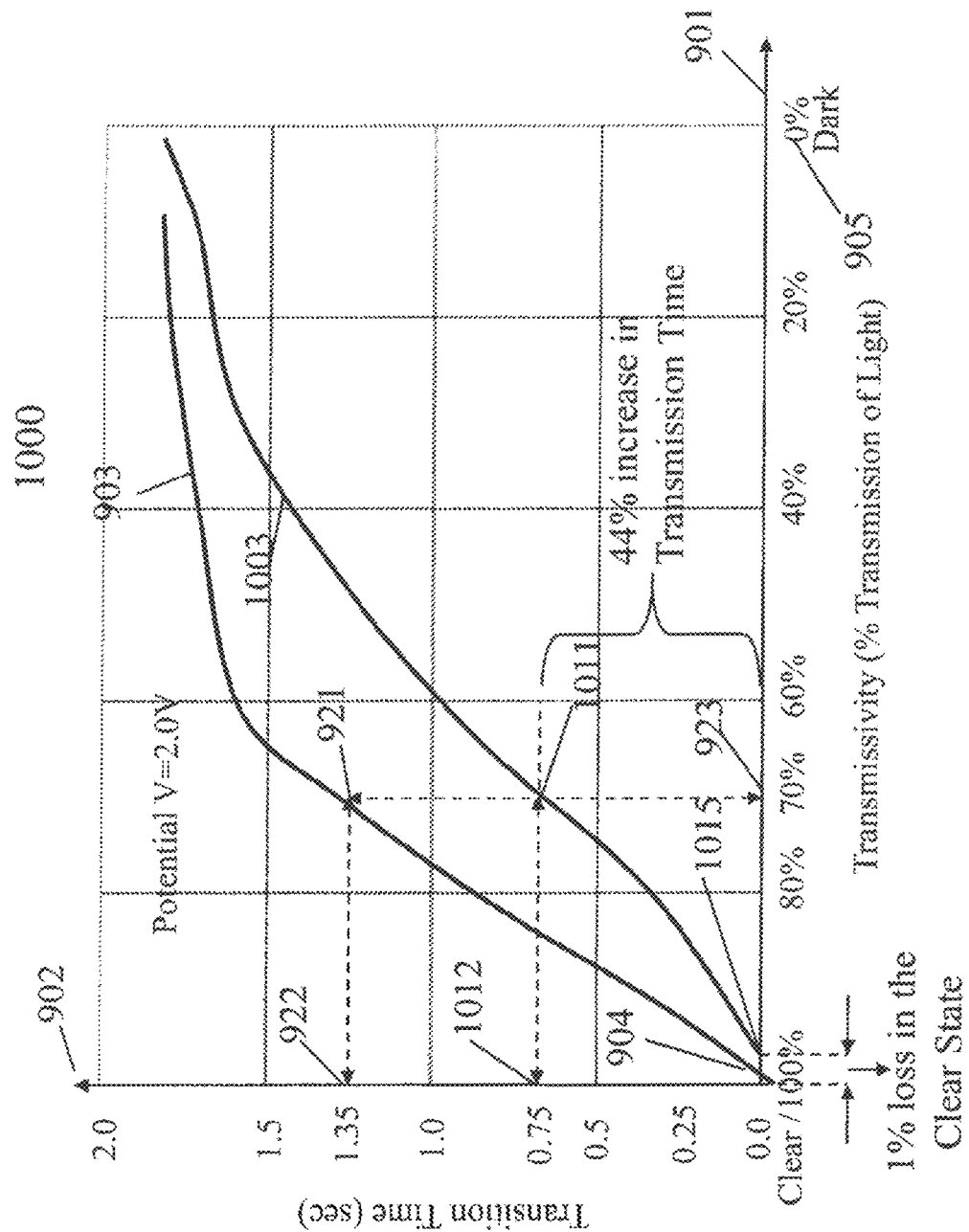
FIG. 10 is a transition time curve for a double layer (multi-layer) of electrochromic material with transition time as a function of transmissivity.

FIG. 10 is a transition time curve 1000 for a double layer (multi-layer) of electrochromic material with transition time as a function of transmissivity. FIG. 10 is similar to FIG. 9 with the addition of a second Operating Characteristic curve 1003. The numbered elements of FIG. 10 have the same description as their like numbered elements of FIG. 9. The Operating Characteristic curve for the double layer 1003 (multi-layer) lenses of the preferred embodiment are shown along with the Operating Characteristic curve of the single layer 903 to better emphasize the transition time Benefit and Loss of using the double layer of electrochromic material. The example shows that doubling the lens material results in a 44% decrease in Transmission Time (Benefit) when moving from a clear to a 70% transmissivity state for only a 1% loss in the Clear State (Loss).

As an example, if the multi-layer material is in its clearest state 1015, and the control signal 110 received on the frames receiving unit 102 indicates that the subject lens should change to an optical density associated with transmissivity of 70% 923, then the transition time curve 1003 would be implemented by the control unit 503 to apply 2V potential to the lens for 0.75 seconds. A value of 70% 923 transmissivity intercepts the Operating Characteristic curve 1003 at a point on the curve 1011 that corresponds to a transition time 1012 of 0.75 seconds. Once a potential of 2V has been applied for 0.75 seconds, no potential need further be applied since the electrochromic lens will 'latch' in the new state.

In summary, for a single layer lens then, to move from a clear state to a 70% transmissivity state 2V potential is applied for 1.35 seconds to a single layer material. For the double layer lens of the preferred embodiment to move from a clear state to a 70% transmissivity state 2V potential is applied for 0.75 seconds. Using two layers of electrochromic material results in a beneficial 44% decrease in transmission time for only a 1% loss in the clear state.

A Third Preferred Embodiment of the Invention

It has previously been observed in this disclosure that— "The lens state consisting of both left and the right lens darkened is not used by any of the 3Deeps spectacles." The third preferred embodiment of the invention uses this lens state that is not used by any of various 3Deeps spectacles previously described, and extends the first preferred embodiment (single layer Continuous Adjustable 3Deeps Filter Spectacles) so they may also be switch selectable to function as sunglasses.

In particular, a switch 1101 is added to the Continuous Adjustable 3Deeps Filter Spectacles described in FIG. 1. In a first switch position the spectacles operate precisely as described in the first preferred embodiment. In a second switch position the spectacles operate as sunglasses. Toggling the switch changes the spectacles to operate with the switched characteristics. The lenses of the third preferred embodiment are single-layer, and are precisely the same as described in FIG. 2a and FIG. 2b. The control unit 103 of the first preferred embodiment is modified and presented as a new Control Unit 1103. This control unit takes as an additional input the position of the selection Switch 1101. If the Switch is positioned so the spectacles operate as Continuous Adjustable 3Deeps Filter Spectacles then the Control Unit controls the lenses of the spectacles in precisely the same fashion as previous described in FIG. 4. If the Switch is positioned so that the spectacles operate as sunglasses, then the Control Unit controls the lenses so that they both take the same pre-specified dark optical density and operate as ordinary sunglasses.

Figure 11:
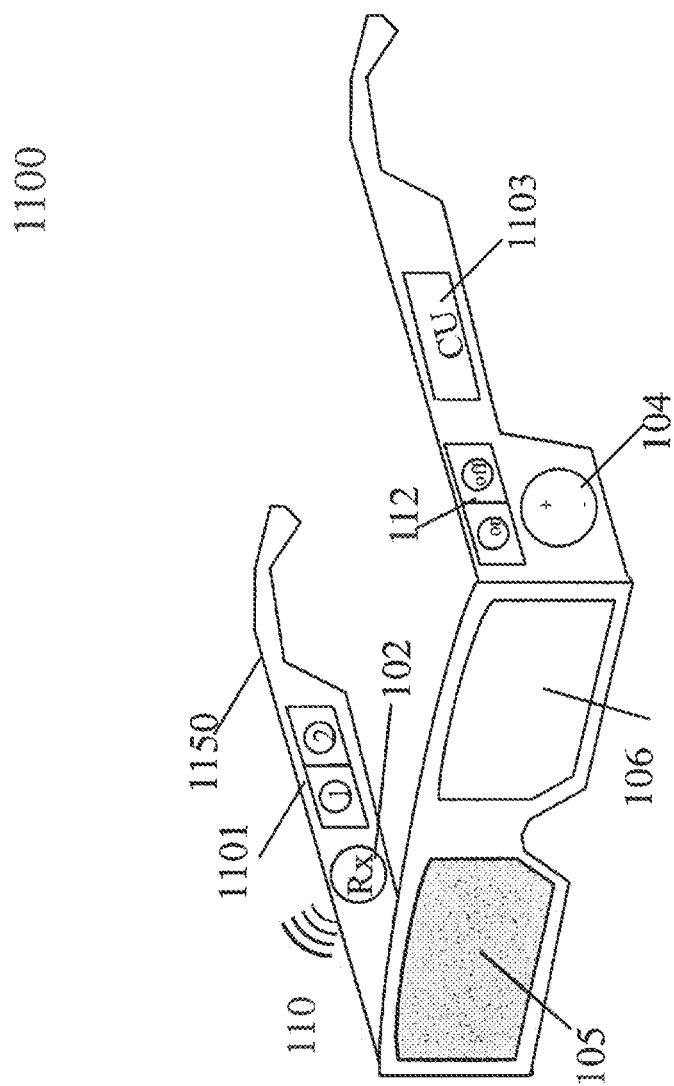
FIG. 11 is a perspective view of the third preferred embodiment of the multi-use Continuous Adjustable 3Deeps Filter Spectacles with single-layered lenses.

FIG. 11 is a perspective view 1100 of the third preferred embodiment of the Continuous Adjustable 3Deeps Filter Spectacles 1150 with single-layered lenses. The difference between the single-layered lenses of FIG. 1 and FIG. 11 is that in the third preferred embodiment a selection Switch 1101 has been added to the spectacles, and the control unit 1103 has been expanded to include control of the sunglasses. All like numbered items in FIG. 11 and FIG. 1 have the same function and definition. The selection switch 1101 may take either of two positions. In the first position, the spectacles will operate as Continuous Adjustable 3Deeps Filter Spectacles precisely as described in the first preferred embodiment. In the second position, the spectacles will operate as sunglasses.

The third preferred embodiment uses lenses identical to the lenses used in the first preferred embodiment and described in FIG. 2a and FIG. 2b.

Figure 12:
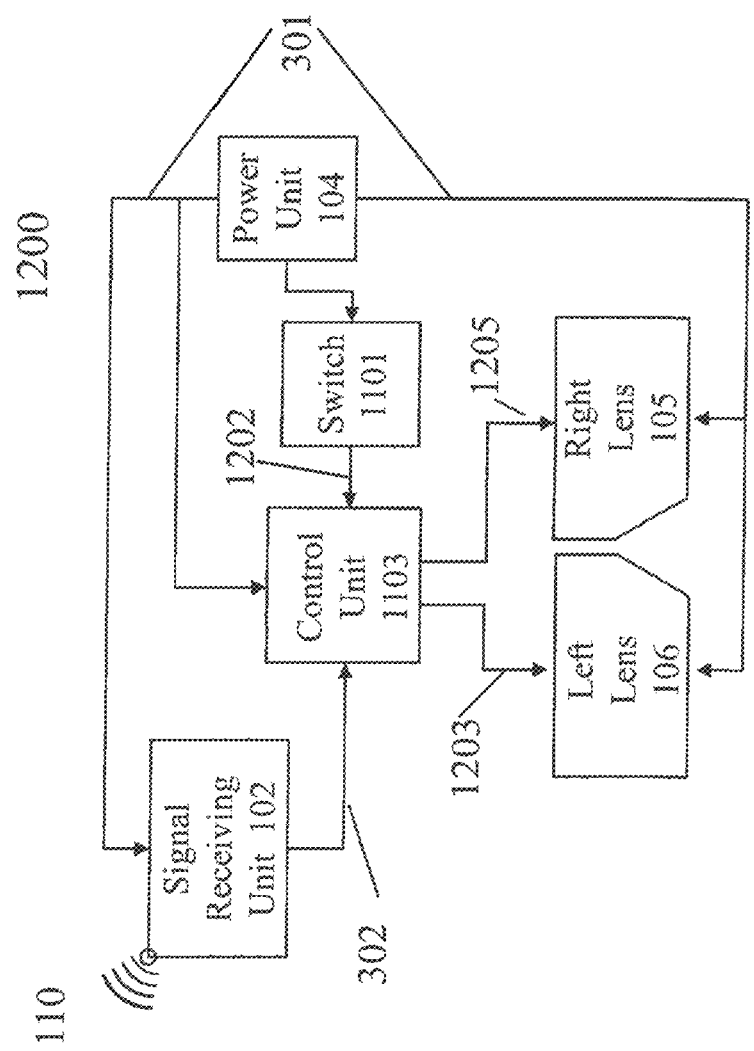
FIG. 12 is a block diagram of the operation of the multi-use Continuous Adjustable 3Deeps Filter Spectacles with single-layered lenses.

FIG. 12 is a block diagram 1200 of the operation of the Continuous Adjustable 3Deeps Filter Spectacles 1150 of FIG. 11 using a single layered electrochromic device for fabricating the electronically controlled variable tint material of the right 105 and left lenses 106. All circuits on the Continuous Adjustable 3Deeps Filter Spectacles 1150 are powered 301 by the battery 104, including the Control Unit 1103, Signal Receiving Unit 102, the Left Lens 106, and the Right Lens 105. The control information 110 is received by the Signal Receiving Unit 102 and sent 302 to the Control Unit 1103. The switch 1101 position is also powered 301 by the battery 104, and its position is output to the Control Unit 1103. The Control Unit 1103 implements an algorithm that is specific for the multi-use (Use 1: 3Deeps spectacles or Use 2: sunglasses) single-layered Continuous Adjustable 3Deeps Filter Spectacles, and controls the Left Lens 106 with a control circuit 1203, and the Right Lens 105 with a control circuit 1205.

Figure 13:
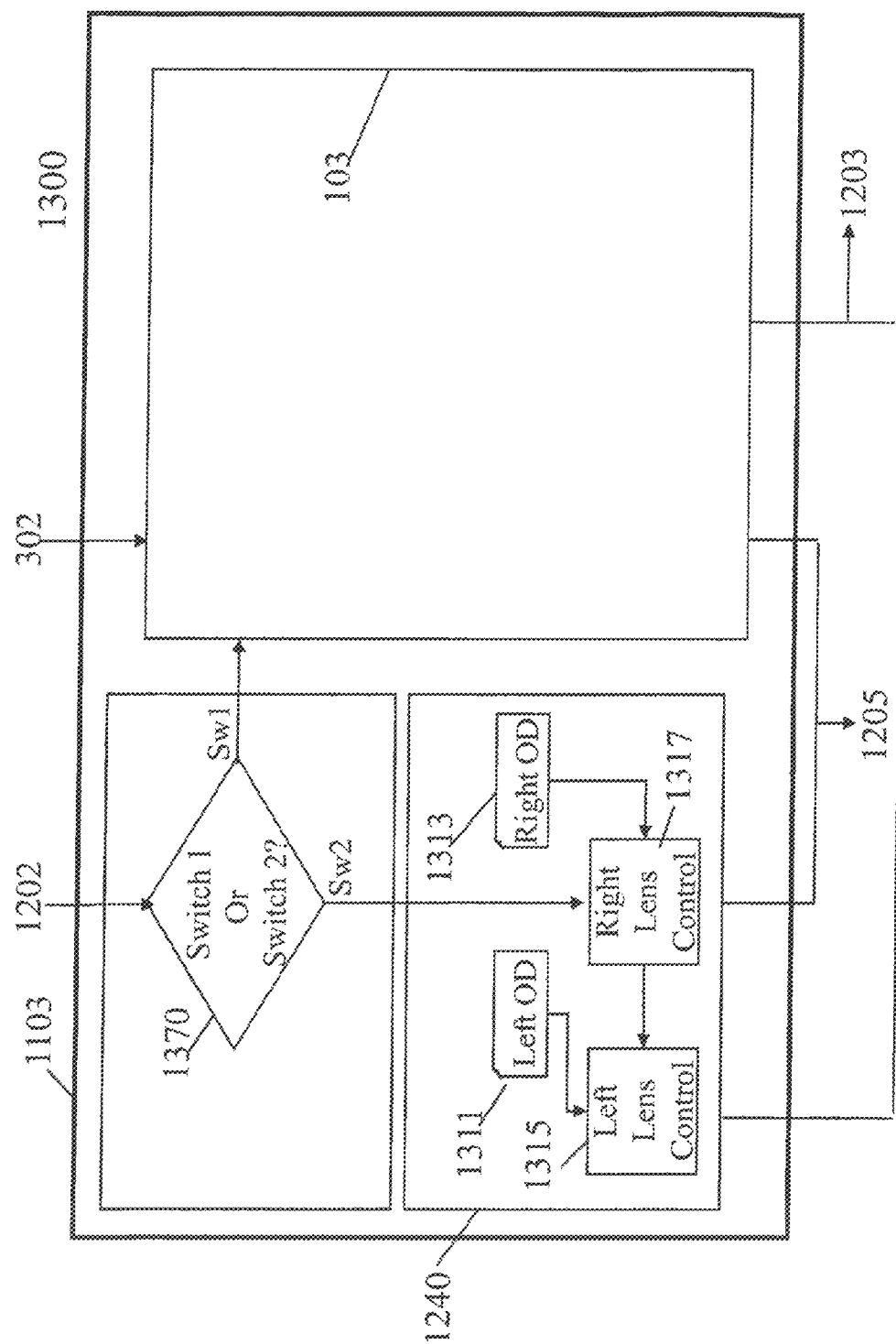
FIG. 13 is a flow chart showing the operation of the Control Unit of the multi-use Continuous Adjustable 3Deeps Filter Spectacles with single-layered lenses.

FIG. 13 is a flow chart 1300 showing the operation of the Control Unit 1103 of the multi-use Continuous Adjustable 3Deeps Filter Spectacles 1150 with single-layered lenses. The switch position 1202 is input to the Control Unit 1103 and processing commences with 'Switch 1 or Switch 2?' 1370 that can parse the switch position and determine which position the Switch 1101 is in. If the Switch position is in the first position then the control processing 103 is used. This is the same as the control processing for the First Preferred Embodiment and is described in FIG. 4. Only the input and output to the control processing 103 is shown in FIG. 13—not the details of the processing that is the same as shown in FIG. 4. If the Switch position is in the second position then the control processing 1240 for sunglasses is used. Pre-selected Optical densities for the left lens 106 and right lens 105 are stored in the controller as the 'LeftOD' 1311 and the 'Right OD' 1313. First the 'Right OD' 1313 is read by the 'Right Lens Control' processing 1317 and an electronic signal is issued on circuit 1205 to change the Right Lens 105 to that associated Optical Density. Processing then passes to the 'Left Lens Control' 1315 that reads the pre-stored value 'Left OD' 1311 and an electronic signal is issued on circuit 1203 to change the Left Len 106 to that associated value.

This exemplary Control Unit 1103 has been purposely simplified for clarity and to show the principles of the control operation. It shows two separate control circuits—the first 103 for control of Continuous Adjustable 3Deeps Filter Spectacles, and the second 1240 for control of sunglasses. The Control Unit 1103 has two separate memory storages for the Left and Right optical densities. It should be understood that good engineering design would reuse as much circuitry as possible for two controlling functions of the Control Unit 1103. So for instance, another implementation of the Control Unit 1103 may only have a single memory storage for the Left and Right optical densities that are used by both the circuitry controlling the 3Deeps Filter Spectacles and the circuitry controlling the sunglasses.

A Fourth Preferred Embodiment of the Invention

In the second preferred embodiment of the invention the right and left lenses of the 3Deeps spectacles are fabricated from multiple layers of the same electrochromic material. In a fourth preferred embodiment of the invention, the lenses are fabricated from two layers with electrochromic devices that have different optical characteristics. In this fourth preferred embodiment of the invention the first layer of electrochromic uses the same material to fabricate the lenses as has previously been described—a neutral density filters that block the transmission of light approximately equally along the entire visible spectrum. The second layer uses electrochromic material that can be electronically controlled so the left lens is clear or can be set to allow transmission of light in the visible red spectrum and the right lens is clear or can be set to allow the transmission of light in the visible blue spectrum. The two layers of material are switch selectable so that either of the layers may be activated, but not both layers at the same time. These Multi-Use Electrically Controlled Continuous Adjustable 3Deeps Filter Spectacles thus are switch selectable so they can be used to watch 2D (single image viewed by right and left eyes) movies in 3D using the 3Deeps methodology or alternatively to watch specially made 3D movies (separate left and right images) formatted for anaglyph 3D viewing.

Figure 14:
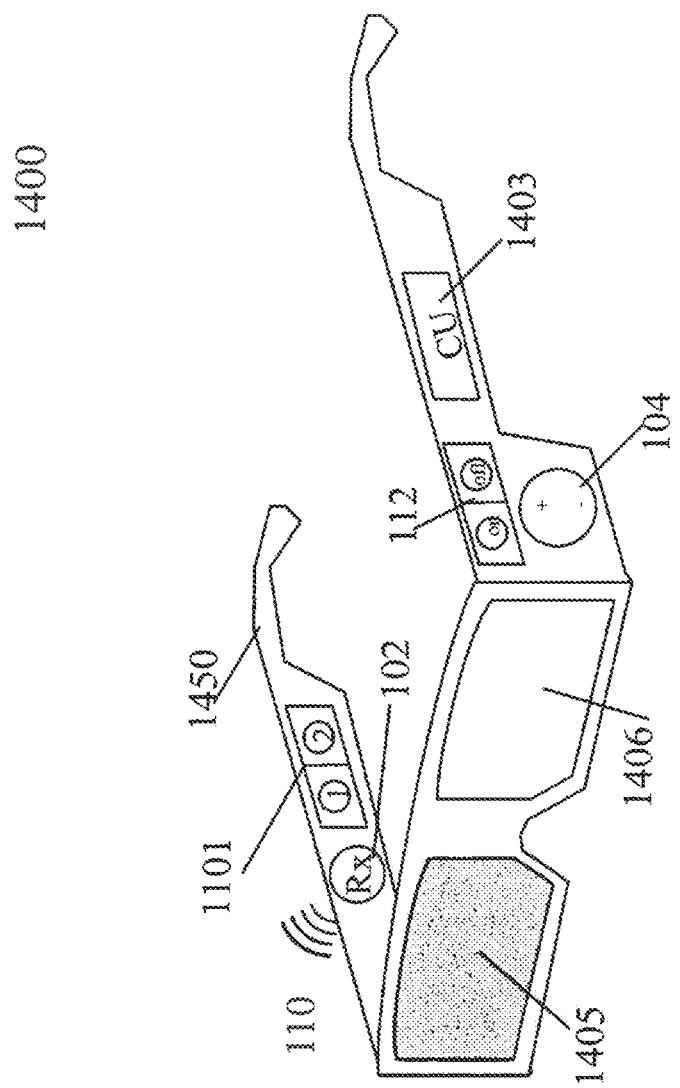
FIG. 14 is a perspective view of the fourth preferred embodiment of the multi-use Continuous Adjustable 3Deeps Filter Spectacles with multi-layered lenses.

FIG. 14 is a perspective view 1400 of the fourth preferred embodiment of the Multi-Use Electrically Controlled Continuous Adjustable 3Deeps Filter Spectacles 1450. Like numbered items in FIG. 5 and FIG. 1 have the same function and definition. The primary difference between this embodiment and previous embodiments is in the use of different electrochromic devices for the layers of the lenses (described further in FIG. 15a and FIG. 15b), and in the Control Unit 1403 that controls the operation of the spectacles based on the position of the Switch 1101. The toggle switch 1101 allows either the first layer 411 of the multi-use 3Deeps spectacles 1450 to be activated (3Deeps method of viewing 3D) or it allows the second layer 1501 of the multi-use 3Deeps spectacles to be activated (anaglyph 3D viewing.) In this fourth preferred embodiment of the invention, only one layer may be activated at a time. Other embodiments may allow more than one layer of material to be active at one time. The control unit 1403 has all the functionality of control unit 103 when the first layer is active. When the first layer is active both lenses of the second layer are set to their clear state. When the second layer of is activated the control unit 1403 will ran a control program specific to the control of anaglyph 3D viewing. In particular when the second layer is activated for anaglyph viewing, both lenses of the first layer of material are set to their clear state, and the left lens 1406 of the second layer is set to a red and the right lens 1405 of the second layer is set to blue. This state is maintained throughout the viewing of the anaglyph 3D movie and no additional switch of state is required of the control program as is the case with 3Deeps viewing. In this way the left lens is red and the right lens is blue as required for anaglyph 3D movies.

FIG. 15a 1500 shows a left lens 1006 of Multi-Use Electrically Controlled Continuous Adjustable 3Deeps Filter Spectacles fabricated from multiple layers of electrochromic material. Its fabrication using electrochromic material is shown in adjoining FIG. 15b. Since only a single layer of insulating glass material will be required between the different layers of the multi-layered electrochromic lens, the drawing of the top layer is slightly different than that of FIG. 2a to emphasize that only one layer of such insulating material is necessary. FIG. 15a therefore shows the lens 1006 as two layers where the first active layer 411 is separated by the second active layer 1501 by an insulating layer 410. The first active layer 411 and the insulating layer 410 comprise the single layer lens 106 of FIG. 2a.

FIG. 15b 1525 shows the cross-sectional details of the Multi-use electrochromic device of FIG. 15a for fabricating the electronically controlled variable tint material of the right and left lenses of the Continuous Adjustable 3Deeps Filter Spectacles using multiple layers of electrochromic material. The 7 layers of the electrochromic left lens 106 of FIG. 2a are shown in FIG. 15b as the 6 active layers 411, and the (seventh) insulating layer 201. Each layer is identical to their like numbered description accompanying FIG. 2b. A second active layer 1501 is included in the multi-layered electrochromic lens. In this fourth preferred embodiment of the invention, the second layer 1501 of the lens is fabricated from electrochromic material that is totally different from the neutral density electrochromic material of the first layer. This second layer of electrochromic material will have its own Operating Characteristic curve and electronically control properties of light differently from that of the first layer.

In particular, FIG. 15b shows the left lens 1406 of the Multi-Use Electrically Controlled Continuous Adjustable 3Deeps Filter Spectacles with a second layer of electrochromic material. The second layer is fabricated from electrochromic material that can be electronically controlled to allow the transmission of light in the clear or visible red spectrum. (A right lens that is not shown would be fabricated from electrochromic material that can be electronically controlled to allow the transmission of light in the clear or visible blue spectrum.) The second multi-layer of electrochromics of the multi-use lens is made from 6 layers of material. The top layer 1501 is made from an insulting layer of glass, plastic or other clear insulating material. This is followed by layer 1502 of a conducting layer, followed by a third layer 1603 of polymer. A fourth layer 1504 provides the ion transport whose direction is determined by the application of potential across the conducting layers. The fifth layer 1505 is the complementary polymer layer, and is then followed by another conducting layer 1506. The polymer layers 1503 and complimentary polymer layer 1505 provide the electronically controllable tinting of the lens as either clear or red. The right lens—not shown—would have polymer and complimentary polymer layers to provide electronically controllable tinting for the right lens as either clear or blue.

TABLE 1 shows the different types of Optoelectronic materials that may be used in the fabrication of Multi-Use Electrically Controlled Continuous Adjustable 3Deeps Filter Spectacles. The first column of the TABLE 1 is a numbering of the methods—but no preference is to attributed to the ordering. The 'Method Number' is used for reference in the disclosure. The second column of TABLE 1 labeled 'Viewing Method' and is the type of viewing that may be attained through the use of the associated optoelectronic device that is described in the third column of TABLE 1. The third column of TABLE 1 labeled 'OptoElectronic Device' is a brief description of the controllable optical characteristic necessary to achieve the associated viewing method.

TABLE 1

| Method No. | Viewing Method | OptoElectronic Device |
|---|---|---|
| 1 | 3Deeps movies (2D images viewed as 3D) | Single or multi-layers variable tint device |
| 2 | Anaglyph 3D movies | Right Lens Blue; Left Len Red device |
| 3 | Intru3D 3D movies | Right Lens Blue; Left Lens Amber device |
| 4 | Optimum emissive colors of TV phosphors (for Methods 1, 2, 3) | Optimized to emissive colors of TV |
| 5 | Polarized Lenses 3D movies | Right and left lenses at 90% polarization device |
| 6 | Vision correction | Near- or far-sightedness correction device |
| 7 | Shutter glasses | Rapid shuttering between clear and totally dark device |
| 8 | Sunglasses | Single layer variable tint device |
| 9 | Optical property of light | Electro Optical control of a property (or properties) of light |

With respect to the Method No. 1 of the table, the use of an electrochromic optoelectronic device for viewing 3Deeps movies with a single-layer of variable tint lenses has been previously described in the first preferred embodiment of the invention, and the use of an electrochromic optoelectronic device for viewing 3Deeps movies with multi-layers of variable tint lenses has been previously described in the second preferred embodiment of the invention. With respect to Method No. 2 of the table, the use of an electrochromic optoelectronic device for viewing anaglyph 3D movies (left lens red and right lens blue) with Multi-Use Electrically Controlled 3Deeps Continuous Adjustable 3Deeps Filter Spectacles has been previously described in the third preferred embodiment of the invention.

The Multi-Use Electrically Controlled 3Deeps Continuous Adjustable 3Deeps Filter Spectacles described may also replace the layers of materials described or add additional layers of materials (with corresponding changes to the manual switches of the spectacles and the control program) to achieve other methods of electronically assisted viewing spectacles. Such methods may include; Intru3D 3D movies (Method No. 3) with left lens amber and right lens blue; optoelectronic devices (Method No. 4) that are tuned to the optimum emissive colors of a TV phosphor; optoelectronic devices (Method No. 5) that allow viewing of 3D movies using polarized lenses in which the right and left lenses have polarizations that are perpendicular to each other; optoelectronic devices that provide prescription glasses that correct vision such as near- or far-sightedness (Method No. 6); optoelectronic devices that allow viewing of 3D movies by the shutter glass method (Method No. 7) in which there is rapid shuttering between a clear and totally dark state for one eye, while the other eye has corresponding states of totally dark and clear in synchronization with right and left images of the displayed motion picture. The spectacles have a layer (Method No. 8) that when activated provides sunglasses. Any other optical property of light that can be beneficially controlled by an optoelectronic device (Method No. 9) can be used as a layer of the Multi-Use Electrically Controlled 3Deeps Continuous Adjustable 3Deeps Filter Spectacles. In some embodiments of the invention several methods may be operable at the same time as when Vision correction optoelectronics (Method No. 6) is active at the same time as any of the methods for viewing 3D movies.

Figure 16:
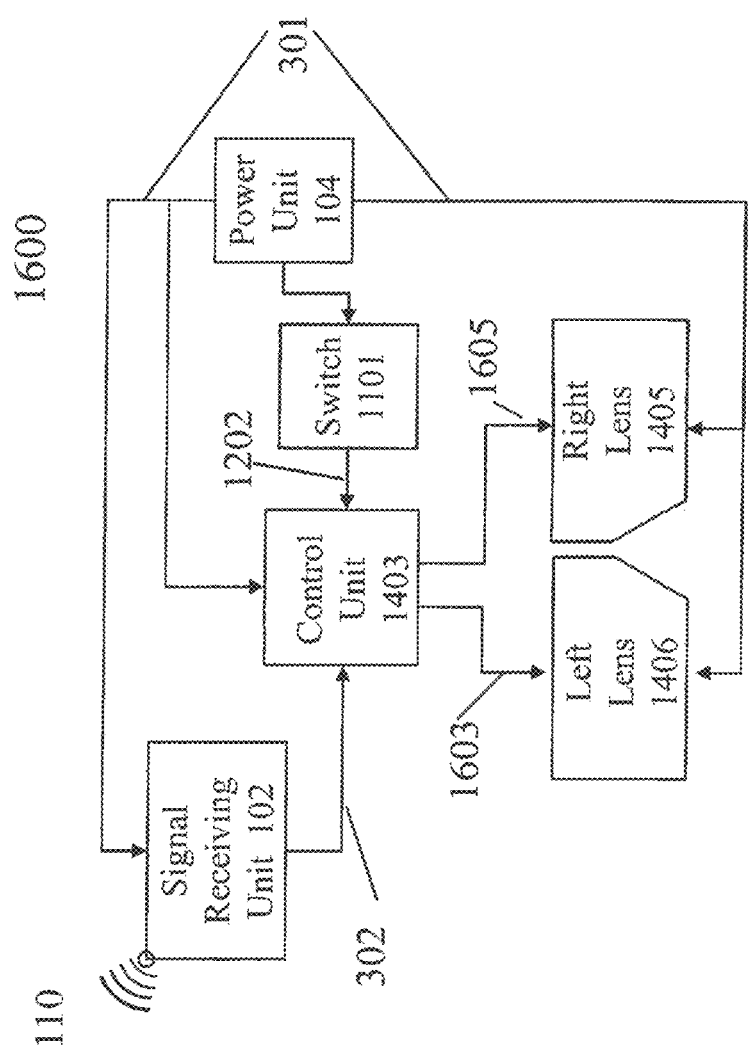
FIG. 16 is a block diagram of the operation of the multi-use Continuous Adjustable 3Deeps Filter Spectacles with multi-layered lenses.

FIG. 16 is a block diagram 1600 of the operation of the multi-use Continuous Adjustable 3Deeps Filter Spectacles 1450 with multi-layered lenses. All circuits on the multi-use Continuous Adjustable 3Deeps Filter Spectacles 1450 are powered 301 by the battery 104, including the Control Unit 1403, Signal Receiving Unit 102, the Left Lens 1406, and the Right Lens 1405. The control information 110 is received by the Signal Receiving Unit 102 and sent 302 to the Control Unit 1403. The switch 1101 position is also powered 301 by the battery 104, and its position is output 1202 to the Control Unit 1403. The Control Unit 1403 implements an algorithm that is specific for the multi-use (Use 1: 3Deeps spectacles or Use 2: Anaglyph 3D viewing) multi-layered Continuous Adjustable 3Deeps Filter Spectacles, and controls the Left Lens 1406 with a control circuit 1603, and the Right Lens 1405 with a control circuit 1605.

Figure 17:
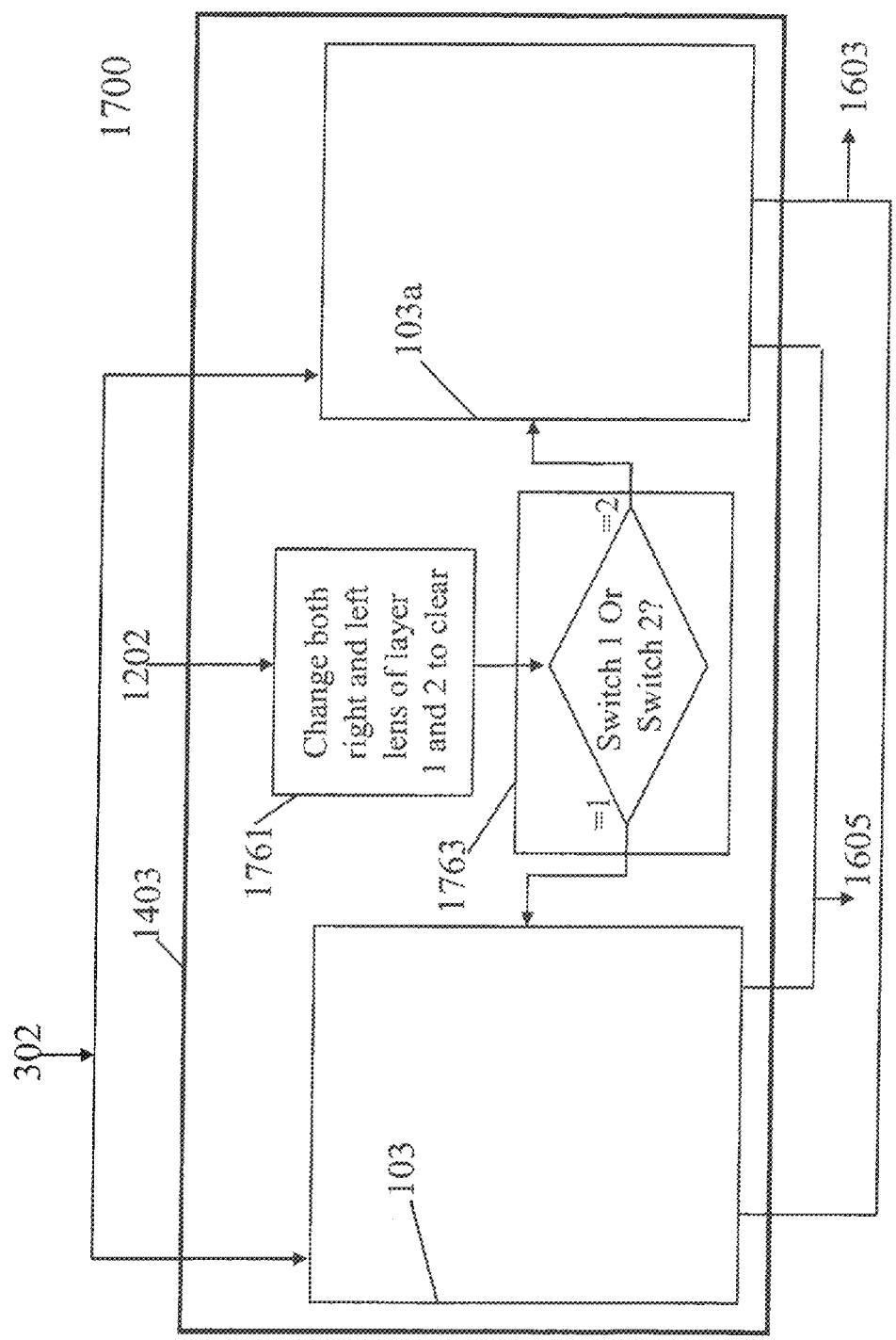
FIG. 17 is a flow chart showing the operation of the Control Unit of the Multi-Use Electrically Controlled Continuous Adjustable 3Deeps Filter Spectacles with multi-layered lenses.

FIG. 17 is a flow chart 1700 showing the operation of the Control Unit 1403 of the Multi-Use Electrically Controlled Continuous Adjustable 3Deeps Filter Spectacles 1450 with multi-layered electrochromic lenses. The swatch position 1202 is input to the Control Unit 1403. Processing commences with 'Change both right and left lens of layer 1 and 2 to clear' 1761 by switching both the right lens 1505 and left lens 1506 of the first electrochromic layer 411 and the second electrochromic layer 1501 to clear. Processing is then transferred to a control circuit 'Switch 1 Or Switch 2?' 1763 that can parse the switch position and determine which position the Switch 1101 is in. If the Switch position is in the first position (3Deeps viewing) then a first control processing unit 103 is used to control the first layer 411 of the lenses of the Multi-Use Electrically Controlled Continuous Adjustable 3Deeps Filter Spectacles 1450. If the Switch position is in the second position (anaglyph viewing) then a second control processing unit 103a that is similar to the control processing unit 103 shown in FIG. 4) is used to control the second layer 1501 of the lenses of the Multi-Use Electrically Controlled Continuous Adjustable 3Deeps Filter Spectacles 1450.

The two control processing units 103 and 103a of the Control Unit 1403 are the same as the control processing unit for the First Preferred Embodiment and is described in FIG. 4. The first control processing unit controls the spectacles for 3Deeps viewing and the second control processing unit control the spectacles for anaglyph 3D viewing. Only the input and output to the control processing 103 is shown in FIG. 17—not the details of the processing that is the same as shown in FIG. 4.

If the Switch position is in the first position then the control processing unit electronically synchronizes to the movie using 3Deeps technology by controlling the left 1406 and right lenses 1405 of the first layer 411 of the multi-use Continuous Adjustable 3Deeps Filter Spectacles 1450 over the control circuits for the left lens 1603 and control circuit for the right lens 1605. In this case the second layer 1501 has been set so both right and left lenses of the second layer are clear. If the Switch position is in the second position then the control processing unit electronically controls the 3Deeps spectacles for anaglyph 3D viewing by switching the left lens 1406 to red and right lens 1405 to blue of the second layer 1501 of the multi-use Continuous Adjustable 3Deeps Filter Spectacles 1450 over the control circuits for the left lens 1603 and control circuit for the right lens 1605. In this case the first layer 411 has been set so both right and left lenses of the first layer are clear.

This exemplary Control Unit 1403 has been purposely simplified for clarity and to show the principles of the control operation. It shows two separate control circuits 103 and 103a—the first 103 control circuit for control of Continuous Adjustable 3Deeps Filter Spectacles (first layer 411), and the second 103a control circuit for anaglyph 3D viewing (second layer 1501). FIG. 17 shows each circuit 103 and 103a with its own circuits for control of the left lens 1406 and control of the right lens 1405. It should be understood that good engineering design would reuse as much circuitry as possible for two controlling functions of the Control Unit 1403.

TABLE 2 shows control information for Multi-Use Electrically Controlled Continuous Adjustable 3Deeps Filter Spectacles. Such control information is necessary when the Multi-Use Electrically Controlled Continuous Adjustable 3Deeps Filter Spectacles are under remote control rather than a manually control 1101 as shown in FIG. 14.

TABLE 2

| Method No. | Viewing Method | Control Code | Control Information |
|---|---|---|---|
| 1 | 3Deeps movies (2D images viewed as 3D) | Ctrl-1 | Optical Density for left and right lens |
| 2 | Anagtyph 3D movies | Ctrl-2 | None |
| 3 | Intru3D 3D movies | Ctrl-3 | None |
| 4 | Optimum emissive colors of TV phosphors (for Methods 1, 2, 3) | Ctrl-4 | Real-time setting of optical density of right and left lens |
| 5 | Polarized Lenses 3D movies | Ctrl-5 | None |
| 6 | Vision correction | Ctrl-6 | Real-time optical property of density of right and left lens |
| 7 | Shutter glasses | Ctrl-7 | Shutter synchronization |
| 8 | Sunglasses | Ctrl-8 | Real-time setting of sunglass color of right and left lens |
| 9 | Optical property of light | Ctrl-9 | Optical property of right and left lens |

Control information for Continuous Adjustable 3Deeps Filter Spectacles has been previously shown in the related patent application Ser. No. 12/274,752. In that related disclosure no multi-layer or multi-use information was required of the spectacle control protocol since the Continuous Adjustable 3Deeps Filter Spectacles had only a single-layer and a single-use. With Multi-Use Electrically Controlled Continuous Adjustable 3Deeps Filter Spectacles that are under remote control, a control code sequence may be transmitted to signal the Control Unit 1403—which layer of the multi-layered spectacles the controlling information references.

The first column of the TABLE 2 is a numbering of the methods—but no preference is to attributed to the ordering. The 'Method Number' is used for reference in the disclosure. The second column of TABLE 2 labeled 'Viewing Method' identifies the viewing method. Columns 1 and 2 of TABLE 2 are the same as in the like labeled column of TABLE 1. The third column of TABLE 2 labeled 'Control Code' has the control code in the RF sequence that is utilized by the Control Unit 1403 to switch control to the associated lens. For instance, when the Multi-Use Electrically Controlled Continuous Adjustable 3Deeps Filter Spectacles of FIG. 10, receive a 'Ctrl-2' sequence it switch to control of the associated method—in this can 'Anaglyph 3D movies'. Once the Multi-Use Electrically Controlled Continuous Adjustable 3Deeps Filter Spectacles have received a 'Control Code' sequence, all the control information that then follows will be interpreted to control the associated method. In the current example where a 'Ctrl-2' sequence is received switching the spectacles into 'Anaglyph 3D' mode, all follow-on control information received by the spectacles would be interpreted to as controlling the 'Anaglyph 3D' spectacle method and lens layer. Such follow-on control information references the 'switched' method until another control-code is received.

A description of the contents of the Follow-on control information associated with each of the viewing methods is indicated in column 4 of the table, labeled 'Control Information'. When the Control Unit 1403 of the spectacles receive a 'Ctrl-2' sequence indicating it is to switch to anaglyph mode, the control unit 1403 changes the left lens 1406 to a red and the right lens 1405 to a blue color. The spectacles stay in this mode until another CTRL-code is received switching the spectacles to another method. Since the 'Anaglyph' method, activated by Control Code, 'CTRL-2' requires no further or follow-on controlling information, the entry for 'Anaglyph in the 'Control Information' column is 'None' indicating that no further control information is required for the Anaglyph mode. Similarly, no additional control information is required for Intru3D 3D movies; and, Polarized lenses. Control Information is required for methods 3Deeps Movies; Optimum emissive colors of TV; Vision correction; shutter glasses; sunglasses; and, Optical Property of Light.

The control information that is received wirelessly 102 by the Multi-Use Electrically Controlled Continuous Adjustable 3Deeps Filter Spectacles of FIG. 14 may be transmitted by any of the means disclosed in the related patent applications including but not limited to; DVD-based control units; Digital Movie Projector control units; Television-based control units, hand-held and operated control units; spectacle-based control units, and cell-phone based control units.

Other Embodiments

While the preferred embodiments have been described using electrochromic materials, other electro-optical (optoelectronics) materials may be utilized. Any material for which the optical properties can be controlled by the application of a potential across the material may be advantageously used in the invention.

While the preferred embodiment uses 2 layers of electrochromic materials, even faster switching time can be achieved by using 3 or more layers.

While the preferred embodiment uses the same voltage applied to each of the multi-layers of the lenses, other embodiments may achieve control over the switching time to the optical optimal density by the application of different voltage across each layer of the multi-layered lenses of the Continuous Adjustable 3Deeps Filter spectacles.

In some embodiments of the invention, several different layers of multi-use-electronic materials may be switch selectable and active at the same time to achieve different optical effects. For instance electronically controllable vision correction may be combined with Continuous Adjustable 3Deeps Filtering to provide a single pair of viewing spectacles that both correct vision while at the same time providing optimal 3Deeps viewing of 2D motion pictures as 3D motion pictures.

In yet another embodiment of the invention, rather than use electrochromic materials that have the same optical properties (transmission OC curve), materials with different optical properties may be beneficially utilized.

As lenses get older their OC curve may change. In another embodiment the control program may tune the control OC curve based on age or time of use so that the spectacles do not appear to degrade in performance as they get older.

The switch selection for the Multi-Use Electrically Controlled Continuous Adjustable 3Deeps Filter Spectacles was shown on the spectacles. Alternatively, the switch selection can be activated by the viewing media by broadcasting a Rx signal that is picked up by the receiving unit of the 3Deeps spectacles 102, passed to the control unit of the spectacles, and which are read and acted upon by the control program that controls the operation of the spectacles. For instance, a control code at the beginning of an anaglyph motion picture may allow the spectacles to respond by taking the proper configuration for viewing of anaglyph 3D encoded motion pictures without any manual intervention by the viewer.

In other embodiment of the invention the multi-layered or multi-use lenses may be in the form of clip-on lenses that readily fit over normal prescription lenses.

In still another embodiment of the invention, multi-use 3Deeps viewing spectacles are fabricated from a single layer of an electropolychromism device.

Previous related patent applications (such as U.S. Pat. No. 7,508,485) have disclosed systems and methods by which a motion estimation value that characterizes movement in a frame of a 2D motion picture may be extracted from successive frames of the motion picture. The motion estimation value and a luminance value are used to calculate an optical density for the lens of the Pulfrich Filter spectacles and are transmitted to the Pulfrich Filter spectacles. The transmitted values are used to control the optical density of the lenses of the Pulfrich Filter spectacles. In still another embodiments of the invention, the motion estimation value is calculated from the motion estimation values that are part of the MPEG digital video compression standards.

In another embodiment of the invention, the 3Deeps electrochromic sunglasses have additional variable brightness controls. In one case, the sunglasses have means by which the user can set the darkness level of the sunglasses. That is, rather than a have Pre-selected optical densities value for the left lens and right lens stored in the control unit (as in FIG. 13, the optical density value of the lenses of the sunglasses is under the control of the user. A rotary or slide switch could be utilized to select any optical density between the low and high values of the switch. In another embodiment a multi-pole switch is used so that user can select one of a set of preselected optical densities for the lenses of the sunglasses.

In another embodiment of the invention the 3Deeps electrochromic sunglasses, the variable brightness of the lenses of the sunglasses operate similarly as an electrochromic version of photochromatic lenses. That is, the optical density of the 3Deeps sunglasses is set in accordance with a continuum of the ambient surrounding light. In low light (dark) there would be a minimum of little or not darkening of the lenses, while in intense sunlight such as at noon on a cloudless sunny day the lenses would take an extreme dark value. Lighting situations in-between would result in the optical density values for the lenses in-between the minimum and maximum values. This could be achieved for instance by incorporating a photodiode on the 3Deeps spectacles that measures the ambient light at the spectacle frames, and inputs that value to the control unit on the spectacles.

In another embodiment of the invention, the Continuous Adjustable 3Deeps Filter Spectacles may not respond to every synchronization signal. While some electrochromic materials may have been reported that have a cycle life of up to 50 million changes—and even higher values can be obtained—if the Continuous Adjustable 3Deeps Filter Spectacles are made from a material with a shortened cycle life it may be necessary to also additionally consider and optimize for the operation of the spectacles for the cycle life. While the synchronization signals would still be broadcast for every frame, the Continuous Adjustable 3Deeps Filter Spectacles may be set to only process and respond to some of those changes so as efficiently use cycle life. This make sense, as scenes that exhibit movement may be on the order of 10-30 seconds long, or longer, and the same optical density setting will provide a near-optimal setting for the Continuous Adjustable 3Deeps Filter Spectacles. To address cycle time then, the Continuous Adjustable 3Deeps Filter Spectacles may use a combination of ad-hoc rules such as (a) responding only to every nth synchronization event; (b) responding to only synchronization events with changes to the optical density of more than a pre-set percent; (c) responding to synchronization events in which there is a change to direction of motion; (d) responding to synchronization events in which there is a change in presence or absence of motion; (e) scene change, or (f) some other motion picture frame event.

* * *

Figure 18A:
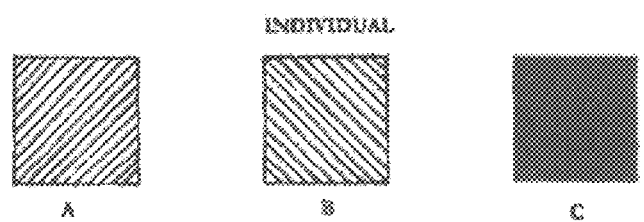
FIGS. 18 a-18 c illustrates the present invention with three pictures.
Figure 18B:
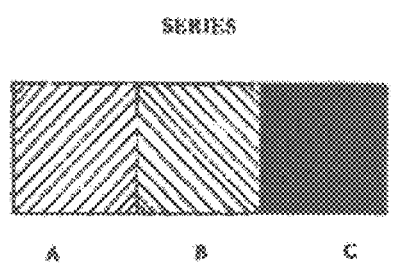
Figure 18C:
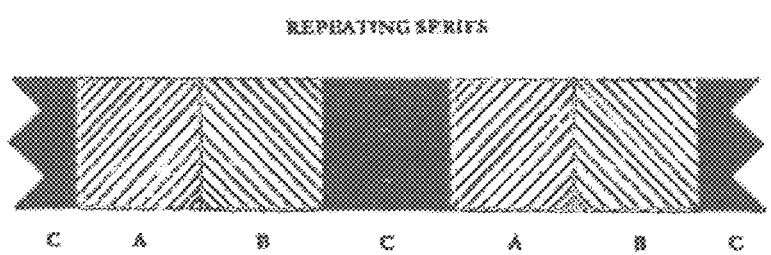

FIG. 18 a illustrates three pictures that are employed in a method in accordance with an embodiment. Picture A, illustrated with lines slanting upward left to right, and Picture B, illustrated with lines slanting downward from left to right. Both pictures A and B are single frame photographs such as two side-by-side frames taken from a movie film showing movement of an object, for example, a woman walking down a street or a man walking his dog. Such side-by-side frames would be similar to each other but not identical. Picture C is a solid black picture.

In FIG. 18 b pictures A, B and C are arranged in sequential order, and placed on picture frames to form a series. In FIG. 18 c this series is then repeated to produce the appearance of movement by pictures A and B.

Figure 19A:
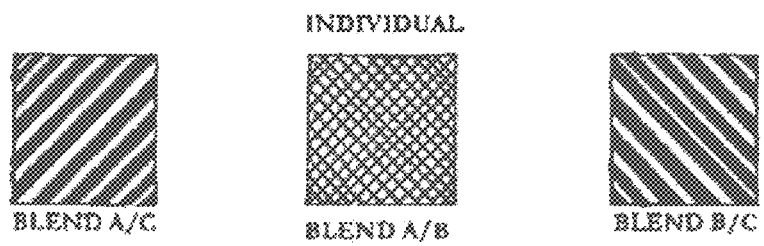
FIGS. 19 a-19 c illustrates the present invention using three pictures along with blended pictures.
Figure 19B:
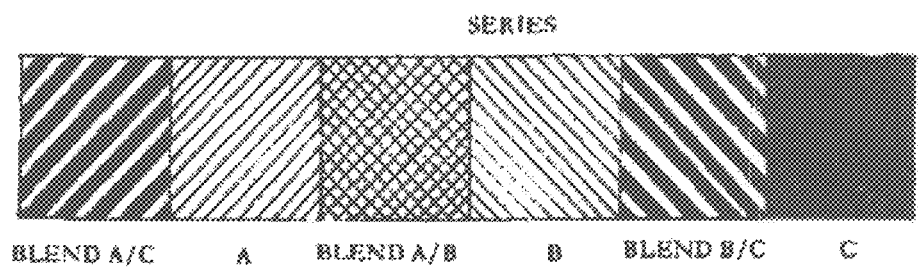
Figure 19C:
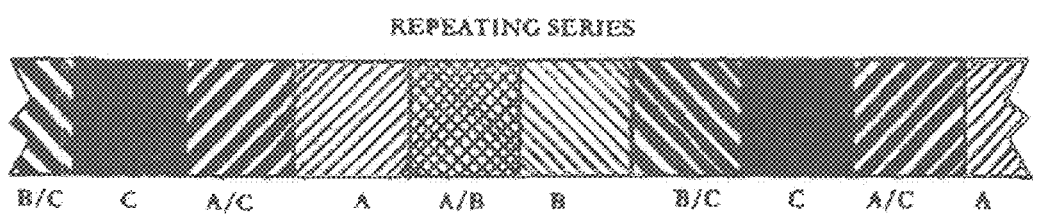

Turning to FIG. 19 a and the use of blended pictures, the three pictures are combined to produce a blend of C/A, blend of A/B and a blend of B/C by using Adobe Photoshop or another program to make a 50/50 blend of the three pictures.

In FIG. 19 b, all six pictures are placed side-by-side to create a series and the series is copied to create a continuous or semi-continuous film video or computer sequence where the series is repeated a plurality of times as shown in FIG. 19 c.

Figure 20A:
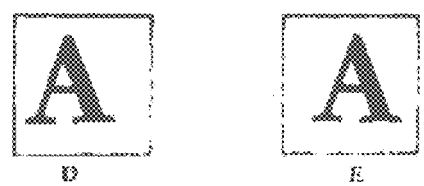
FIGS. 20 a-20 c illustrates the present invention using the same picture wherein one is offset from the other.
Figure 20B:
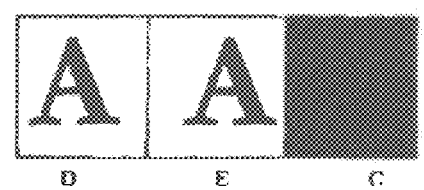
Figure 20C:
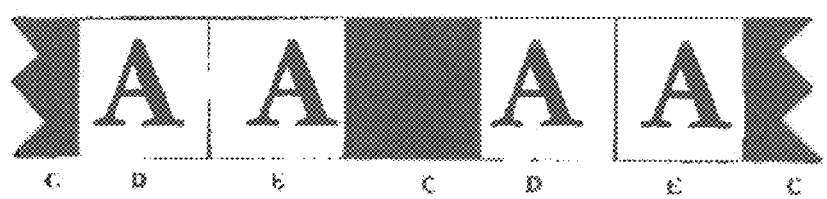

FIGS. 20 a-20 c illustrates an alternative three pictures that are employed in the method of this invention. Picture D and Picture E both illustrate a capital A, however, in Picture D, the capital A is aligned with the center of the frame while in Picture E the A is off-set to the right of the center of the frame (exaggerated here to be visible; in actual practice the displacement of figures might be so subtle as to not be discernable as illustrated here). Picture C is identical to Picture C in FIG. 18 a.

The capital A is chosen for FIGS. 20 a-20 c for illustration purposes and could be a single photograph of anything.

The three pictures are placed side-by-side to form a series. Finally, the series is copied a plurality of times to form a repeating series. The repeating series in FIG. 20 c creates the optical illusion that the letter A is moving from left to right and, if one letter A were to be slightly different in size from the other, the letter would appear to be moving in depth, i.e. given a third dimension.

In FIGS. 20 a-20 c the background of Picture E is identical to the background of Picture D except that the image A is off-set slightly to the right.

Figure 21A:
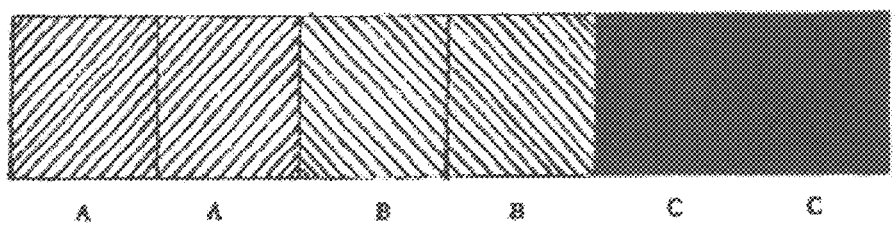
FIGS. 21 a-21 b illustrates the present invention with side-by-side pairs of pictures.
Figure 21B:
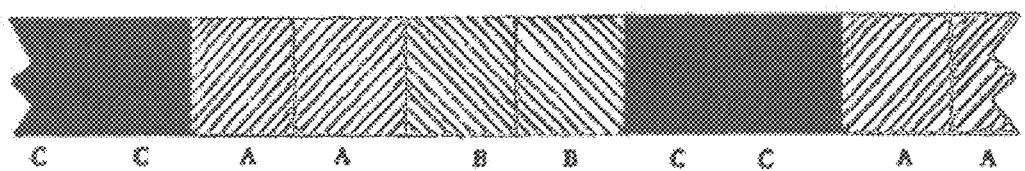

FIGS. 21 a-21 b illustrates the present invention where the series is two of each picture placed in side-by-side frames. It has been found that two pictures side-by-side are visually equivalent to a blend. In other words, a series of A, A, B, B, C, C is visually equivalent to a series of C/A, A, A/B, B, B/C, C.

Additionally, a series made in accordance with the present invention need not be uniform in that the pictures can be arranged to provide a different rhythm or beat to the film. For example, the series could be: C/A, C/A, A, A/B, A/B, B, B, B, B/C, C, C, C. Different arrangements provide different visual perceptions.

Furthermore, a plurality of different series can be combined together, i.e. C/A, A, B, B, C with C/A, C/A, A, B, B, C, C to form C/A, A, B, B, C, C/A, C/A, A, B, B. C, C.

Figure 22A:
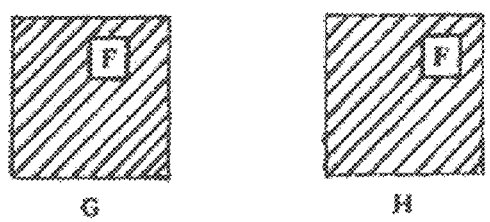
FIGS. 22 a-22 c illustrates the present invention wherein pictures G and H are identical but image F has been imposed in a slightly different location.
Figure 22B:
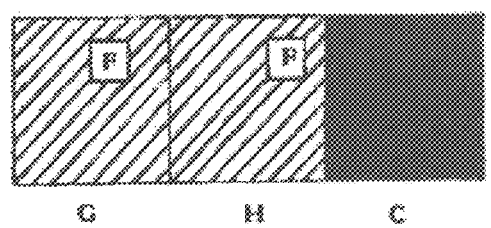
Figure 22C:
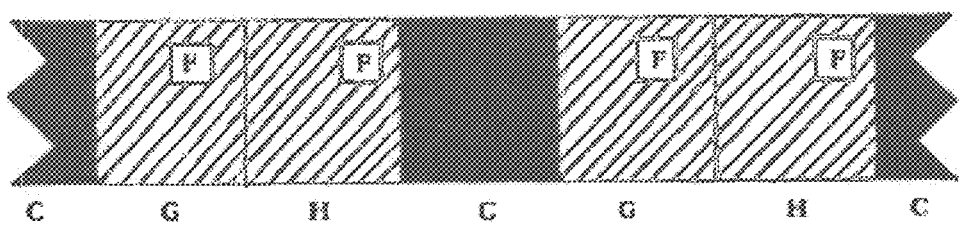

FIGS. 22 a-22 c illustrates the invention where both pictures are identical except for the position of a superimposed image F on the pictures. Image F could be taken from the original picture G or could be taken from another picture, which is separate and distinct from pictures G and H. For example, pictures G and H could have the common background of a country side road while image F is a man walking his dog. In picture G, the man and his dog is placed at one location while on picture H the man and his dog is placed at a different location on the country road. By viewing the repeating of a series of G, H, C, a viewer is given with the impression that the man is walking his dog down the road, from top of the frame towards the bottom of the frame, appearing to be continually moving in the same direction without changing his actual position.

Furthermore, image pictures can be identical except that when they are arranged in the frame, one is oriented slightly lilted relative to the other. The repeating series provides the visual perception that the picture is spinning.

Also, the size of or the orientation of image F in FIGS. 22 a-22 c can be varied while maintaining the location of image F. Varying the size gives the viewer the impression that the man is walking forward or backward, depending on the order in which pictures are arranged. Changing the orientation or tilting of image F leaves the viewer with the impression that the man is spinning.

The repeating series can be viewed in any media, it could be digitalized or placed on conventional film for viewing.

The movement created by the invention is seamless movement, sustained fluid entirely on-going movement.

Continuous movement means the illusion of a progressive action that can sustain as such into infinite time. For instance, a door beginning to open, it keeps beginning to open without ever progressing to the stage of actually opening. A door, in reality, in order to repeat this very limited movement, would have to move back and forth, recovering territory in order to go forward again, but in this visual illusion the door only moves forward. A normal film or video might approach this effect by multiple printing of the picture frames depicting only the forward motion, so that a return motion would be hidden from audience eyes, but the effect would be of a visual stutter; the action would be repeating, and not continuous. The "stutter" could be made less obvious and percussive by dissolving head frames of the shot into tail frames, but only with some subject matter (i.e., a waterfall) might the repeat character of the motion not be apparent.

The appearance of transfixed continuous motion (a going without going anywhere) is created in this invention from a specific employment of flicker, the contrast created by viewing the slight shifting of a pictured form or forms between the image pictures in opposition to the bridging picture. Movies have always been dependent for their illusion of continuity on flicker-rates; silent movies filmed at 16 frames per second required 3-bladed shutters not only to block projection light during the successive replacing of frames but also to twice interrupt the display of each frame so as to achieve a flicker rate that the viewer would mistakenly see as uninterrupted light. Slow cranking of the film through the projector gave rise to "the flickers" as a pejorative. Video and computer image-continuity depends likewise on rapid on-off display. The present invention purposely makes flicker apparent, utilizing the effects of emphatic flicker on the human optical/nervous system to create uncanny time and space illusions.

Simple alternation of a single image picture with intervals of blackness (or any other interrupting color/s) is enough to create subtle illusions of continual sliding movement across the screen. Alternations of two image pictures with an interrupting interval of a solid colored picture provides any number of continuous motions, including motion into illusionistic depth. While such screening-illusions of movement and depth resemble movements and depths as seen in actuality; this is a creative artistic method and not intended as a reliable way of reporting the actuality that may have existed in front of a camera.

As noted above, no special viewing devices are required to view the present invention, although certain effects can be enhanced or put through interesting changes when viewed with a filter intercepting and reducing light to one eye; the "Pulfrich Effect".

Remarkably, with the present invention, depth illusions can be experienced even by the single-eyed person. Normally our perception of depth, stereopsis, depends on properly functioning binocular vision, two eyes working in tandem with each other; one of the benefits of this invention is to offer visual depth experience to those deprived of such experiences by physical defect. Because contrasting perspectival information is available to both or either eye, a single eye becomes sufficient to deliver the information to the brain when employing the present invention.

The present invention is best created on the computer, to be viewed on the computer or transferred to film or any video format. It can also be created directly onto film or video but the precision control possible with the computer is lacking.

The present invention can employ very small shifts in the placement of objects as seen in one picture in relationship to another similar picture. Such small object-placement shifts are also to be found in the simultaneously exposed pairs of frames made with a stereo still-camera, its two lenses placed horizontally apart approximately the distance between human eyes. The stereo still-camera offers object-placement differences derived, as with our two eyes, from a fixed interval of space: the twin perspectives recorded by lenses 2½ inches apart. The degree of inter-ocular distance, as it is called, enormously affects the character of depth to be seen when the stereo-pair is properly viewed one picture to each eye; depth would seem very distorted, either too shallow or too extended (with other depth aberrations) if the distance between our eyes was not being matched by the two-lens stereo-camera.

In contrast to stereo-camera photography, with the single-lens motion picture camera (film or video), exploitable difference between like images arises from the interval of time between picture-exposures, during which the objects filmed shift in spatial relationship to each other; or/and the camera itself moves, capturing the 3-dimensional scene from another perspective, and thus shifting two-dimensional placement of pictured objects (which may not have moved in actuality) as recorded exposure to exposure. Because distance or direction traversed by the camera between exposures is not constant, nor movement by subjects recorded under photographer control, the visual equation of two-dimensional similarities and differences from which 3-dimensional movements will be constructed can not produce scenes as reliably life-like as can simultaneous stereo-exposures with a fixed horizontal distance of 2½ inches between a pair of lenses. Eternalism 3-D movements made from sequential exposures are not intended to offer scientific data pertaining to reality but instead to provide odd and expressive impossible-in-reality impressions.

The stereo still-camera provides a pair of mentally combinable left and right eye flat image pictures; viewed one picture to each eye, similarities and differences are automatically assessed and a semblance of familiar depth is seen. We gaze from plane to plane into a seeming depth, the angling of our two eyes "crossing" for close objects and spreading to parallel alignment for very distant ones (Yet we remain focused on the same plane in depth, the actual plane of the picture surface; in life, we constantly refocus as well as angle for different distances.) We are not conscious, either in actual life or when looking into such artificial depths, of the doubling of forms (as they fall back into 2-dimensionality) at distances that we are not at the moment angling for. This automatic angling operation of the eyes cannot happen when looking with both eyes at the same territory of flat picture surface. The coinciding of opposing 2-dimensional perspectival viewings of an object (by which volume can be conceived by the mind) must be done for the viewer, a task greatly enabled by the computer.

The present invention revolves each set of picture-units in place, but if a figure from one perspective is not placed in a correspondingly similar position in its frame (and in matching horizontal alignment) with its representation as recorded from another perspective, there is only a 2-dimensional jiggering with no volume illusion or continuous direction of movement created. With the computer, one can slide and place one picture, or an area of that picture, into exact relationship with a matching picture or area so as to achieve the precise effect desired. (A recorded object becomes an area within a flat picture-image.)

The slightest advance in a particular direction of the contour of one area in relation to its match-up area determines movement in that direction. Slight shrinking or enlargement of one area compared to the other creates a "zooming" in or out effect. A problem in overlaying one entire picture over another in order to match up one area usually means other areas will not coincide, not synchronize; but the computer allows for each area to be matched separately and inlaid into the scene according to one's depth-movement intentions for each area. The crazy-quilt artificiality of a scene can be hidden or obvious, its parts drawn from a single-pair source of related images or from as many sources as desired. Photo-images can be mixed with or replaced by drawn and painted imagery. The scene can imitate real life one moment and veer off into impossibility the next.

Again, although only two image pictures are usually cycled, more than two can be worked into a cycle to create a particular effect. Following and inventing variants on the directions above, and the formula as described below for sequencing frames, will create the impression of solid entities moving in a charmed dimension where normally transient physical gestures can endure forever. In fact, computer interactivity can mean the viewer deciding how long the effects of each series continues. Further interactivity will give the viewer the option to place picture of his/her own choice into this unique cycling system.

Figure 23A:
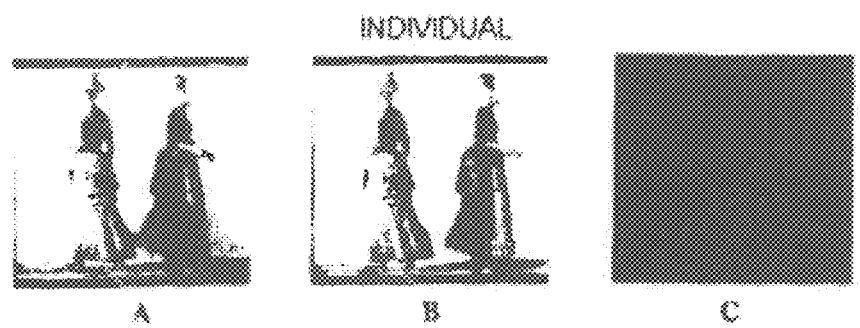
FIGS. 23 a-23 c illustrates pictures of two women in Eternalism with two pictures.
Figure 23B:
Figure 23C:
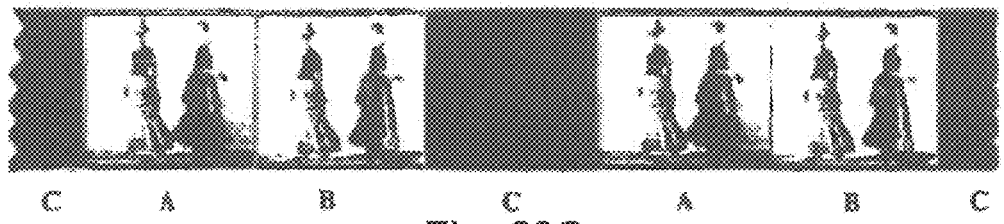

FIGS. 23 a-23 c shows two phases of an action, A & B, plus black bridge-frame C. We see the pictures separately in FIG. 23 a; made sequentially adjacent to each other in FIG. 23 b and presented as a repeating series of pictures, as a "loop" or "cycle", in FIG. 23 c.

Figure 24A:
FIGS. 24 a-24 c illustrates the women of FIG. 6 with a 50-50 blend between the women and the women and the bridging frame.
Figure 24B:
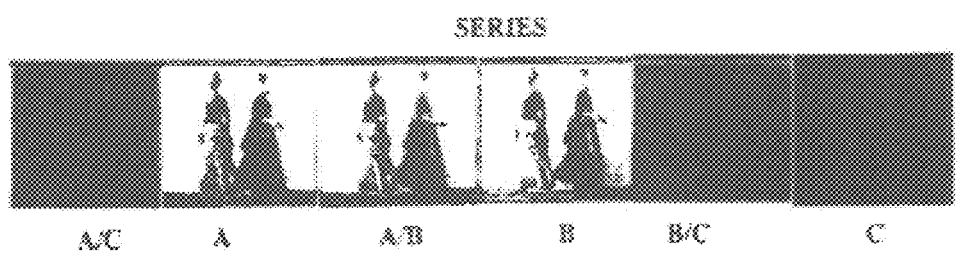
Figure 24C:
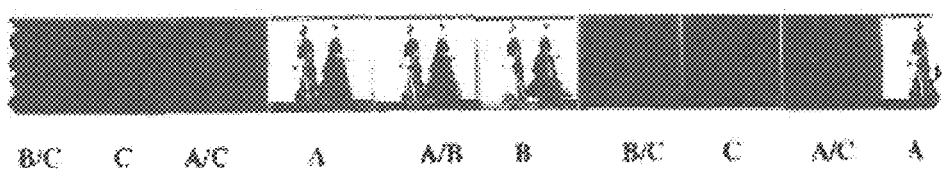

FIG. 24 a demonstrates the creation of intermediary or blended frames between A, B and C, which are 50-50% blends producing A/C, A/B & B/C. FIG. 24 b shows them in sequence and FIG. 24 c shows them repeating as an ongoing loop.

FIG. 25 a shows one figure in isolation, removed from the previous scene. Pictures D & E may appear identical but are actually two different perspectives which together make possible a 3-dimensional figure. While the recording camera remained in a fixed position the figure moved before it, frame after frame, making two perspectives possible. Because the figure moved to different positions in the two film frames, it was necessary to move one figure in one frame so that both figures would occupy the same location in both frames. It is now possible to see them as a single 3-dimensional figure when the frames cycle in quick succession together with the bridge frame as shown in FIGS. 25 b and 25 c.

Figure 26A:
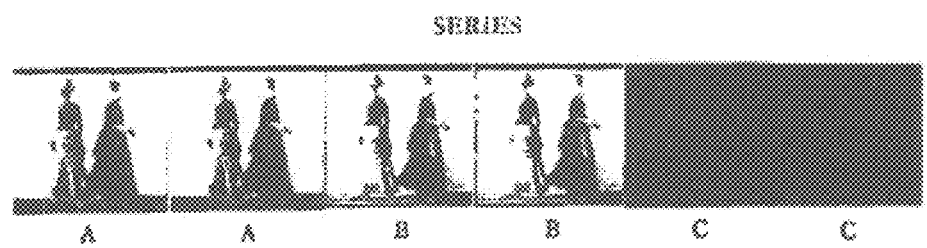
FIGS. 26 a-26 b illustrates the doubling of the frames from FIG. 6.
Figure 26B:
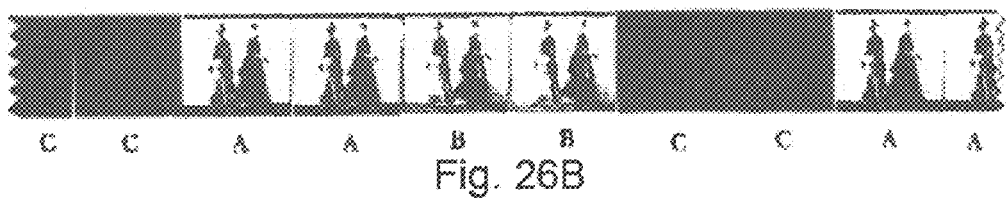

FIGS. 26 a and 26 b represents the doubling of each frame in an A,B,C series.

Figure 27A:
FIGS. 27 a-27 c illustrates the two women with a smaller frame depicting a portion of one woman repeated and overlayed in the upper left-hand corner of the frame to create a separate depth-configuration within the larger frame.
Figure 27B:
Figure 27C:
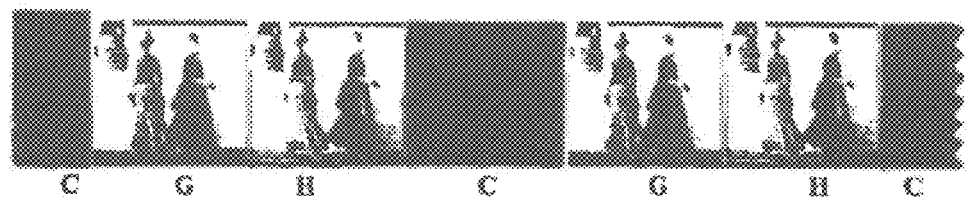

FIGS. 27 a-27 c shows a section of picture G & H is repeated in the upper left corner. When observed in quick succession this series will show the two center figures in one configuration of depth and the inset series as an opposing configuration of depth. Left eye/right eye views as placed in G & H are reversed in the inset figure, so that parts of the figure that (3-dimensionally) approach the viewer in the larger picture are seen to retreat away from the viewer in the smaller picture, and visa versa.

Figure 28:
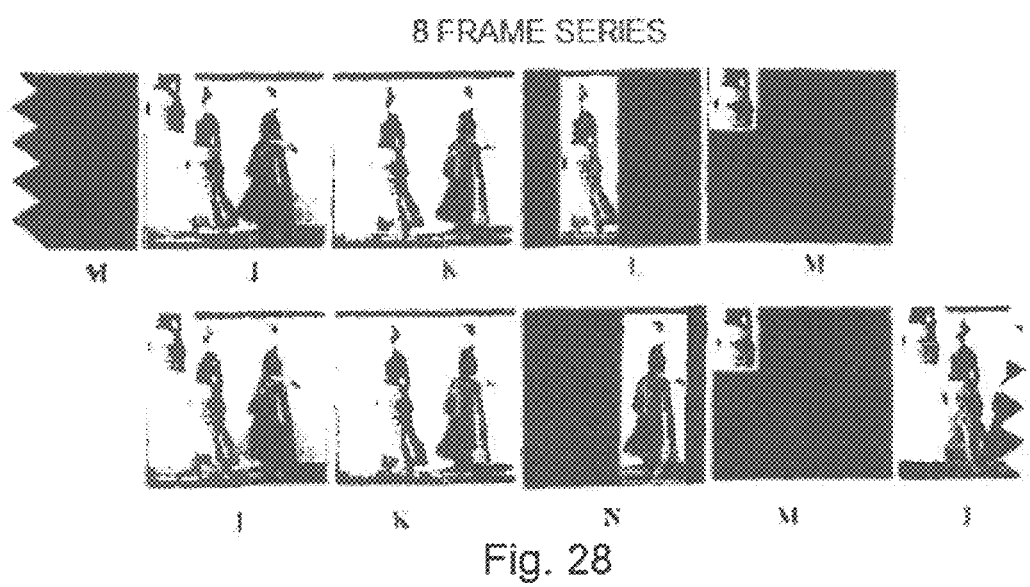
FIG. 28 illustrates a combination of the two women with a portion of the one woman both in the bridging frame as well as in one of the frames that contain both women.

FIG. 28 illustrates two sets of four; with both similarities (J, K, M) and differences (L, N) between the sets, including in the upper left corner an action that straddles bridging frame (M) and picture frame (J). Note the bridging frame is not completely blank or colored.

Figure 29:
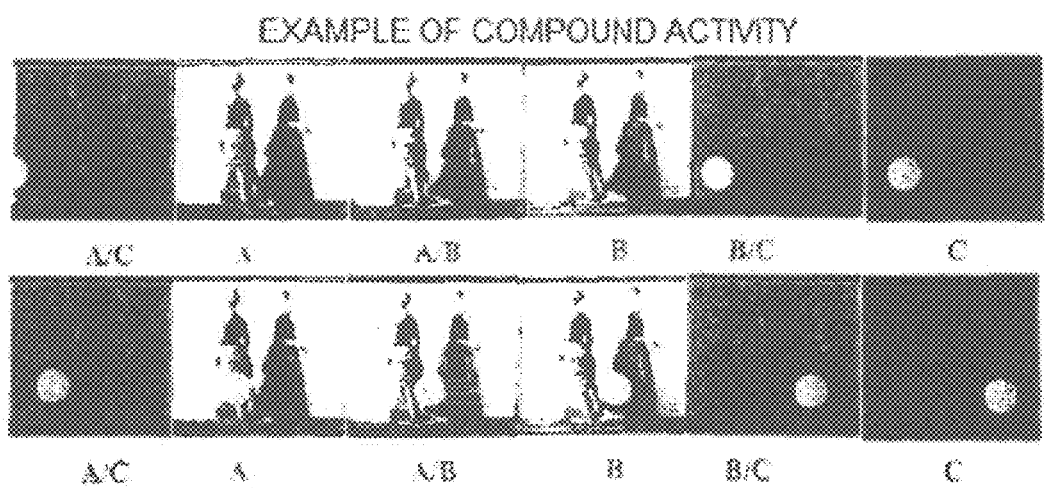
FIG. 29 illustrates Eternalism with two women and a circle moving through the frames.

FIG. 29 illustrates an example of an Eternalism effect coexisting with more normal screen action, and of an Eternalism repetition taking place but with no two frames exactly alike: a visual element (the circle) proceeds frame to frame throughout as it would in a normal movie, unaffected by Eternalism looping. Again, note that the bridging frame is not completely blank.

Figure 30:
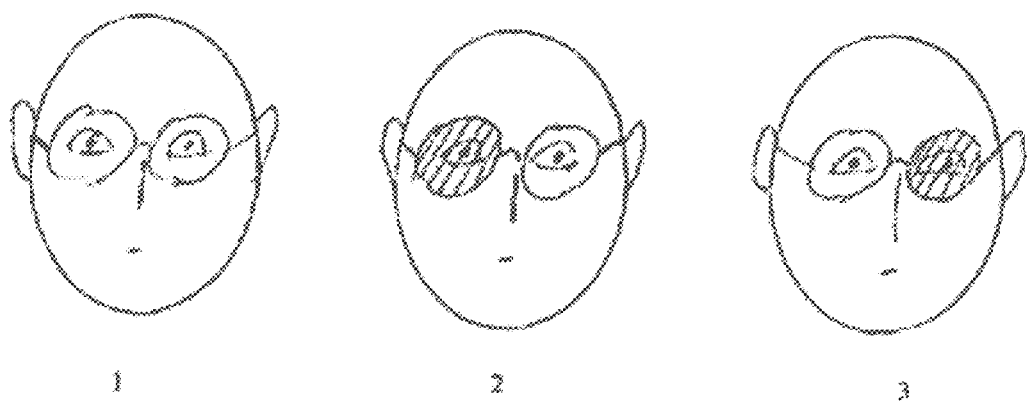
FIG. 30 illustrates the Pulfrich filter.

FIG. 30 is an illustration of Pulfrich filter spectacles: (1) clear; (2) activated to partly block light reaching figure's right eye; (3) activated to partly bock light reaching figure's left eye. Liquid crystal reaction is one method of achieving the blocking effect.

Certain Embodiments May be Described as Follows:

In the Pulfrich filter effect, interference by the light-reducing filter has the effect of retarding the light that does pass through it to the eye. As long as forms and objects are changing position relative to each other as pictured frame to frame, a delayed picture seen in combination with a present-moment picture offers two slightly different pictures simultaneously to the mind. Thus an artificial three-dimensional image can be produced by the mind utilizing the same mechanisms that allow it, in viewing actuality, to produce a three-dimensional mental image from the pair of two-dimensional perspective-images received from horizontally adjacent eyes. The artificial 3-D image can be said to depend on a variable report of actuality. A Pulfrich filter used to view actual three-dimensional space will distort that space (assuming the scene is in motion). Similarly, depth in a screenimage can be distorted, and in manifold ways, including reversal of near and far and direction of motion flow. Such distortions can have expressive artistic value.

The Pulfrich Effect, triggered (as described above) to accord with pictured directional motion on-screen, would, have applications beyond use with Eternalized movies. Video games and other video movies featuring extended screen movements to left or right could, in many instances, be enhanced for viewers by Pulfrich projection into three-dimensional depth. For many such screen events for instance, a scene filmed or videotaped from a moving vehicle, especially perpendicularly, with the camera aimed at or close to a 90 degree angle from the side of the vehicle, convincingly realistic deep space would result. A stipulation of realistic deep space, as made available by the Pulfrich Effect, is that the partial light-absorbing filter be before the eye on the side to which the pictured foreground objects are seen to move. If filming or videotaping was to be done with the camera aimed perpendicular to a vehicle's path of movement, and the camera was on the driver's side, motion onscreen would flow screen-left, and the Pulfrich filtering would therefore have to take place before the left eye; thus the need to switch darkfilter placement from eye to eye in accordance with direction of screen movement. The filter works best when there is essentially horizontal movement; when viewing an unmoving or inappropriate image, both left and right eye filters should clear. Presented as electronic media, such images would benefit from timed application of appropriate Pulfrich filtering. This aspect of the invention would allow 3-dimensional movies to be created and presented (less spectacles) with the same cinema technology used for making and presenting ordinary 2-dimensional movies.

Description of the Eternalism Optical Phenomena

The idea of an interval of action running in place without apparent beginning, middle and end, forever swelling or turning or rising or opening, forever seeming to evolve without ever actually doing so (until given a determined release into a further phase of development), can be literally unimaginable, so alien is it to our experience. Neither in life or on film or in electronic imagery has it been possible to create the optical illusion of a door forever cracking open or a muscle rippling or head turning or any other limited gesture continuing as such into potentially unlimited tune—until advent of this invention. We have termed this phenomenon Eternalism, and we speak of pictured forms or objects, scenes or gesture being Eternalized into Eternalisms. A further benefit of this invention is enhanced 3-Dimensionality of Eternalized images, a 3-D that can be reasonably life-like or radically at odds with depth as we know it.

Consider, for example, the action of a door opening. And select from that entire action only the fraction of time that it would take for the door to just begin to open, as it cracks open a narrow space alongside the doorframe, with the order edge of the door swinging over little more than an inch of flooring. Designating this very limited time-space interval as a movie "shot". The most minimal movie shot possible, it consists of only two running frames of film or video.

In reality, there would be no way to sustain into unlimited time the very limited action of the door cracking open; to keep opening and only opening yet never moving past that very limited phase of just cracking open. This motion is not repeated but sustained. The reality, of course, is that to remain in motion, and in forward motion only, one would have to move the door to a further phase of motion: the door would have to open wider. And the designated space-time interval would be left behind.

This is similar to someone walking against the direction of a conveyer belt walkway (as at an airport) and at exactly the same speed of the conveyer belt, continually walking forward yet getting nowhere. The Eternalism technique is a sort of cinematic conveyer belt moving in an opposing direction to any moving image placed on it.

It is a conveyer belt with a beat, a flicker, a visual beat capable of supple changes. In the history of cinema, flicker—referring to visible intervals of darkness between flashes of successive film-frames, intrusive reminders of the mechanical basis of the cinematic illusion—has been a pejorative term. To commercially entertain, the technology needed to quickly outgrow flicker. Yet in doing so some other illusionistic potentials of the art, very curious departures from lifelike representation, were never discovered, their expressive potential left untapped, until now.

Method

Visible flicker is essential to Eternalism technique, which investigates and utilizes different intensities of emphasis, frame choices and frame-counts of flicker in order to create entirely new illusions to augment cinema's repertoire of visual effects. Today's audiences are entirely receptive to non-realistic representation, the textures of visual technologies are no longer unwelcome onscreen. Visible flicker does sometimes appear in movies in purposeful ways, usually representing lightning or machine-gun bursts, and even as rhythmic hits of light-energy, but not with the methodology and results of Eternalisms.

No less than three basic units, two pictures and a bridge-interval (A, B, C), are necessary to create an Eternalism, even when picture B might be only a slight modification, a shifting or size reduction or expansion or tilting, etc. of picture A. On the simplest level, the series of units would proceed: A, B, C, A, B, C, A and so on. Each unit interval may be of any effective time duration, an effective smooth-working duration for computer assembling is two frames per unit, shown here as A,A, B,B, C,C, A,A, B,B, C,C, A,A and so on. It is sometimes desired to insert transitional frames, usually 50/50% (percentage mixture may vary) superimposed frames of adjacent units, shown here as: A, A/B, B, B/C, C, C/A, A and so on.

Additionally, all re-appearances of the basic cycling units comprising an Eternalism needn't be exactly the same. Strict mechanical repetition can give way to flexible variation within the limits imposed by what is necessary to sustain the motion/depth illusion (unless one chooses to abandon the illusion entirely for a period of time; it is expected that for commercial movie use of the method, that the effect would be used intermittently, for selected scenes). Any number of factors comprising a unit-sequence may be altered from appearance to appearance as it cycles, including colors, shapes, placement of shapes, objects pictures, unit duration, etc., so that the same Eternalism would seem to remain in play while going through subtle or even vibrant internal changes, before being replaced by a successive phase of motion or a distinctly other selection of picture/interval units. Change in the order of units, such as A, B, C, A, B, C, A being replaced by B, A, C, B, A, C, B would initiate an immediate reversal in direction of pictured movement. Varying durations of units within an Eternalism or traveling from Eternalism to Eternalism may not only make for desired beat and rhythm changes but also affect the apparent character of motion and/or depth in interesting ways. A composer of a series may even choose to play against its smooth continuity by momentary unit-replacement or interjection by other picture units, as for instance: A,A, B,B, C,C, A,D, B,B, C,E,C, A,A. The entire screen may Eternalize with the same sequential rhythm (usually the case) or different parts may sequence with different rhythms to different pictorial effect.

Many techniques commonly in use in computer and hand-crafted movie animation can be adapted to Eternalism use. For instance, similar to screen combinations of photographed, reality with animation cartooning, only a section or sections of the screen image may be Eternalized while normal movie motion proceeds in other sections. Or a figure in normal motion may move through an Eternalized scene. Or, among other combination possibilities, a smaller Eternalism (which can be an object or shape or a separately framed scene) may be imbedded within a larger Eternalism, or may float before it, or move—substantial yet ghostlike—through it.

Stereo Vision and Special Requirements of Eternalism Composition

Eternalism images may be so composed, as to create an impression of 3-dimensional volume, designed to appear more or less realistic, but never with the degree of realism as to fool anyone that they are other than images. No one will ever attempt to sink a hand into one to grab at passing fish as children do at Sony I-MAX. Eternalism depth is readily apparent and yet more problematic, as is its character of movement. Depth isn't simple there to be taken for granted, but seems constantly caught in the act of being generated out of flat elements. Eternalism is an illusion of depth. Our minds are given the task of entertaining together two conflicting impressions: of things simultaneously appearing both flat and deep. However, the degree of 3-dimensionality that is there can be seen without need of special viewing devices of any sort, and in fact can be seen by many persons normally deprived of any 3-dimensional vision (those missing sight in one eye, for instance).

Depth as well as ongoing movement must be artificially composed in the making of Eternalisms. Calculated placement of areas to be brought into working correspondence within a picture A and picture B is of paramount importance.

It does happen that images are recorded on film or in electronic media that work effectively enough when sequentially overlayed with each other as-is, so as to need little or no cut-and-paste rearrangement. But more often there are areas not adequately corresponding in sequential location and therefore, when alternated quickly, will merely bounce back and forth from place (in A-frame) to place (in B-frame). In normal stereo-vision ones two eyes angle in and out from parallel alignment as they match corresponding areas on their two retinal images. Each retinal image is in fact 2-dimensional; 3-dimension vision is a result of this muscular matching, this pulling-into-alignment activity performed by muscles surrounding the eyes (as dictated to by viewers focus of interest) activity by the eyes and the mental comparing and processing of like and unlike information sent by each eye to the brain. Only within a very limited interval of actual depth, up to about twenty five feet distance for most humans, can we effectively shift and overlay forms so as to discriminate depth accurately (eyes work in parallel beyond that distance, with greatly reduced depth distinction). The closer to the eyes the target of focus, the more the eyes have to cross, and the different degrees or angles of crossing demanded as things approach or recede means that while one layer of depth will be properly shifted to overlay figures, others will not be. Selective focusing and shift in real-life visual experience, selectively attending to the 3-D figures creates in the mind, while ignoring—helped by a "dominant eye"—the remaining non-overlayed and doubled flat figures remaining in the twin fields of vision, peripheral to the focus of attention.

Ignoring such peripheral mismatchings in Eternalisms does not come so naturally. Because the image pictures alternate in appearance, they don't quietly superimpose (with one image largely discarded from mind due to our having a "dominant eye"): non-overlayed areas will tend to jiggle and bounce, usually a distraction. Unless that is the effect wanted in a particular instance, the procedures of artificially overlaying A and B picture-areas for the viewer will be carried out throughout an Eternalism composition, into all peripheral areas of the picture. Again, this can be done employing computer graphics cut-and-paste techniques, with the filling of areas left emptied (by removal or shifting of a form) usually accomplished by the extending of adjacent colors.

Picture-frames A and B may be near-identical or have only some elements with close visual correspondence. Similarity of shape and location within the frame are important factors determining the effect. This is true to the point that entirely different pictured objects but of similar shape and on-screen location will give better results than two images of the same object recorded from perspectives too far apart or placed too far apart within consecutive frames, in which case the images will be seen to vibrate or bounce back and forth without visually combining into a single moving form. While matching image elements in pictures A and B must occupy almost the exact screen-space in order to combine properly, it will be the differences between them (within close tolerances) that will produce and determine the character of movement and dimensionality. Computer graphics cut-and-paste techniques can be used to select and place, shrink and expand and otherwise manipulate matching elements (from any source) into effective screen-locations relative to each other. One or both pictures may be collaged or stitched together from multiple sources, parts may be removed or inserted, lifted and reshaped or/and relocated. Even when the image is photographed from life and appears life-like, the process of composition can be as exacting and labor-intensive and involved with techniques of artifice as cartoon animation.

Embodiments

In practice, the implementation of this technique opens up a new world of visual effects. Its uncanniness may be emphasized to create unsettling time-space aberrations for comic or dramatic effect in movies. Or, aiming for more realistic appearance, the method could be used to provide more lively "snapshots" of familiar things and events. For instance, people could carry, programmed into a Palm Pilot-type "electronic wallet", a great many (low memory demanding) moving replicas of loved ones in characteristic living gestures, with heightened 3-dimensional presence. Even very limited movement, limited 3-dimensionality, can enormously augment and reinforce visual information: i.e., a child's face breaks into a smile. Again, the very low demand of electronic memory by an Eternalism (cycling as few as two picture-frames with an interval of darkness), makes possible extensively illustrated electronic catalogues or even encyclopedias, supporting hundreds and eventually thousands of Eternalized illustrations. A reader-viewer might observe a home appliance in operation. Or study a visual sampling of an ocean wave breaking in its sweep to shore, study it as has never been possible before, forever breaking from peak ascendancy. One may study a springing cat, sheath of muscles sliding over ribs continually, available for sustained observation; or follow a clear demonstration of the direction a screwdriver must turn to further imbed a screw. Any number of instances where stereo-dimensional action (often audio-accompanied, as audio also demands little computer-memory) would communicate so much more than a still and flat image, or even a moving but flat image.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. An electrically controlled spectacle for viewing a video, comprising:
   a spectacle frame;
   optoelectronic lenses housed in the frame, the lenses comprising a left lens and a right lens, each of the optoelectrical lenses having a plurality of states, wherein the state of the left lens is independent of the state of the right lens; and
   a control unit housed in the frame, the control unit being adapted to control the state of each of the lenses independently.

2. The electrically controlled spectacle of claim 1, wherein each of the lenses has a dark state and a light state.

3. The electrically controlled spectacle of claim 2, wherein when viewing a video the control unit places both the left lens and the right lens to a dark state.

4. A method for viewing a video, the method comprising:
   wearing the electrically controlled spectacle of claim 3; and
   showing the wearer a video having dissimilar bridge frames and similar image frames.

5. The electrically controlled spectacle of claim 3, wherein each of the optoelectronic lenses comprises a plurality of layers of optoelectronic material.

6. A method for viewing a video, the method comprising:
   wearing an electrically controlled spectacle, the electrically controlled spectacle comprising:
      a spectacle frame;
      optoelectronic lenses housed in the frame, the lenses comprising a left lens and a right lens, each of the optoelectrical lenses having a plurality of states, wherein the state of the left lens is independent of the state of the right lens; and
      a control unit housed in the frame, the control unit being adapted to control the state of each of the lenses independently;
      wherein each of the lenses has a dark state and a light state;
      wherein when viewing a video the control unit places both the left lens and the right lens to a dark state;
   the method further comprising:
      showing the wearer a video having dissimilar bridge frames and similar image frames;
      determining a first modified image frame by removing a first portion of a selected image frame;
      determining a second modified image frame different from the first modified image frame by removing a second portion of the selected image frame;
      determining a third modified image frame different from the first and second modified image frames by removing a third portion of the selected image frame;

determining a first bridge image frame different from the selected image frame and different from the first, second, and third modified image frames;
determining a second bridge image frame different from the selected image frame, different from the first, second, and third modified image frames, and different from the first bridge image frame;
blending the first bridge image frame with the first modified image frame, generating a first blended image frame;
blending the first bridge image frame with the second modified image frame, generating a second blended image frame;
blending the first bridge image frame with the third modified image frame, generating a third blended image frame;
overlaying the first blended image frame, the second blended image frame, and the third blended image frame to generate an overlayed image frame;
displaying the overlayed image frame; and
displaying the second bridge image frame.

7. The method of claim 6, wherein the first bridge image frame comprises a non-solid color.

8. A method for viewing a video, the method comprising:
wearing an electrically controlled spectacle, the electrically controlled spectacle comprising:
  a spectacle frame;
  optoelectronic lenses housed in the frame, the lenses comprising a left lens and a right lens, each of the optoelectrical lenses having a plurality of states, wherein the state of the left lens is independent of the state of the right lens; and
  a control unit housed in the frame, the control unit being adapted to control the state of each of the lenses independently;
  wherein each of the lenses has a dark state and a light state;
  wherein when viewing a video the control unit places both the left lens and the right lens to a dark state;
the method further comprising:
  showing the wearer a video having dissimilar bridge frames and similar image frames;
  determining a first modified image frame by removing a first portion of a selected image frame;
  determining a second modified image frame different from the first modified image frame by removing a second portion of the selected image frame;
  determining a third modified image frame by removing a third portion of the first modified image frame;
  determining a fourth modified image frame different from the third modified image frame by removing a fourth portion of the first modified image frame;
  determining a fifth modified image frame different from the third and fourth modified image frames by removing a fifth portion of the first modified image frame;
  determining a sixth modified image frame by removing a sixth portion of the second modified image frame;
  determining a seventh modified image frame different from the sixth modified image frame by removing a seventh portion of the second modified image frame;
  determining an eighth modified image frame different from the sixth and seventh modified image frames by removing an eighth portion of the second modified image frame;
  determining a first bridge image frame different from the first and second modified image frames;
  determining a second bridge image frame different from the first and second modified image frames, and different from the first bridge image frame;
  determining a third bridge image frame different from the first and second modified image frames, and different from the first and second bridge image frames;
  determining a fourth bridge image frame different from the first and second modified image frames, and different from the first, second and third bridge image frames;
  generating a first blended image frame by blending the third modified image frame with the first bridge image frame;
  generating a second blended image frame by blending the fourth modified image frame with the second bridge image frame;
  generating a third blended image frame by blending the fifth modified image frame with the third bridge image frame;
  displaying the first blended image frame, the second blended image frame, the third blended image frame, and the fourth bridge image frame;
  generating a fourth blended image frame by blending the sixth modified image frame with the first bridge image frame;
  generating a fifth blended image frame by blending the seventh modified image frame with the second bridge image frame;
  generating a sixth blended image frame by blending the eighth modified image frame with the third bridge image frame; and
  displaying the fourth blended image frame, the fifth blended image frame, the sixth blended image frame, and the fourth bridge image frame.

9. The method of claim 8, wherein:
the fourth bridge image frame is solid white; and
the spectacle frame comprises a sensor adapted to receive synchronization signals embedded in the video and provide the synchronization signals to the control unit.

10. A method for viewing a video, the method comprising:
wearing an electrically controlled spectacle, the electrically controlled spectacle comprising:
  a spectacle frame;
  optoelectronic lenses housed in the frame, the lenses comprising a left lens and a right lens, each of the optoelectrical lenses having a plurality of states, wherein the state of the left lens is independent of the state of the right lens; and
  a control unit housed in the frame, the control unit being adapted to control the state of each of the lenses independently;
  wherein each of the lenses has a dark state and a light state;
  wherein when viewing a video the control unit places both the left lens and the right lens to a dark state;
the method further comprising:
  showing the wearer a video having dissimilar bridge frames and similar image frames;
  determining a first modified image frame by removing a first portion of a selected image frame;
  determining a second modified image frame different from the first modified image frame by removing a second portion of the selected image frame;
  determining a third modified image frame different from the first and second modified image frames by removing a third portion of the selected image frame;

determining a bridge image frame different from the selected image frame and different from the first, second, and third modified image frames;
overlaying the first modified image frame, the second modified image frame, and the third modified image frame, to generate an overlayed image frame;
displaying the overlayed image frame; and
displaying the bridge image frame.

11. A method for viewing a video, the method comprising:
wearing an electrically controlled spectacle, the electrically controlled spectacle comprising:
a spectacle frame;
optoelectronic lenses housed in the frame, the lenses comprising a left lens and a right lens, each of the optoelectrical lenses having a plurality of states, wherein the state of the left lens is independent of the state of the right lens; and
a control unit housed in the frame, the control unit being adapted to control the state of each of the lenses independently;
wherein each of the lenses has a dark state and a light state;
wherein when viewing a video the control unit places both the left lens and the right lens to a dark state;
the method further comprising:
showing the wearer a video having dissimilar bridge frames and similar image frames;
determining a bridge image frame that is different from a first image frame and different from a second image frame, the first and second image frames being consecutive image frames in a video;
determining a first modified image frame by removing a first portion of the first image frame;
determining a second modified image frame different from the first modified image frame by removing a second portion of the first image frame;
determining a third modified image frame different from the first and second modified image frames by removing a third portion of the first image frame;
overlaying the first, second, and third modified image frames to generate a first overlayed image frame;
displaying the first overlayed image frame;
displaying the bridge image frame;
determining a fourth modified image frame by removing a fourth portion of the second image frame;
determining a fifth modified image frame different from the fourth modified image frame by removing a fifth portion of the second image frame;
determining a sixth modified image frame different from the fourth and fifth modified image frames by removing a sixth portion of the second image frame;
overlaying the fourth, fifth, and sixth modified image frames to generate a second overlayed image frame;
displaying the second overlayed image frame; and
displaying the bridge image frame.

12. A method for viewing a video, the method comprising:
wearing an electrically controlled spectacle, the electrically controlled spectacle comprising:
a spectacle frame;
optoelectronic lenses housed in the frame, the lenses comprising a left lens and a right lens, each of the optoelectrical lenses having a plurality of states, wherein the state of the left lens is independent of the state of the right lens; and
a control unit housed in the frame, the control unit being adapted to control the state of each of the lenses independently;
wherein each of the lenses has a dark state and a light state;
wherein when viewing a video the control unit places both the left lens and the right lens to a dark state;
the method further comprising:
showing the wearer a video having dissimilar bridge frames and similar image frames;
determining a first modified image frame by removing a first portion of a selected image frame;
determining a second modified image frame different from the first modified image frame by removing a second portion of the selected image frame;
determining a third modified image frame different from the first and second modified image frames by removing a third portion of the selected image frame;
determining a first bridge image frame different from the first, second, and third modified image frames;
determining a second bridge image frame different from the first, second, and third modified image frames, and different from the first bridge image frame;
determining a third bridge image frame different from the first, second, and third modified image frames, and different from the first and second bridge image frames;
determining a fourth bridge image frame different from the first, second, and third modified image frames, and different from the first, second and third bridge image frames;
blending the first modified image frame with the first bridge image frame to generate a first blended image frame;
blending the second modified image frame with the second bridge image frame to generate a second blended image frame;
blending the third modified image frame with the third bridge image frame to generate a third blended image frame;
overlaying the first blended image frame, the second blended image frame, and the third blended image frame to generate an overlayed image frame;
displaying the overlayed image frame; and
displaying the fourth bridge image frame.

13. The method of claim 12, wherein:
the fourth bridge image frame is solid white; and
the spectacle frame comprises a sensor adapted to receive synchronization signals embedded in the video and provide the synchronization signals to the control unit.

14. A method for viewing a video, the method comprising:
wearing an electrically controlled spectacle, the electrically controlled spectacle comprising:
a spectacle frame;
optoelectronic lenses housed in the frame, the lenses comprising a left lens and a right lens, each of the optoelectrical lenses having a plurality of states, wherein the state of the left lens is independent of the state of the right lens; and
a control unit housed in the frame, the control unit being adapted to control the state of each of the lenses independently;
wherein each of the lenses has a dark state and a light state;
wherein when viewing a video the control unit places both the left lens and the right lens to a dark state;
the method further comprising:
showing the wearer a video having dissimilar bridge frames and similar image frames;
determining a first modified image frame by removing a first portion of a selected image frame;

determining a second modified image frame different from the first modified image frame by removing a second portion of the selected image frame;
determining a third modified image frame by removing a third portion of the first modified image frame;
determining a fourth modified image frame different from the third modified image frame by removing a fourth portion of the first modified image frame;
determining a fifth modified image frame different from the third and fourth modified image frames by removing a fifth portion of the first modified image frame;
determining a sixth modified image frame by removing a sixth portion of the second modified image frame;
determining an seventh modified image frame different from the sixth modified image frame by removing a seventh portion of the second modified image frame;
determining an eighth modified image frame different from the sixth and seventh modified image frames by removing an eighth portion of the second modified image frame;
determining a first bridge image frame different from the first, second, third, fourth, fifth, sixth, seventh, and eight modified image frames;
determining a second bridge image frame different from the first bridge image frame and different from the first, second, third, fourth, fifth, sixth, seventh, and eight modified image frames;
blending the first bridge image frame with the third modified image frame to generate a first blended image frame;
blending the first bridge image frame with the fourth modified image frame to generate a second blended image frame;
blending the first bridge image frame with the fifth modified image frame to generate a third blended image frame;
overlaying the first blended image frame, the second blended image frame, and the third blended image frame to generate a first overlayed image frame;
displaying the first overlayed image frame and the second bridge image frame;
blending the first bridge image frame with the sixth modified image frame to generate a fourth blended image frame;
blending the first bridge image frame with the seventh modified image frame to generate a fifth blended image frame;
blending the first bridge image frame with the eighth modified image frame to generate a sixth blended image frame;
overlaying the fourth blended image frame, the fifth blended image frame, and the sixth blended image frame to generate a second overlayed image frame; and
displaying the second overlayed image frame and the second bridge image frame.

15. The method of claim 14, wherein the first bridge image frame comprises a non-solid color.

16. A method for viewing a video, the method comprising:
wearing an electrically controlled spectacle, the electrically controlled spectacle comprising:
a spectacle frame;
optoelectronic lenses housed in the frame, the lenses comprising a left lens and a right lens, each of the optoelectrical lenses having a plurality of states, wherein the state of the left lens is independent of the state of the right lens; and
a control unit housed in the frame, the control unit being adapted to control the state of each of the lenses independently;
wherein each of the lenses has a dark state and a light state;
wherein when viewing a video the control unit places both the left lens and the right lens to a dark state;
the method further comprising:
showing the wearer a video having dissimilar bridge frames and similar image frames;
the method further comprising at least one of:
generating a blended image frame by blending a plurality of image frames;
generating a combined image frame by combining a plurality of image frames;
generating a combined image sequence by combining a plurality of image sequences;
generating one or more doubled image frames by doubling one or more image frames;
generating an overlayed image frame by overlaying a plurality of image frames;
generating a modified image frame by removing a portion of an image frame;
repeating one of an image frame or a series of image frames;
generating a sequence of image frames;
generating a collage based on one or more portions of one or more image frames;
stitching together one or more portions of one or more image frames;
superimposing a first image frame on a second image frame;
determining a transitional frame;
inserting and/or lifting a portion of a first image frame into a second image frame;
reshaping a portion of an image frame; and
relocating a portion of an image frame.

* * * * *